US012109800B2

(12) United States Patent
Kobayashi et al.

(10) Patent No.: US 12,109,800 B2
(45) Date of Patent: Oct. 8, 2024

(54) PRINTER, CONTROL METHOD, AND NON-TRANSITORY COMPUTER READABLE MEDIUM

(71) Applicant: BROTHER KOGYO KABUSHIKI KAISHA, Nagoya (JP)

(72) Inventors: Akihiro Kobayashi, Yokkaichi (JP); Takahiro Nishimoto, Ogaki (JP); Kosuke Nukui, Nagoya (JP); Kenta Hasebe, Nagoya (JP); Kengo Takeda, Tokai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 134 days.

(21) Appl. No.: 17/809,422

(22) Filed: Jun. 28, 2022

(65) Prior Publication Data

US 2023/0001712 A1 Jan. 5, 2023

(30) Foreign Application Priority Data

Jun. 30, 2021 (JP) ................................ 2021-109074

(51) Int. Cl.
*B41J 11/00* (2006.01)
*B41J 2/21* (2006.01)

(52) U.S. Cl.
CPC ............ *B41J 11/00214* (2021.01); *B41J 2/21* (2013.01)

(58) Field of Classification Search
CPC ..... B41J 11/00; B41J 2/21; B41J 19/00; B41J 29/38; B41J 2/01; B41M 7/00
See application file for complete search history.

(56) References Cited

U.S. PATENT DOCUMENTS 6,902,249 B2 * 6/2005 Suzuki .................. B65B 61/025 347/15
6,953,245 B2 * 10/2005 Shirakawa ......... B41J 11/00218 347/102
7,794,077 B2 * 9/2010 Falser .................... B41J 2/1433 347/37
10,723,136 B2 * 7/2020 Kayanaka ............. B41J 2/2135
(Continued)

FOREIGN PATENT DOCUMENTS

JP 2012-51160 A 3/2012
JP 2012-232529 A 11/2012
(Continued)

*Primary Examiner* — John Zimmermann
(74) *Attorney, Agent, or Firm* — KENEALY VAIDYA LLP

(57) ABSTRACT

A printer includes a platen, a first head, a second head, a first lamp, and a second lamp. The first head, the second head, the first lamp, and the second lamp are moved relatively with respect to the platen in a main scanning direction, and the platen is moved from the second head toward the first head relatively with respect to the first head, the second head, the first lamp, and the second lamp, repeatedly. The second head ejects the second ink onto the object to be printed placed on the platen while the first head, the second head, the first lamp, and the second lamp are moving in the main scanning direction. The first lamp irradiates light onto the second ink on the object to be printed while the first head, the second head, the first lamp, and the second lamp are moving in the main scanning direction.

29 Claims, 37 Drawing Sheets

(56) References Cited

U.S. PATENT DOCUMENTS

| | | | | |
|---|---|---|---|---|
| 2006/0158481 | A1* | 7/2006 | Spevak | B41J 2/2114 347/43 |
| 2011/0074857 | A1* | 3/2011 | Mitsuzawa | B41J 11/00212 347/16 |
| 2011/0221818 | A1* | 9/2011 | Furuhata | B41J 11/00214 347/16 |
| 2012/0281049 | A1 | 11/2012 | Kachi | |
| 2012/0287190 | A1* | 11/2012 | Shimada | B41J 2/2114 347/12 |
| 2013/0235135 | A1 | 9/2013 | Kondo et al. | |
| 2017/0072706 | A1 | 3/2017 | Okawa | |
| 2018/0257389 | A1* | 9/2018 | Hasegawa | B41M 7/0081 |
| 2022/0379633 | A1* | 12/2022 | Takayama | B41J 11/00212 |

FOREIGN PATENT DOCUMENTS

| | | | |
|---|---|---|---|
| JP | 2013-184400 | A | 9/2013 |
| JP | 2013-188962 | A | 9/2013 |
| JP | 2015-63057 | A | 4/2015 |
| JP | 2015-186918 | A | 10/2015 |
| JP | 2015-193089 | A | 11/2015 |
| JP | 2020-175563 | A | 10/2020 |
| JP | 2022184195 | A * | 12/2022 |

* cited by examiner

PRINTER, CONTROL METHOD, AND NON-TRANSITORY COMPUTER READABLE MEDIUM

CROSS-REFERENCE TO RELATED APPLICATIONS

This application claims priority to Japanese Patent Application No. 2021-109074, filed on Jun. 30, 2021, the content of which is hereby incorporated by reference in its entirety.

BACKGROUND

The present disclosure relates to a printer, a control method, and a non-transitory computer readable medium storing a control program.

A printer is known that performs gloss printing using photocurable ink. The gloss printing is a printing method that creates a glossy printed object, by smoothing a layer of the photocurable ink formed on an object to be printed. For example, in the known printer, a color ink head, a clear ink head, a plurality of color LEDs, and a plurality of white/clear LEDs are provided on a carriage. The color ink head and the clear ink head are aligned with each other in a sub-scanning direction, and respectively eject photocurable color ink and photocurable clear ink onto the object to be printed. The plurality of color LEDs are arranged in the plurality thereof on both sides of the color ink head in a main scanning direction, and irradiate light onto the object to be printed. The plurality of white/clear LEDs are arranged in the plurality thereof on both sides of the clear ink head in the main scanning direction, and irradiate light onto the object to be printed.

At the time of the gloss printing, the printer ejects the color ink from the color ink head onto the object to be printed and causes the plurality of color LEDs to be illuminated, while moving the carriage in the main scanning direction. The printer ejects the clear ink from the clear ink head onto the object to be printed and causes the plurality of clear LEDs to be illuminated. The printer conveys the object to be printed in a direction from the color ink head toward the clear ink head in the sub-scanning direction. By repeating these operations, the printer forms a layer of color ink on the object to be printed, and forms a layer of clear ink on the layer of color ink.

SUMMARY

At the time of the gloss printing, in order to secure a time from when the clear ink layer is formed on the object to be printed to when the smoothing is performed, the above-described printer causes only the white/clear LEDs furthermost upstream in a progress direction of the carriage in the main scanning direction to be illuminated, of the plurality of white/clear LEDs. It is thus necessary for the printer to arrange the white/clear LEDs to be at positions separated from the white/clear ink head in the main scanning direction.

Note that, in the above-described printer, when the clear ink layer is not formed on the color ink layer, for example, it is conceivable to perform the gloss printing by smoothing the color ink layer. In this case also, in a similar manner to the white/clear LEDs, in order to secure a time from when the color ink layer is formed on the object to be printed to when the smoothing is performed, it is conceivable that the printer causes only the color LEDs furthermost upstream in the progress direction of the carriage in the main scanning direction to be illuminated, of the plurality of color LEDs. It is thus necessary for the printer to arrange the color LEDs to be at positions separated from the color ink head in the main scanning direction.

When the respective LEDs are arranged at the positions separated from the respective heads in the main scanning direction, there is a possibility a support member for each of the LEDs becomes larger in the printer. As a result, there is a possibility that the printer may become larger as a whole device.

An object of the present disclosure is to provide a printer, a control method, and a recording medium storing a non-transitory computer readable medium storing control program capable of smoothing a layer of ink formed on an object to be printed, in a gloss print mode, while suppressing an increase in size of a device as a whole.

According to a first aspect of the present disclosure, a printer includes a platen, a first head, a second head, a first lamp, a second lamp, a processor, and a memory. The platen is configured to have an object to be printed placed thereon. The first head is configured to eject a first ink onto the object to be printed. The first ink is a photocurable ink. The second head is aligned with the first head in a sub-scanning direction, and is configured to eject a photocurable second ink onto the object to be printed. The first lamp is aligned with the first head in a main scanning direction, and is configured to irradiate light onto the object to be printed. The main scanning direction is orthogonal to the sub-scanning direction. The second lamp is aligned with the second head in the main scanning direction, and is configured to irradiate light onto the object to be printed. The memory stores computer-readable instructions that, when executed by the processor, instruct the processor to perform following processes. The processor performs a first movement and a second movement repeatedly. The first movement moves the first head, the second head, the first lamp, and the second lamp relatively with respect to the platen in the main scanning direction. The second movement moves the platen in a direction, of the sub-scanning direction, from the second head toward the first head, relatively with respect to the first head, the second head, the first lamp, and the second lamp. The processor causes the second head to eject the second ink onto the object to be printed during the performing of the first movement, in a gloss print mode. After the performing of the second movement and the ejecting of the second ink, the processor causes to irradiate the light from the first lamp onto the second ink ejected onto the object to be printed, during the performing of the first movement, in the gloss print mode.

According to a second aspect of the present disclosure, a printer includes a platen, a first head, a second head, a first lamp, a second lamp, a processor, and a memory. The platen is configured to have an object to be printed placed thereon. The first head is configured to eject a first ink onto the object to be printed. The first ink is a photocurable ink. The second head is aligned with the first head in a sub-scanning direction, and is configured to eject a photocurable second ink onto the object to be printed. The first lamp is aligned with the first head in a main scanning direction, and is configured to irradiate light onto the object to be printed. The main scanning direction is orthogonal to the sub-scanning direction. The second lamp is aligned with the second head in the main scanning direction, and is configured to irradiate light onto the object to be printed. The first lamp is disposed, in a height direction, at a position further separated from the platen than a position of the second lamp with respect to the platen. The height direction is orthogonal to the main scanning direction and the sub-scanning direction. The memory stores computer-readable instructions that, when executed by the processor, instruct the processor to perform following processes. The processor causes the first head, the second head, the first lamp, and the second lamp to move relatively with respect to the platen in the main scanning direction. In a gloss print mode, the processor causes the first head to eject the first ink onto the object to be printed during the moving of the first head, the second head, the first lamp, and the second lamp. In the gloss print mode, the processor causes the first lamp to irradiate the light onto the first ink ejected onto the object to be printed, during the moving of the first head, the second head, the first lamp, and the second lamp.

According to a third aspect of the present disclosure, a printer includes a platen, a first head, a second head, a first lamp, a second lamp, a processor, and a memory. The platen is configured to have an object to be printed placed thereon. The first head is configured to eject a first ink onto the object to be printed. The first ink is a photocurable ink. The second head is aligned with the first head in a sub-scanning direction, and is configured to eject a photocurable second ink onto the object to be printed. The first lamp is aligned with the first head in a main scanning direction, and is configured to irradiate light onto the object to be printed. The main scanning direction is orthogonal to the sub-scanning direction. The first lamp includes a first light source and a first housing. The first housing is a housing that accommodates the first light source and includes a first facing surface. The first facing surface faces the platen in a height direction orthogonal to the main scanning direction and the sub-scanning direction. The second lamp is aligned with the second head in the main scanning direction, and is configured to irradiate light onto the object to be printed. The second lamp includes a second light source and a second housing. The second housing is a housing that accommodates the second light source and includes a second facing surface. The second facing surface faces the platen in the height direction. The first light source and the second light source are disposed at the same position as each other in the height direction. The first facing surface is disposed at a position further separated from the platen than a position of the second facing surface with respect to the platen in the height direction. The memory stores computer-readable instructions that, when executed by the processor, instruct the processor to perform following process. The processor causes the first head, the second head, the first lamp, and the second lamp to move relatively with respect to the platen in the main scanning direction. In a gloss print mode, the processor causes the first head to eject the first ink onto the object to be printed while the first head, the second head, the first lamp, and the second lamp are moving. In the gloss print mode, the processor causes the first lamp to irradiate the light onto the first ink ejected onto the object to be printed, during the moving of the first head, the second head, the first lamp, and the second lamp.

According to a fourth aspect of the present disclosure, a control method for controlling a printer including a platen configured to have an object to be printed placed thereon, a first head configured to eject a first ink onto the object to be printed, the first ink being a photocurable ink, a second head aligned with the first head in a sub-scanning direction and configured to eject a photocurable second ink onto the object to be printed, a first lamp aligned with the first head in a main scanning direction orthogonal to the sub-scanning direction and configured to irradiate light onto the object to be printed, and a second lamp aligned with the second head in the main scanning direction and configured to irradiate light onto the object to be printed, includes following steps. Performing a first movement and a second movement repeatedly. The first movement moves the first head, the second head, the first lamp, and the second lamp relatively with respect to the platen in the main scanning direction. The second movement moves the platen in a direction, of the sub-scanning direction, from the second head toward the first head, relatively with respect to the first head, the second head, the first lamp, and the second lamp. Ejecting the second ink from the second head onto the object to be printed during the performing of the first movement, in a gloss print mode. Irradiating, after the performing of the second movement and the ejecting of the second ink, the light from the first lamp onto the second ink ejected onto the object to be printed, during the performing of the first movement, in the gloss print mode.

According to a fifth aspect of the present disclosure, a non-transitory computer readable medium storing computer-readable instructions for controlling that are executed by a processor provided in a printer including a platen configured to have an object to be printed placed thereon, a first head configured to eject a first ink onto the object to be printed, the first ink being a photocurable ink, a second head aligned with the first head in a sub-scanning direction and configured to eject a photocurable second ink onto the object to be printed, a first lamp aligned with the first head in a main scanning direction orthogonal to the sub-scanning direction and configured to irradiate light onto the object to be printed, and a second lamp aligned with the second head in the main scanning direction and configured to irradiate light onto the object to be printed, the computer-readable instructions instructs the processor to perform following processes. The processor performs a first movement and a second movement repeatedly. The first movement moves the first head, the second head, the first lamp, and the second lamp relatively with respect to the platen in the main scanning direction. The second movement moves the platen in a direction, of the sub-scanning direction, from the second head toward the first head, relatively with respect to the first head, the second head, the first lamp, and the second lamp. The processor causes the second head to eject the second ink onto the object to be printed during the performing of the first movement, in a gloss print mode. After the performing of the second movement and the ejecting of the second ink, the processor causes the first lamp to irradiate, the light onto the second ink ejected onto the object to be printed, during the performing of the first movement, in the gloss print mode.

According to each of the above-described aspects, the printer can smooth the layer of ink formed on the object to be printed, in the gloss print mode, while suppressing an increase in size of the device as a whole.

BRIEF DESCRIPTION OF THE DRAWINGS

Embodiments will be described below in detail with reference to the accompanying drawings in which.

DETAILED DESCRIPTION

A printer 1A according to an embodiment of the present disclosure will be described with reference to FIG. 1 to FIG. 12. The upper side, the lower side, the lower left side, the upper right side, the lower right side, and the upper left side in FIG. 1 respectively correspond to the upper side, the lower side, the front side, the rear side, the right side, and the left side of the printer 1A.

In the following description, a white color ink will be referred to as "white ink." When black, cyan, yellow, and magenta inks are collectively referred to, or when no particular distinction is made therebetween, they will be referred to as "color inks." Transparent or translucent ink will be referred to as "clear ink." When the white ink, the color inks, and the clear ink are collectively referred to, or no particular distinction is made therebetween, they will simply be referred to as "inks."

Figure 1:
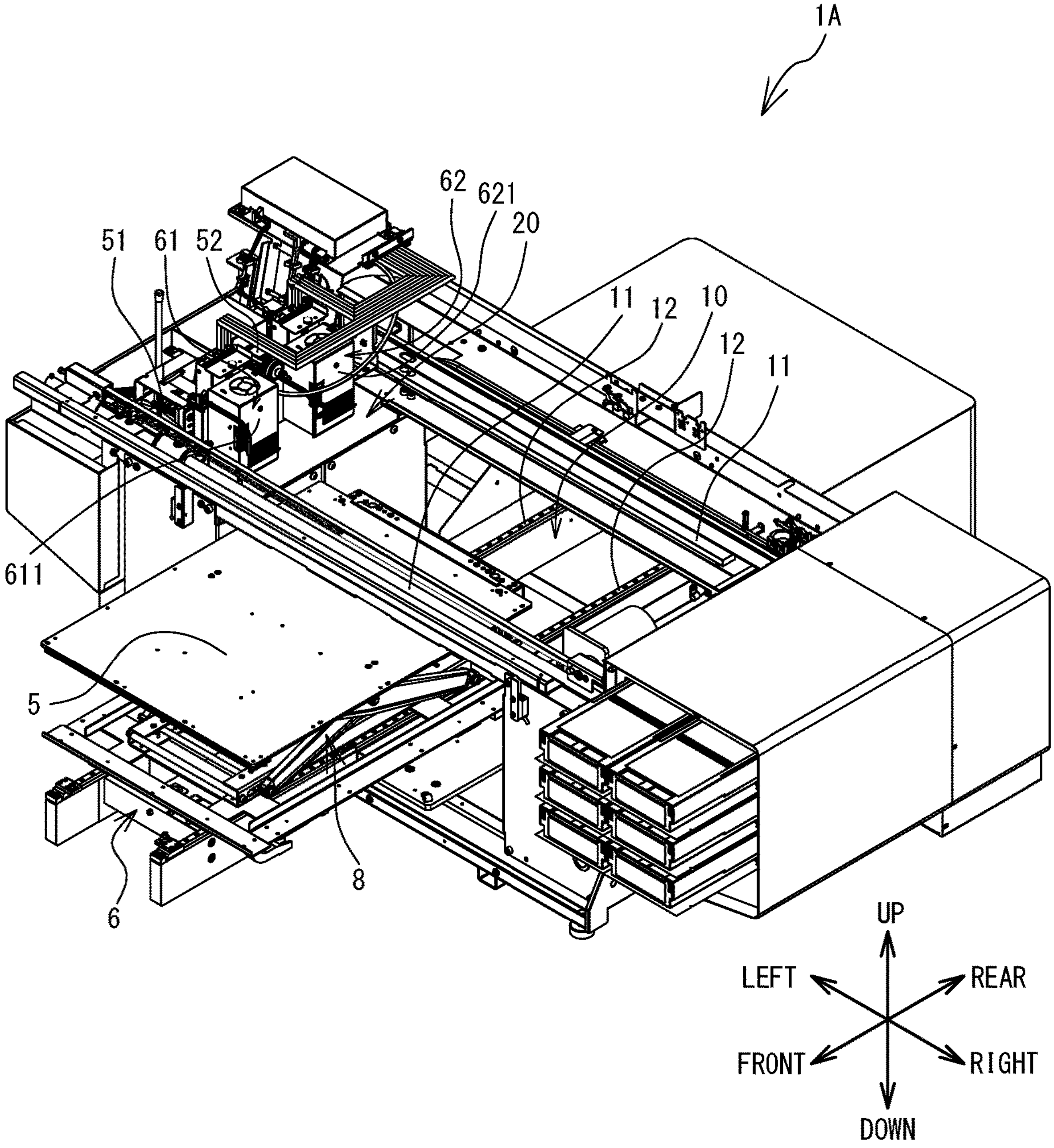
FIG. 1 is a perspective view of a printer.
Figure 2:
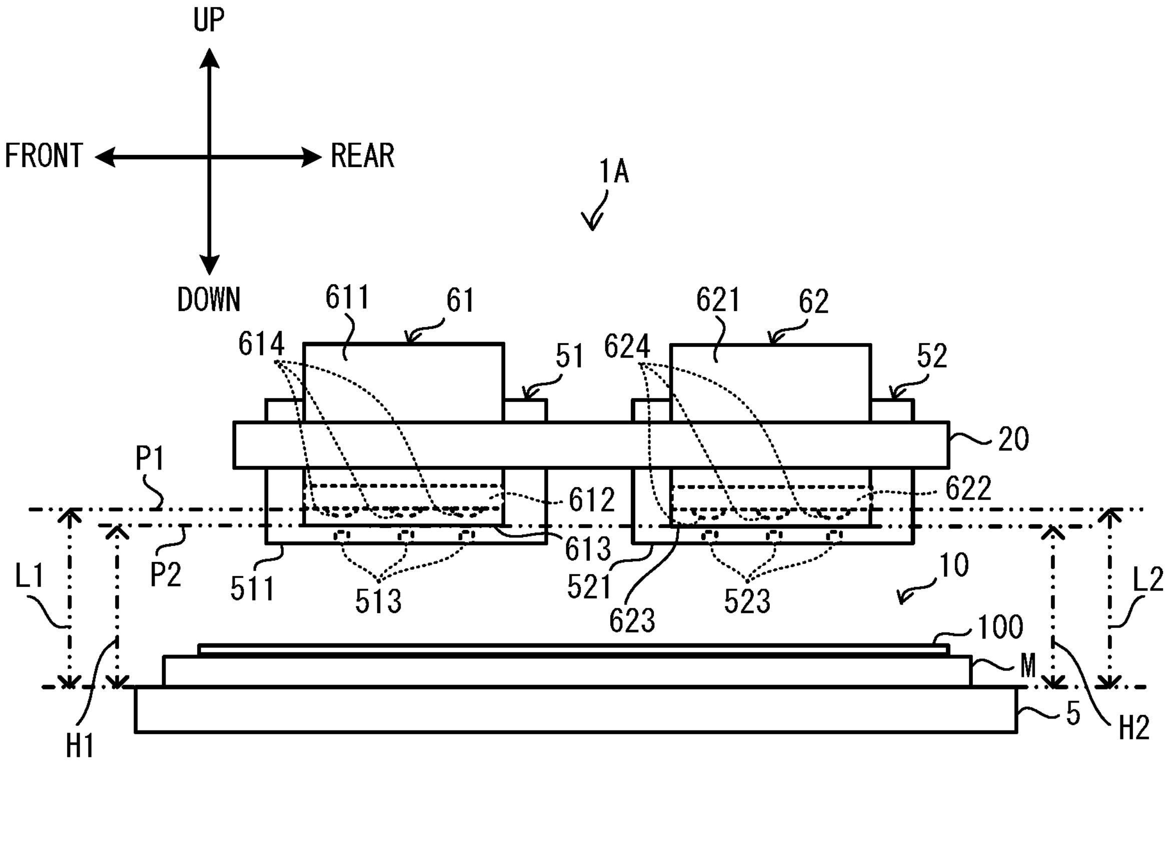
FIG. 2 is a schematic diagram of the printer as viewed from the right.

The printer 1A shown in FIG. 1 is an inkjet type UV printer, and performs printing in which ink is ejected onto an object to be printed M shown in FIG. 2, and ultraviolet light is irradiated onto the ejected ink. The object to be printed M is not limited to a particular medium, and has a plate shape or sheet shape, for example, and is configured by cloth, paper, plastic, metal, or ceramic, for example. The inks are ultraviolet curable, and are cured by the irradiating of the ultraviolet light.

The white ink is used to represent white color portions of an image, or as a base for the color inks. The color inks are ejected directly onto the object to be printed M, or onto the base formed by the white ink, and are used to print a color image. The clear ink has greater optical transparency than the white ink and the color inks. The clear ink is ejected onto the color image, and is used for protecting the color image.

A mechanical configuration of the printer 1A will be described with reference to FIG. 1 to FIG. 3. As shown in FIG. 1, the printer 1A is provided with a conveyance mechanism 6, a raising/lowering mechanism 8, a platen 5, a pair of rails 11, and a carriage 20. The conveyance mechanism 6 is provided on a lower portion of the printer 1A, and includes a pair of rails 12. The pair of rails 12 extend in the front-rear direction, and are aligned with each other in the left-right direction. Note that in the embodiment, "one member is aligned with another member in a specific direction" means that, as viewed from the specific direction, a part or all of the one member is disposed so as to overlap with a part or all of the other member (this also applies to the modified examples).

The raising/lowering mechanism 8 is provided on the upper side of the conveyance mechanism 6, and is supported by the pair of rails 12. The raising/lowering mechanism 8 moves in the front-rear direction along the pair of rails 12. The raising/lowering mechanism 8 is configured to expand and contract in the up-down direction.

The platen 5 is provided on the upper side of the raising/lowering mechanism 8. The platen 5 is a plate and extends in the front-rear direction and the left-right direction. The platen 5 has a rectangular shape in a plan view, and is supported by the raising/lowering mechanism 8. The object to be printed M shown in FIG. 2 is placed on the upper surface of the platen 5. The platen 5 is moved in the front-rear direction by the movement in the front-rear direction of the raising/lowering mechanism 8. The platen 5 is moved in the up-down direction by the expansion and contraction in the up-down direction of the raising/lowering mechanism 8.

The pair of rails 11 extend in the left-right direction and are aligned with each other in the front-rear direction. The carriage 20 is provided between the pair of rails 11 in the front-rear direction. The carriage 20 is a plate and extends in the front-rear direction and the left-right direction. The carriage 20 is supported by the pair of rails 11. The carriage 20 moves in the left-right direction along the pair of rails 11.

Figure 3:
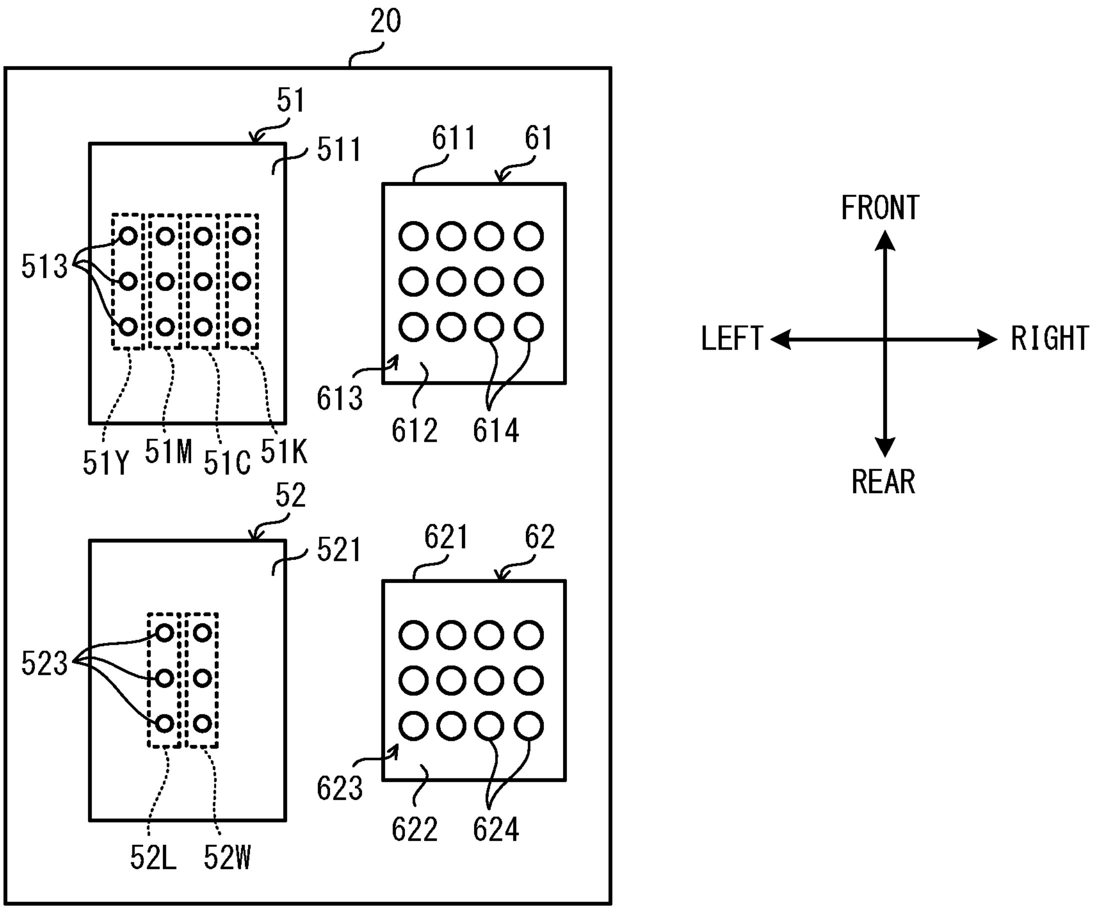
FIG. 3 is a schematic diagram of a carriage according to an embodiment, as viewed from below.

As shown in FIG. 1 to FIG. 3, a color head 51, a white/clear head 52, a color right-side lamp 61, and a white/clear right-side lamp 62 are installed on the carriage 20. The color head 51 and the white/clear head 52 have a cuboid shape, and are aligned with each other in the front-rear direction. The color head 51 is positioned at the front portion of the carriage 20. The white/clear head 52 is positioned to the rear of the color head 51.

The color right-side lamp 61 and the white/clear right-side lamp 62 have a cuboid shape and are aligned with each other in the front-rear direction. The color right-side lamp 61 is aligned to the right side of the color head 51. The white/clear right-side lamp 62 is aligned to the right side of the white/clear head 52. The color head 51, the white/clear head 52, the color right-side lamp 61, and the white/clear right-side lamp 62 are moved in the left-right direction by the movement in the left-right direction of the carriage 20.

As shown in FIG. 2 and FIG. 3, a nozzle surface 511 is formed at the lower surface of the color head 51. A nozzle surface 521 is formed at the lower surface of the white/clear head 52. The nozzle surfaces 511 and 521 are exposed downward from the carriage 20. As shown in FIG. 2, the nozzle surfaces 511 and 521 are positioned higher than the platen 5, and face the platen 5 in the up-down direction.

As shown in FIG. 3, nozzle rows 51Y, 51M, 51C, and 51K are formed in the nozzle surface 511. The nozzle rows 51Y, 51M, 51C, and 51K are aligned in the order of the nozzle rows 51Y, 51M, 51C, and 51K from the left toward the right. The nozzle rows 51Y, 51M, 51C, and 51K are respectively configured by a plurality of nozzles 513 being aligned in a single row in the front-rear direction. The plurality of nozzles 513 eject the inks downward. In the embodiment, the color head 51 ejects the yellow ink from the nozzle row 51Y, ejects the magenta ink from the nozzle row 51M, ejects the cyan ink from the nozzle row 51C, and ejects the black ink from the nozzle row 51K.

Nozzle rows 52L and 52W are formed in the nozzle surface 521. The nozzle row 52W is aligned to the right side of the nozzle row 52L. The nozzle rows 52L and 52W are respectively configured by a plurality of nozzles 523 being aligned in a single row in the front-rear direction. The plurality of nozzles 523 eject the ink downward. In the embodiment, the white/clear head 52 ejects the clear ink from the nozzle row 52L and ejects the white ink from the nozzle row 52W.

As shown in FIG. 2 and FIG. 3, the color right-side lamp 61 is provided with a housing 611, a substrate 612, and a plurality of ultraviolet light-emitting diodes 614. The housing 611 has a cuboid shape and is fixed to the carriage 20. The lower end of the housing 611 is open downward, and is exposed downward from the carriage 20. Hereinafter, a region surrounded by the lower end of the housing 611 will be referred to as a "facing surface 613." In other words, the facing surface 613 is a virtual lower surface of the housing 611. As shown in FIG. 2, the facing surface 613 is positioned higher than the platen 5, and faces the platen 5 in the up-down direction.

As shown in FIG. 2 and FIG. 3, the substrate 612 is provided at the interior of the housing 611. Note that in FIG. 2, the substrate 612 and the plurality of ultraviolet light-emitting diodes 614 hidden by the housing 611 are shown by dotted lines. The substrate 612 has a rectangular shape when viewed from below, and extends in the front-rear direction and the left-right direction. As shown in FIG. 2, the substrate 612 is positioned higher than the platen 5 and faces the platen 5 in the up-down direction. As shown in FIG. 3, the plurality of ultraviolet light-emitting diodes 614 are provided in a lattice pattern at the lower surface of the substrate 612. The plurality of ultraviolet light-emitting diodes 614 emit ultraviolet light by being illuminated.

The white/clear right-side lamp 62 is provided with a housing 621, a substrate 622, and a plurality of ultraviolet light-emitting diodes 624. The housing 621 has a cuboid shape and is fixed to the carriage 20. The lower end of the housing 621 is open downward, and is exposed downward from the carriage 20. Hereinafter, a region surrounded by the lower end of the housing 621 will be referred to as a "facing surface 623." In other words, the facing surface 623 is a virtual lower surface of the housing 621. As shown in FIG. 2, the facing surface 623 is positioned higher than the platen 5, and faces the platen 5 in the up-down direction.

As shown in FIG. 2 and FIG. 3, the substrate 622 is provided at the interior of the housing 621. Note that in FIG. 2, the substrate 622 and the plurality of ultraviolet light-emitting diodes 624 hidden by the housing 621 are shown by dotted lines. The substrate 622 has a rectangular shape when viewed from below, and extends in the front-rear direction and the left-right direction. As shown in FIG. 2, the substrate 622 is positioned higher than the platen 5 and faces the platen 5 in the up-down direction. As shown in FIG. 3, the plurality of ultraviolet light-emitting diodes 624 are provided in a lattice pattern at the lower surface of the substrate 622. The plurality of ultraviolet light-emitting diodes 624 emit ultraviolet light by being illuminated. The facing surface 623 is the region surrounded by the lower end of the housing 621. The color right-side lamp 61 and the white/clear right-side lamp 62 respectively irradiate the ultraviolet light downward by illuminating the ultraviolet light-emitting diodes 614 and 624.

As shown in FIG. 2, the color right-side lamp 61 and the white/clear right-side lamp 62 are disposed at the same position as each other in the up-down direction. More specifically, the plurality of ultraviolet light-emitting diodes 614 and the plurality of ultraviolet light-emitting diodes 624 are disposed at a position P1 that is the same for each in the up-down direction. In other words, the lower surface of the substrate 612 and the lower surface of the substrate 622 are positioned at the same position P1 as each other in the up-down direction. Thus, a distance L1 between the upper surface of the platen 5 and the ultraviolet light-emitting diodes 614 in the up-down direction is the same as a distance L2 between the upper surface of the platen 5 and the ultraviolet light-emitting diodes 624 in the up-down direction.

The housing 611 and the housing 621 are disposed at a position P2 that is the same for each in the up-down direction. In other words, the facing surface 613 and the facing surface 623 are positioned at the same position P2 as each other in the up-down direction. Thus, a distance H1 between the upper surface of the platen 5 and the facing surface 613 in the up-down direction is the same as a distance H2 between the upper surface of the platen 5 and the facing surface 623 in the up-down direction.

A printing operation by the printer 1A will be described with reference to FIG. 1 to FIG. 3. A region at which a movement path in the left-right direction of the carriage 20 overlaps, in the up-down direction, with a movement path in the front-rear direction of the platen 5 will be referred to as a "printing region 10" (refer to FIG. 1 and FIG. 2). The printing operation is performed in a state in which the platen 5 and the carriage 20 are positioned at the printing region 10. In the printing operation, a reciprocating movement of the carriage 20 in the left-right direction, and the forward or rearward movement of the platen 5 by a predetermined amount are repeated.

When the carriage 20 is moving from the right to the left, one or both of the color head 51 and the white/clear head 52 eject the inks onto the object to be printed M (refer to FIG. 2) on the platen 5. In this way, the ink lands on the object to be printed M. Hereinafter, the layer of ink that is formed by the ink that has landed on the object to be printed M will simply be referred to as an "ink layer 100" (refer to FIG. 2).

Furthermore, when the carriage 20 is moving from the right to the left, one or both of the color right-side lamp 61 and the white/clear right-side lamp 62 irradiate the ultraviolet light onto the object to be printed M (refer to FIG. 2) on the platen 5. The color right-side lamp 61 and the white/clear right-side lamp 62 are respectively positioned, with respect to the color head 51 and the white/clear head 52, on the opposite side to the progress direction of the carriage 20 (on the right side). Thus, when the carriage 20 moves from the right to the left, the ultraviolet light irradiated onto the object to be printed M is irradiated onto the ink layer 100 (refer to FIG. 2) formed on the object to be printed M in the current movement of the carriage 20 from the right to the left. In this way, the ink layer 100 is cured.

When the carriage 20 is moving from the left to the right, both the color head 51 and the white/clear head 52 stop the ejection of the inks onto the object to be printed M on the platen 5. When the carriage 20 is moving from the left to the right, one or both of the color right-side lamp 61 and the white/clear right-side lamp 62 irradiate the ultraviolet light onto the object to be printed M on the platen 5.

When the carriage 20 moves from the left to the right, the ultraviolet light irradiated onto the object to be printed M is irradiated onto the ink layer 100 (refer to FIG. 2) formed on the object to be printed M in the movement of the carriage 20 from the right to the left in a scan a predetermined number of times previous to a current scan. In this way, an integrated amount of the ultraviolet light irradiated onto the ink layer 100 increases. Hereinafter, the integrated amount per unit area of the ultraviolet light irradiated onto the ink layer 100 will simply be referred to as the "integrated amount."

The electrical configuration of the printer 1A will be described with reference to FIG. 4. The printer 1A is provided with a control board 40. A CPU 41, a ROM 42, a RAM 43, and a flash memory 44 are provided at the control board 40. The CPU 41 controls the printer 1A, and is electrically connected to the ROM 42, the RAM 43, and the flash memory 44.

The ROM 42 stores a control program used by the CPU 41 to control the operations of the printer 1A, information necessary for the CPU 41 when executing various programs, and the like. The ROM 42 stores, in association with each other, rotation angles of each of a main scanning motor 31, a sub-scanning motor 32, and a raising/lowering motor 34 to be described later, a position of the carriage 20 in the left-right direction, a position of the platen 5 in the front-rear direction, and a position of the platen 5 in the up-down direction, respectively, for example. The RAM 43 temporarily stores various data and the like used by the control program. The flash memory 44 is non-volatile, and stores print data and the like for performing the printing.

The CPU 41 is electrically connected to the main scanning motor 31, the sub-scanning motor 32, the raising/lowering motor 34, a head drive portion 33, the plurality of ultraviolet light-emitting diodes 614, the plurality of ultraviolet light-emitting diodes 624, and an operation portion 37. The main scanning motor 31, the sub-scanning motor 32, the raising/lowering motor 34, the head drive portion 33, the plurality of ultraviolet light-emitting diodes 614, and the plurality of ultraviolet light-emitting diodes 624 are respectively driven under control of the CPU 41.

The driving of the main scanning motor 31 causes the carriage 20 shown in FIG. 1 to move in the left-right direction. The driving of the sub-scanning motor 32 causes the raising/lowering mechanism 8 shown in FIG. 1 to move in the front-rear direction. The driving of the raising/lowering motor 34 causes the raising/lowering mechanism 8 shown in FIG. 1 to expand and contract in the up-down direction.

The main scanning motor 31, the sub-scanning motor 32, and the raising/lowering motor 34 are respectively provided with encoders 311, 321, and 341. The encoders 311, 321, and 341 respectively detect the rotation angle of the main scanning motor 31, the sub-scanning motor 32, and the raising/lowering motor 34, and output a detection signal to the CPU 41.

On the basis of the detection signal from the encoder 311, the CPU 41 can identify the position of the carriage 20 in the left-right direction. On the basis of the detection signal from the encoder 321, the CPU 41 can identify the position of the platen 5 shown in FIG. 1 in the front-rear direction. On the basis of the detection signal from the encoder 341, the CPU 41 can identify the position of the platen 5 shown in FIG. 1 in the up-down direction.

The head drive portion 33 is configured by piezoelectric elements or heating elements, and, when driven, causes the color head 51 or the white/clear head 52 shown in FIG. 1 to eject the ink. The operation portion 37 is a touch panel or the like, and outputs information to the CPU 41 in accordance with an operation by a user. As a result of the user operating the operation portion 37, a print command for starting the printing by the printer 1A or the like can be input to the printer 1A. By the user operating the operation portion 37, a print mode, which is one of a normal print mode and a gloss print mode, can be set on the printer 1A.

Figure 5:
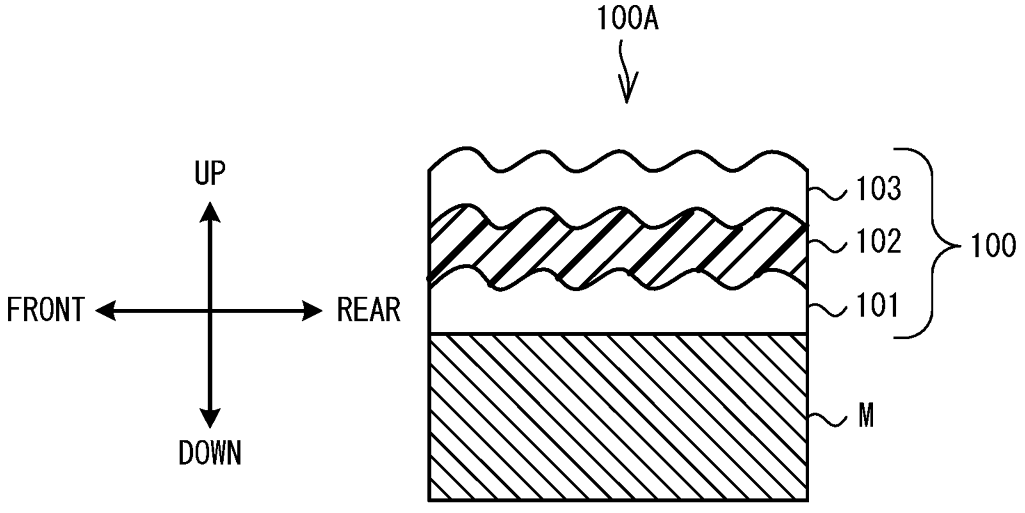
FIG. 5 is a schematic diagram showing a cross section of a matte finish printed object.
Figure 6:
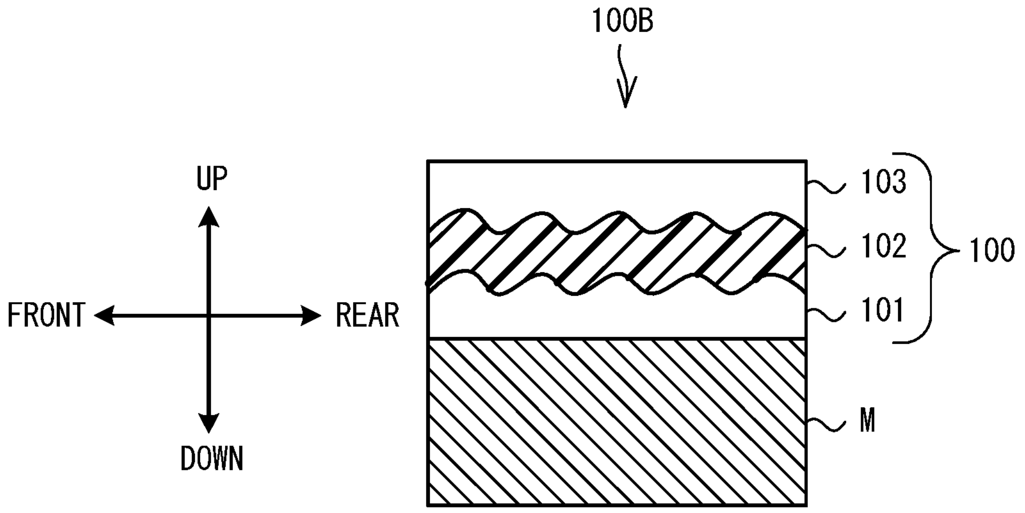
FIG. 6 is a schematic diagram showing a cross section of a gloss finish printed object.

A matte finish printed object 100A, and a gloss finish printed object 100B will be described with reference to FIG. 5 and FIG. 6. FIG. 5 and FIG. 6 show an example in which, as the ink layer 100, a white ink layer 101, a color ink layer 102, and a clear ink layer 103 are formed from the upper surface of the object to be printed M upward, in order of the white ink layer 101, the color ink layer 102, and the clear ink layer 103. In other words, in the matte finish printed object 100A shown in FIG. 5 and the gloss finish printed object 100B shown in FIG. 6, the clear ink layer 103 is the uppermost surface layer.

The matte finish printed object 100A shown in FIG. 5 is formed by the uppermost surface layer (the clear ink layer 103) being cured in a state in which the smoothing of the uppermost surface layer is relatively unadvanced. Thus, the matte finish printed object 100A does not have a glossy finish or has a comparatively low glossy finish. The gloss finish printed object 100B shown in FIG. 6 is formed by the uppermost surface layer (the clear ink layer 103) being cured in a state in which the smoothing of the uppermost surface layer is relatively advanced. Thus, the gloss finish printed object 100B has a glossier finish than the matte finish printed object 100A.

The smoothing of the ink layer 100 will be described. A degree of advancement of the smoothing of the ink layer 100 changes depending on a time period from when the ink has landed on the object to be printed M to when the landed ink is irradiated by the ultraviolet light, and the like. Hereinafter, the time period from when the ink has landed on the object to be printed M to when the landed ink is irradiated by the ultraviolet light will be referred to as a "time period up to the irradiation." The smoothing of the ink layer 100 advances up to when the ink layer 100 is irradiated by the ultraviolet light. Thus, the longer the time period up to the irradiation, the more the smoothing of the ink layer 100 is likely to have advanced.

As a result of performing main processing to be described below, in the normal print mode, the printer 1A causes the time period up to the irradiation, when the uppermost surface layer (the clear ink layer 103) is irradiated by the ultraviolet light, to be comparatively short. In this way, the uppermost surface layer is cured before the smoothing of the uppermost surface layer is relatively advanced and thus, in the normal print mode, the printer 1A can create the matte finish printed object 100A shown in FIG. 5.

As a result of performing the main processing to be described below, in the gloss print mode, the printer 1A causes the time period up to the irradiation, when the uppermost surface layer (the clear ink layer 103) is irradiated by the ultraviolet light, to be comparatively long. In this way, the uppermost surface layer is cured in a state in which the smoothing of the uppermost surface layer is relatively advanced, and thus, in the gloss print mode, the printer 1A can create the gloss finish printed object 100B shown in FIG. 6.

The main processing will be described with reference to FIG. 7. The user places the object to be printed M on the platen 5 shown in FIG. 2. The user operates the operation portion 37 shown in FIG. 4, and inputs the print command to the printer 1A. When the print command is input, the CPU 41 performs the main processing shown in FIG. 7 by reading out and executing the control program from the ROM 42.

Hereinafter, the description will be given using cases in which the matte finish printed object 100A shown in FIG. 5 or the gloss finish printed object 100B shown in FIG. 6 are created as examples. When the main processing shown in FIG. 7 is started, it is assumed that the platen 5 is positioned at a set position shown in FIG. 1, and the carriage 20 is positioned at a stand-by position shown in FIG. 1. The set position is at the front end of a movement range, in the front-rear direction, of the platen 5, and is a position of the platen 5 when the object to be printed M is set on the platen 5. The stand-by position is a left end of a movement range, in the left-right direction, of the carriage 20.

When, in main scanning processing to be described below, a setting is made to eject the ink, this will be referred to as "setting the ink to ON," and when a setting is made to stop the ejection of the ink, this will be referred to as "setting the ink to OFF." Note that the setting to eject in the ink in the main scanning processing means, during the execution of the main scanning processing, setting a state in which the ink can be ejected such that the ink lands at predetermined positions on the object to be printed M in accordance with the print data.

When, in the main scanning processing to be described later, a setting is made to illuminate the ultraviolet light-emitting diodes 614, this will be referred to as "switching the color right-side lamp 61 ON," and when a setting is made to extinguish the ultraviolet light-emitting diodes 614, this will be referred to as "switching the color right-side lamp 61 OFF." When, in the main scanning processing, a setting is made to illuminate the ultraviolet light-emitting diodes 624, this will be referred to as "switching the white/clear right-side lamp 62 ON," and when a setting is made to extinguish the ultraviolet light-emitting diodes 624, this will be referred to as "switching the white/clear right-side lamp 62 OFF." Note that the setting to perform the illumination in the main scanning processing refers to all the ultraviolet light-emitting diodes 614 and 624 being constantly illuminated during the execution of the main scanning processing.

When the main processing is started, the CPU 41 acquires, from the flash memory 44, the print data specified by the print command, and stores the acquired print data in the RAM 43 (step S100). The CPU 41 controls the sub-scanning motor 32 on the basis of the detection result from the encoder 321 shown in FIG. 4, and moves the platen 5 shown in FIG. 2 to the rear, to a platen print start position (not shown in the drawings) (step S101). The platen print start position is a position of the platen 5 when a front end of a region (not shown in the drawings) on which an image is to be printed, of the object to be printed M shown in FIG. 2, is positioned further to the rear than the white/clear head 52 shown in FIG. 2. The CPU 41 controls the main scanning motor 31 on the basis of the detection result from the encoder 311 shown in FIG. 4, and moves the carriage 20 to the right from the stand-by position shown in FIG. 1, to a carriage print start position (step S101). The carriage print start position is a position of the carriage 20 when the color head 51 and the white/clear head 52 shown in FIG. 2 are positioned further to the right than a right end of the region (not shown in the drawings) on which the image is to be printed, of the object to be printed M shown in FIG. 2.

The CPU 41 performs white/color print processing (step S102). In the white/color print processing, while the platen 5 moves forward from the platen print start position, the white ink layer 101 and the color ink layer 102 shown in FIG. 5 and FIG. 6 are formed on the object to be printed M. The CPU 41 refers to a print mode setting in the flash memory 44 (step S103). On the basis of a referred result, the CPU 41 determines whether the set print mode is the gloss print mode (step S104).

Figure 4:
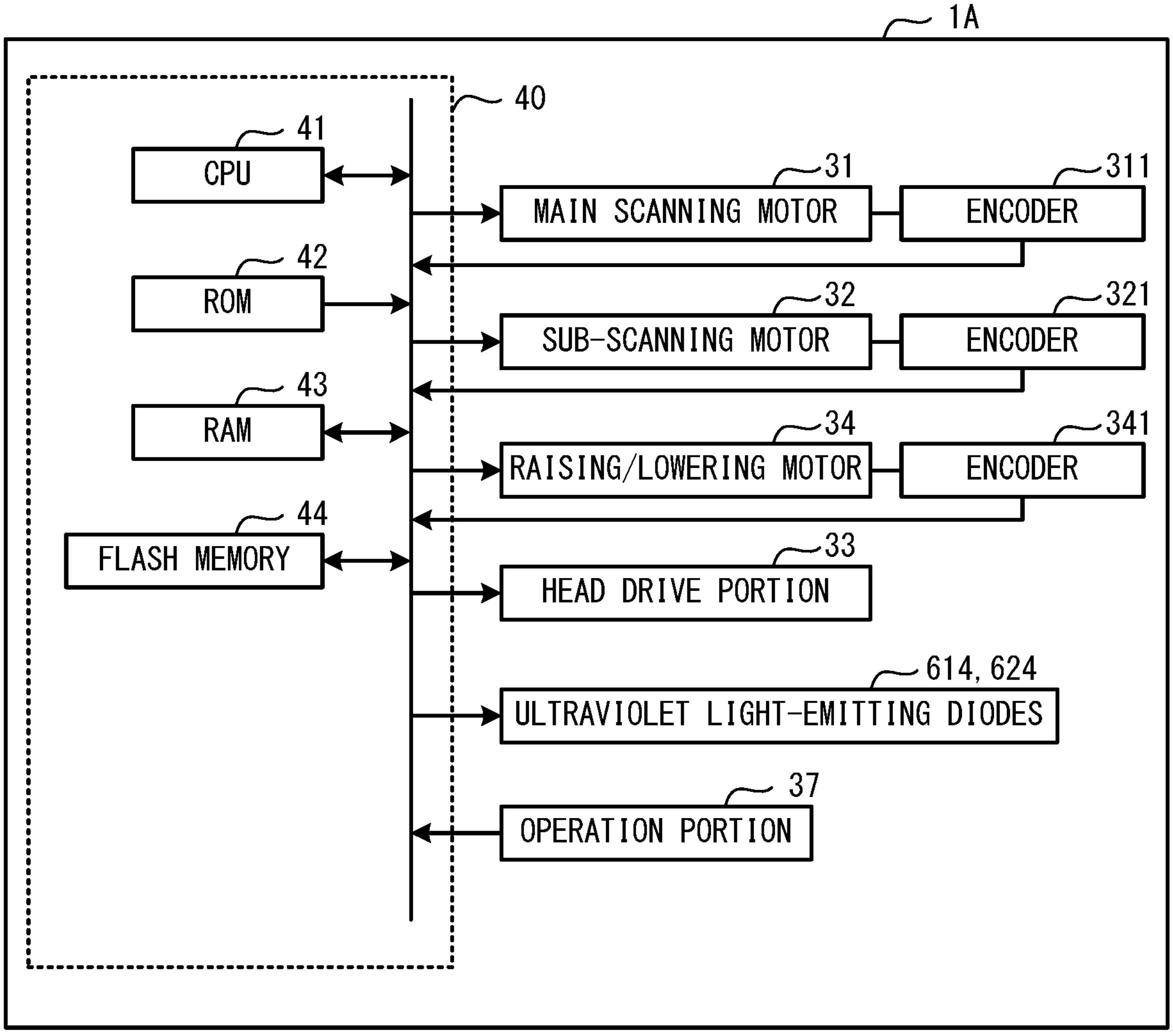
FIG. 4 is a block diagram showing an electrical configuration of the printer.

When the set print mode is the normal print mode (no at step S104), the CPU 41 controls the sub-scanning motor 32 on the basis of the detection result from the encoder 321 shown in FIG. 4, and moves the platen 5 shown in FIG. 2 to the rear, to the platen print start position (not shown in the drawings) (step S105). As described above, when the platen 5 is positioned at the platen print start position, of the object to be printed M shown in FIG. 2, the front end of the region (not shown in the drawings) on which the image is to be printed, of the object to be printed M, is disposed further to the rear than the white/clear head 52 shown in FIG. 2.

The CPU 41 performs normal clear print processing (step S106). In the normal clear print processing, while the platen 5 moves forward from the platen print start position, the clear ink layer 103 shown in FIG. 5 is formed on the color ink layer 102, on the object to be printed M. In this way, the matte finish printed object 100A shown in FIG. 5 is created. The CPU 41 ends the main processing.

When the set print mode is the gloss print mode (yes at step S104), the CPU 41 controls the sub-scanning motor 32 on the basis of the detection result from the encoder 321 shown in FIG. 4, and moves the platen 5 shown in FIG. 2 to the rear, to the platen print start position (not shown in the drawings) (step S107). As described above, when the platen 5 is positioned at the platen print start position, the front end of the region (not shown in the drawings) on which the image is to be printed, of the object to be printed M shown in FIG. 2, is disposed further to the rear than the white/clear head 52 shown in FIG. 2.

The CPU 41 performs clear gloss print processing (step S108). In the clear gloss print processing, while the platen 5 moves forward from the platen print start position, the clear ink layer 103 shown in FIG. 6 is formed on the color ink layer 102, on the object to be printed M. In this way, the gloss finish printed object 100B shown in FIG. 6 is created. The CPU 41 ends the main processing.

The white/color print processing will be described with reference to FIG. 8. When the white/color print processing is started, the CPU 41 sets "left" as the main scanning direction (step S141). The CPU 41 sets the white ink to "ON" (step S142). The CPU 41 sets the color ink to "ON" (step S143). The CPU 41 sets the clear ink to "OFF" (step S144). The CPU 41 sets the white/clear right-side lamp 62 to "ON" (step S145). The CPU 41 sets the color right-side lamp 61 to "ON" (step S146).

The CPU 41 performs the main scanning processing on the basis of the settings at step S141 to step S146 (step S147). In the main scanning processing, movement control, ejection control, and irradiation control are performed. In the main scanning processing at step S147, in the movement control, the CPU 41 drives the main scanning motor 31 on the basis of the detection result from the encoder 311 shown in FIG. 4, and moves the carriage 20 shown in FIG. 1 to the left from the right end of the printing region 10 to the left end of the printing region 10. While executing the movement control, in the ejection control, the CPU 41 drives the head drive portion 33 shown in FIG. 4 on the basis of the print data, and causes the white/clear head 52 shown in FIG. 3 to eject the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 drives the head drive portion 33 shown in FIG. 4 on the basis of the print data and causes the color head 51 shown in FIG. 3 to eject the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear right-side lamp 62. The ultraviolet light from the white/clear right-side lamp 62 is irradiated onto the white ink layer 101 shown in FIG. 5 and FIG. 6. While executing the movement control, in the irradiation control, the CPU 41 causes the plurality of ultraviolet light-emitting diodes 614 shown in FIG. 2 to be illuminated, and irradiates the ultraviolet light toward to the object to be printed M from the color right-side lamp 61. The ultraviolet light from the color right-side lamp 61 is irradiated onto the color ink layer 102 shown in FIG. 5 and FIG. 6.

The CPU 41 sets "right" as the main scanning direction (step S151). The CPU 41 sets the white ink to "OFF" (step S152). The CPU 41 sets the color ink to "OFF" (step S153). The CPU 41 sets the clear ink to "OFF" (step S154). The CPU 41 sets the white/clear right-side lamp 62 to "ON" (step S155). The CPU 41 sets the color right-side lamp 61 to "ON" (step S156).

The CPU 41 performs the main scanning processing on the basis of the settings at step S151 to step S156 (step S157). In the main scanning processing at step S157, in the movement control, the CPU 41 drives the main scanning motor 31 on the basis of the detection result from the encoder 311 shown in FIG. 4, and moves the carriage 20 shown in FIG. 1 to the right from the left end of the printing region 10 to the right end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear right-side lamp 62. The ultraviolet light from the white/clear right-side lamp 62 is irradiated onto the white ink layer 101 shown in FIG. 5 and FIG. 6. While executing the movement control, in the irradiation control, the CPU 41 causes the plurality of ultraviolet light-emitting diodes 614 shown in FIG. 2 to be illuminated, and irradiates the ultraviolet light toward to the object to be printed M from the color right-side lamp 61. The ultraviolet light from the color right-side lamp 61 is irradiated onto the color ink layer 102 shown in FIG. 5 and FIG. 6.

On the basis of the print data, the CPU 41 determines whether, of the object to be printed M shown in FIG. 5 and FIG. 6, the formation of both the white ink layer 101 and the color ink layer 102 is complete on all of the region on which the image is to be printed (step S158). When, of the object to be printed M shown in FIG. 5 and FIG. 6, the formation of either of the white ink layer 101 or the color ink layer 102 is not complete on the region on which the image is to be printed is not complete (no at step S158), the CPU 41 sets "forward" as a sub-scanning direction (step S161). The CPU 41 performs sub-scanning processing on the basis of the setting at step S161 (step S162). In the sub-scanning processing at step S162, the CPU 41 controls the sub-scanning motor 32 on the basis of the detection result from the encoder 321 shown in FIG. 4, and moves the platen 5 shown in FIG. 2 forward. When the platen 5 shown in FIG. 2 moves forward by a predetermined movement amount, the CPU 41 stops the sub-scanning motor 32 shown in FIG. 4. The CPU 41 shifts the processing to step S141.

The CPU 41 repeats the main scanning processing (step S147 and step S157) and the sub-scanning processing (step S162) until, of the object to be printed M shown in FIG. 5 and FIG. 6, the formation of both the white ink layer 101 and the color ink layer 102 is complete on all the region on which the image is to be printed. When, of the object to be printed M shown in FIG. 5 and FIG. 6, the formation of both the white ink layer 101 and the color ink layer 102 is complete on the region on which the image is to be printed (yes at step S158), the CPU 41 returns the processing to the main processing shown in FIG. 7.

A formation mode of the white ink layer 101 and the color ink layer 102 in the white/color print processing will be described with reference to FIG. 9. Below, "N" and "K" are natural numbers. FIG. 9 shows the white ink layer 101 using oblique solid lines and the color ink layer 102 using vertical solid lines. FIG. 9 shows a positional relationship in the front-rear direction between the carriage 20 and the object to be printed M when the N-th main scanning processing at step S157 shown in FIG. 8 has been completed.

Figure 8:
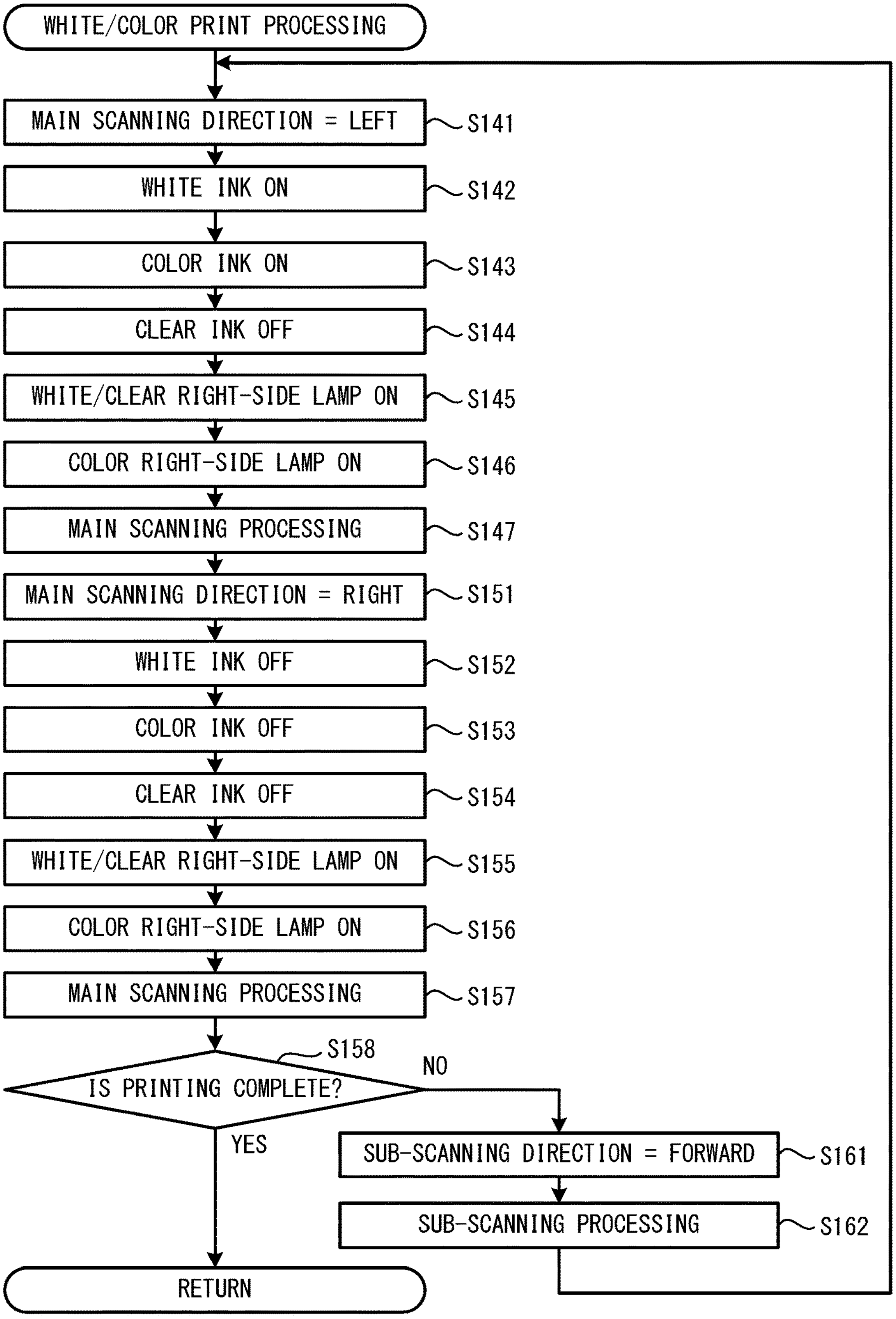
FIG. 8 is a flowchart of white/color print processing according to the embodiment.
Figure 9:
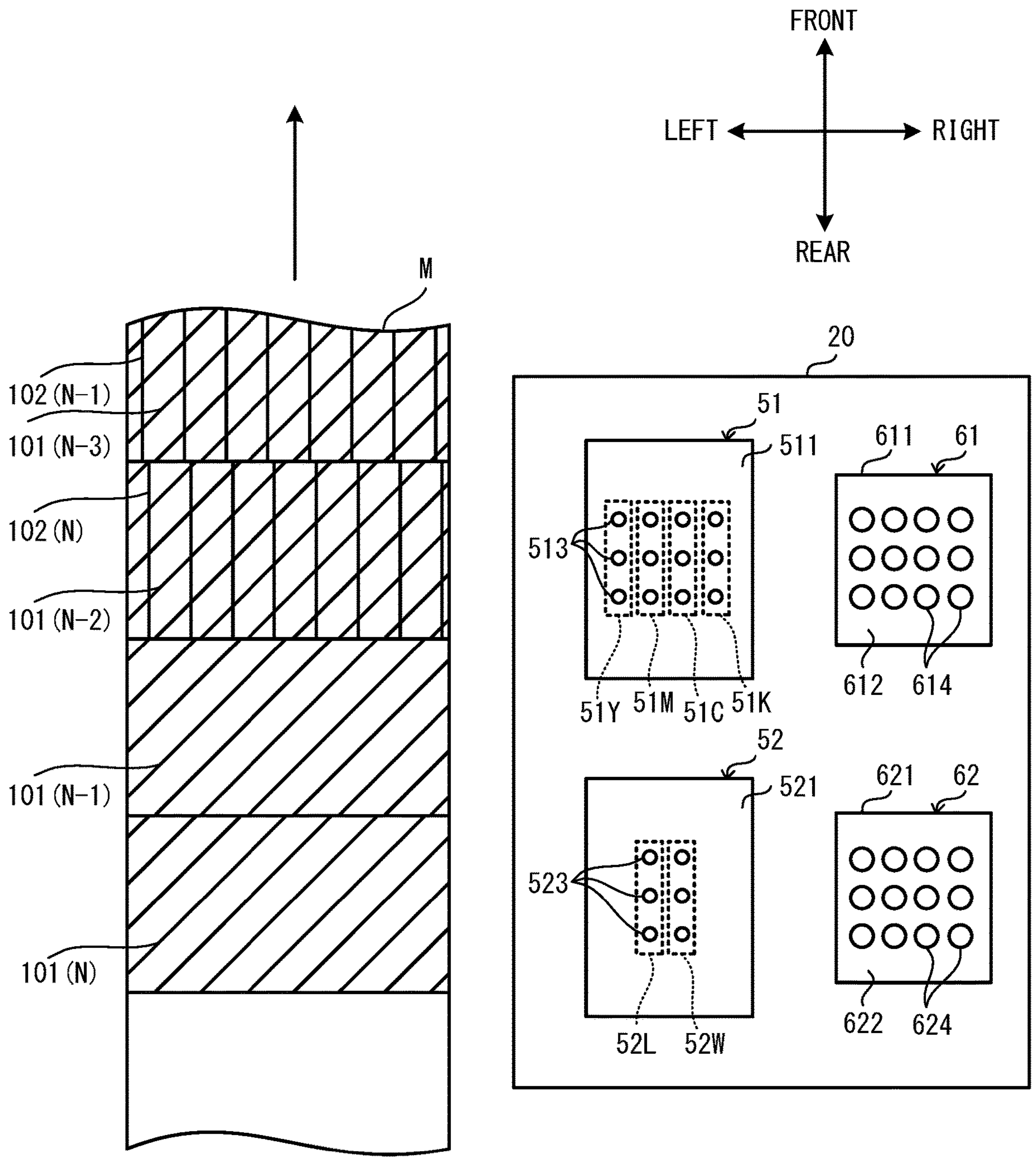
FIG. 9 is a diagram illustrating a formation mode of a white ink layer and a color ink layer by the white/color print processing, according to the embodiment.

In the N-th main scanning processing at step S147 shown in FIG. 8, a white ink layer 101 (N) is formed on the object to be printed M by the ejection of the white ink from the white/clear head 52. According to the configuration of the embodiment, in the main scanning processing at step S147 shown in FIG. 8, the carriage 20 moves from the right to the left, and the white/clear right-side lamp 62 is positioned further to the right than the white/clear head 52, that is, on the opposite side to the movement direction of the carriage 20. Thus, the ultraviolet light generated from the white/clear right-side lamp 62 during the N-th main scanning processing at step S147 shown in FIG. 8 is irradiated onto the white ink layer 101 (N). The time until the irradiation of the white ink layer 101 (N) is comparatively short, and thus, the white ink layer 101 (N) is cured in a state in which the smoothing has not been performed, or in which the smoothing is relatively unadvanced.

The ultraviolet light generated from the white/clear right-side lamp 62 during the N-th main scanning processing at step S157 shown in FIG. 8 is irradiated onto the white ink layer 101 (N). In this way, since the integrated amount irradiated onto the white ink layer 101 (N) is increased, the printer 1A can reliably cure the white ink layer 101 (N).

In the sub-scanning processing at step S162 shown in FIG. 8, the platen 5 shown in FIG. 2 moves from the rear to the front, that is, moves in the direction from the white/clear right-side lamp 62 toward the color right-side lamp 61. As a result, in the N-th main scanning processing at step S147 described above, that is, in the main scanning processing at step S147 in which the white ink layer 101 (N) is formed, a color ink layer 102 (N) is further formed on a white ink layer 101 (N−K), on the object to be printed M, by the ejection of the color inks from the color head 51. Note that FIG. 9 shows an example of a case in which K is 2.

According to the configuration of the embodiment, in the main scanning processing at step S147, the carriage 20 moves from the right to the left, and the color right-side lamp 61 is positioned further to the right than the color head 51, that is, on the opposite side to the movement direction of the carriage 20. Thus, the ultraviolet light generated from the color right-side lamp 61 during the N-th main scanning processing at step S147 shown in FIG. 8 is irradiated onto a color ink layer 102 (N). In this way, the time until the irradiation of the color ink layer 102 (N) is comparatively short, and thus, the color ink layer 102 (N) is cured in a state in which the smoothing has not been performed, or in which the smoothing is relatively unadvanced.

The ultraviolet light generated from the color right-side lamp 61 during the N-th main scanning processing at step S157 shown in FIG. 8 is further irradiated onto the color ink layer 102 (N). In this way, since the integrated amount irradiated onto the color ink layer 102 (N) is increased, the printer 1A can reliably cure the color ink layer 102 (N).

As described above, the ultraviolet light is irradiated onto the white ink layer 101 and the color ink layer 102 comparatively quickly. Thus, the white ink layer 101 and the color ink layer 102 are cured in the state in which the smoothing has not been performed, or in which the smoothing is relatively unadvanced. Thus, the white ink layer 101 and the color ink layer 102 shown in FIG. 5 and FIG. 6 have surface unevenness.

The normal clear print processing will be described with reference to FIG. 10. The CPU 41 sets "left" as the main scanning direction (step S201). The CPU 41 sets the white ink to "OFF" (step S202). The CPU 41 sets the color ink to "OFF" (step S203). The CPU 41 sets the clear ink to "ON" (step S204). The CPU 41 sets the white/clear right-side lamp 62 to "ON" (step S205). The CPU 41 sets the color right-side lamp 61 to "OFF" (step S206).

The CPU 41 performs the main scanning processing on the basis of the settings at step S201 to step S206 (step S207). In the main scanning processing at step S207, in the movement control, the CPU 41 drives the main scanning motor 31 on the basis of the detection result from the encoder 311 shown in FIG. 4, and moves the carriage 20 shown in FIG. 1 to the left from the right end of the printing region 10, to the left end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 drives the head drive portion 33 shown in FIG. 4 on the basis of the print data and causes the white/clear head 52 shown in FIG. 3 to eject the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear right-side lamp 62. The ultraviolet light from the white/clear right-side lamp 62 is irradiated onto the clear ink layer 103 shown in FIG. 5. While executing the movement control, in the irradiation control, the CPU 41 causes the plurality of ultraviolet light-emitting diodes 614 shown in FIG. 2 to be extinguished, and stops the irradiation of the ultraviolet light onto the object to be printed M from the color right-side lamp 61.

The CPU 41 sets "right" as the main scanning direction (step S211). The CPU 41 sets the white ink to "OFF" (step S212). The CPU 41 sets the color ink to "OFF" (step S213). The CPU 41 sets the clear ink to "OFF" (step S214). The CPU 41 sets the white/clear right-side lamp 62 to "ON" (step S215). The CPU 41 sets the color right-side lamp 61 to "OFF" (step S216).

The CPU 41 performs the main scanning processing on the basis of the settings at step S211 to step S216 (step S217). In the main scanning processing at step S217, in the movement control, the CPU 41 drives the main scanning motor 31 on the basis of the detection result from the encoder 311 shown in FIG. 4, and moves the carriage 20 shown in FIG. 1 to the right from the left end of the printing region 10, to the right end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear right-side lamp 62. The ultraviolet light from the white/clear right-side lamp 62 is irradiated onto the clear ink layer 103 shown in FIG. 5. While executing the movement control, in the irradiation control, the CPU 41 causes the plurality of ultraviolet light-emitting diodes 614 shown in FIG. 2 to be extinguished, and stops the irradiation of the ultraviolet light onto the object to be printed M from the color right-side lamp 61.

On the basis of the print data, the CPU 41 determines whether, of the object to be printed M shown in FIG. 5, the formation of the clear ink layer 103 is complete on all of the region on which the image is to be printed (step S218). When, of the object to be printed M shown in FIG. 5, the formation of the clear ink layer 103 is not complete on the region on which the image is to be printed (no at step S218), the CPU 41 sets "forward" as the sub-scanning direction (step S221). The CPU 41 performs the sub-scanning processing on the basis of the setting at step S221 (step S222). In the sub-scanning processing at step S222, the CPU 41 controls the sub-scanning motor 32 on the basis of the detection result from the encoder 321 shown in FIG. 4, and moves the platen 5 shown in FIG. 2 forward. When the platen 5 moves forward by the predetermined movement amount, the CPU 41 stops the sub-scanning motor 32 shown in FIG. 4. The CPU 41 shifts the processing to step S201.

The CPU 41 repeats the main scanning processing (step S207 and step S217) and the sub-scanning processing (step S222) until, of the object to be printed M shown in FIG. 5, the formation of the clear ink layer 103 is complete on all the region on which the image is to be printed. When, of the object to be printed M shown in FIG. 5, the formation of the clear ink layer 103 is complete on all the region on which the image is to be printed (yes at step S218), the CPU 41 returns the processing to the main processing shown in FIG. 7.

A formation mode of the clear ink layer 103 in the normal clear print processing will be described with reference to FIG. 11. FIG. 11 shows the white ink layer 101 using oblique solid lines, the color ink layer 102 using vertical solid lines, and the clear ink layer 103 using oblique dotted lines. In the description of the formation mode of the clear ink layer 103 in the normal clear print processing, FIG. 11 shows a positional relationship in the front-rear direction between the carriage 20 and the object to be printed M when the N-th main scanning processing at step S217 shown in FIG. 10 has been completed.

Figure 10:
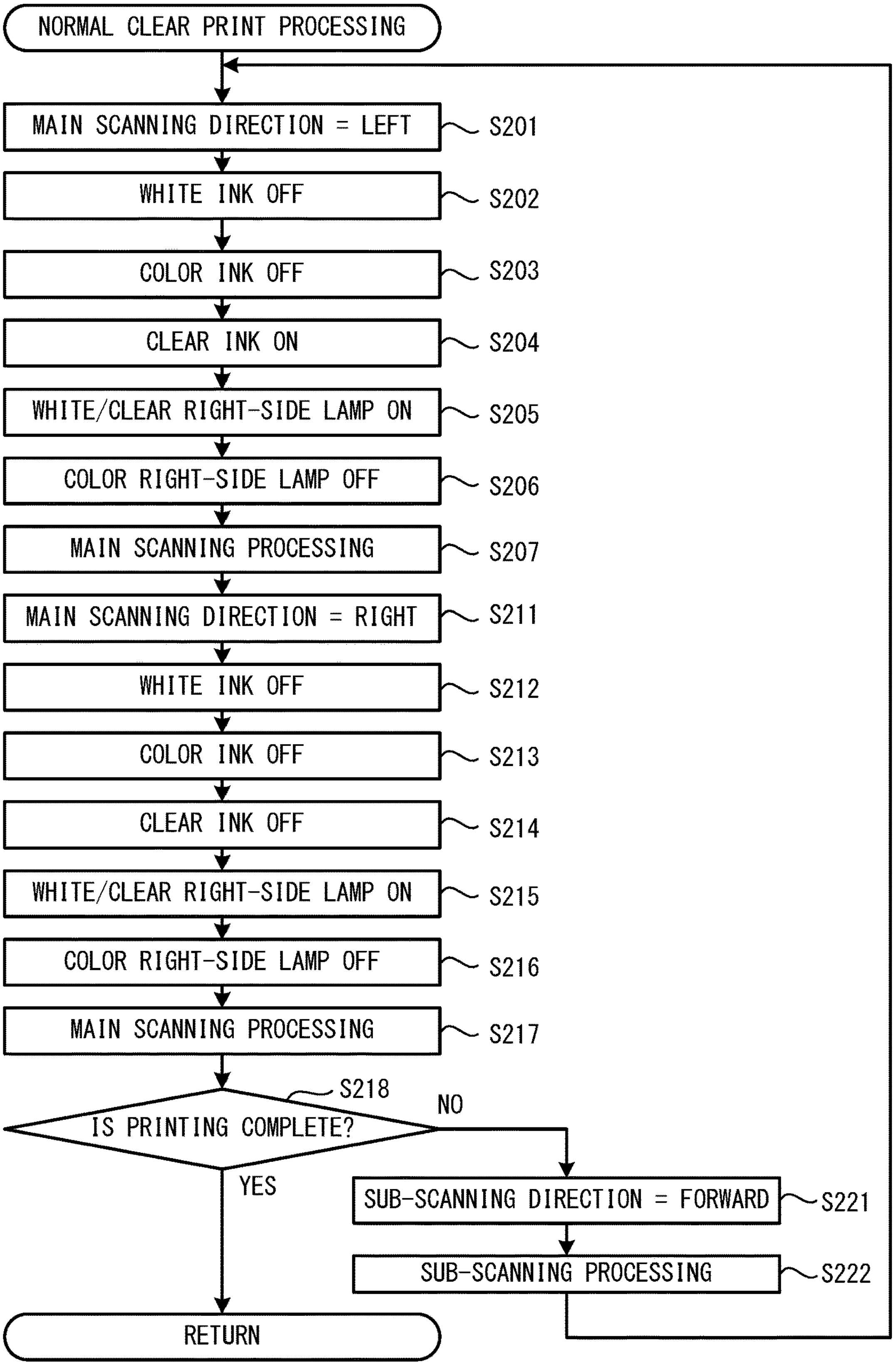
FIG. 10 is a flowchart of normal clear print processing according to the embodiment.
Figure 11:
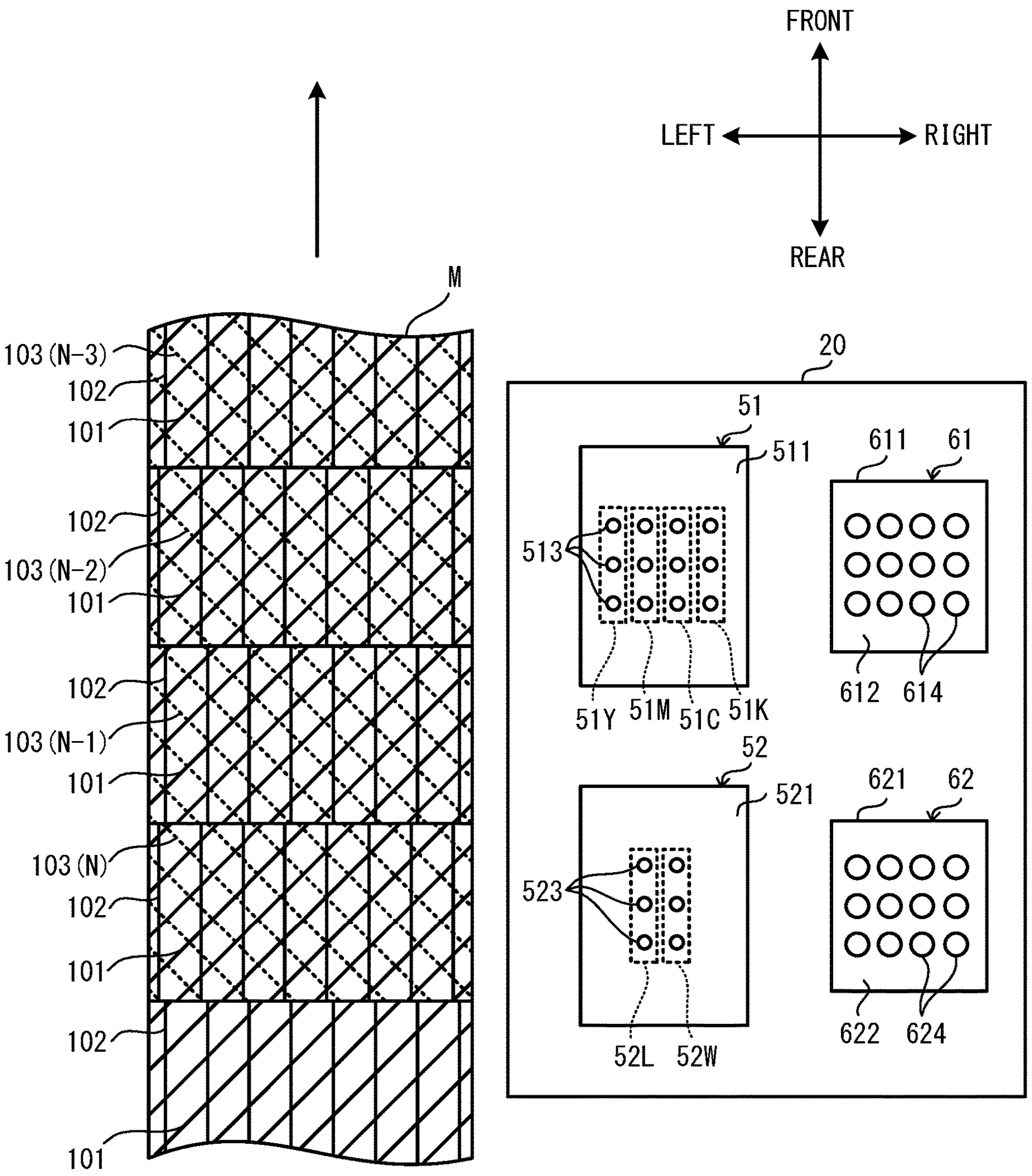
FIG. 11 is a diagram illustrating a formation mode of a clear ink layer by the normal clear print processing or clear gloss print processing, according to the embodiment.

In the normal print mode, in the N-th main scanning processing at step S207 shown in FIG. 10, a clear ink layer 103 (N) is formed on the color ink layer 102, on the object to be printed M, by the ejection of the clear ink from the white/clear head 52. In the embodiment, in the main scanning processing at step S207 shown in FIG. 10, the carriage 20 moves from the right to the left, and the white/clear right-side lamp 62 is positioned further to the right than the white/clear head 52, that is, on the opposite side to the movement direction of the carriage 20. Thus, the ultraviolet light generated from the white/clear right-side lamp 62 during the N-th main scanning processing at step S207 shown in FIG. 10 is irradiated onto the clear ink layer 103 (N) in the normal print mode. In this way, in the normal print mode, the time until the irradiation of the clear ink layer 103 (N) is comparatively short, and thus, the clear ink layer 103 (N) is cured in a state in which the smoothing has not been performed, or in which the smoothing is relatively unadvanced. As a result, in the normal print mode, the clear ink layer 103 shown in FIG. 5 has surface unevenness.

The ultraviolet light generated from the white/clear right-side lamp 62 during the N-th main scanning processing at step S217 shown in FIG. 10 is irradiated onto the clear ink layer 103 (N). In this way, since the integrated amount irradiated onto the clear ink layer 103 (N) is increased, the printer 1A can reliably cure the clear ink layer 103 (N). As described above, the clear ink layer 103 is formed on the color ink layer 102 on the object to be printed M. In this way, in the normal print mode, the matte finish printed object 100A shown in FIG. 5 is created.

The clear gloss print processing will be described with reference to FIG. 12. The CPU 41 sets "left" as the main scanning direction (step S251). The CPU 41 sets the white ink to "OFF" (step S252). The CPU 41 sets the color ink to "OFF" (step S253). The CPU 41 sets the clear ink to "ON" (step S254). The CPU 41 sets the white/clear right-side lamp 62 to "OFF" (step S255). The CPU 41 sets the color right-side lamp 61 to "ON" (step S256). In other words, in the clear gloss print processing, when "left" is set as the main scanning direction, a difference with the normal clear print processing shown in FIG. 10 is that the white/clear right-side lamp 62 is set to "OFF."

The CPU 41 performs the main scanning processing on the basis of the settings at step S251 to step S256 (step S257). A detailed description will be omitted here, but in the main scanning processing at step S257, while executing the movement control, in the irradiation control, the CPU 41 causes the plurality of ultraviolet light-emitting diodes 624 shown in FIG. 2 to be extinguished, and stops the irradiation of the ultraviolet light onto the object to be printed M from the white/clear right-side lamp 62.

The CPU 41 sets "right" as the main scanning direction (step S261). The CPU 41 sets the white ink to "OFF" (step S262). The CPU 41 sets the color ink to "OFF" (step S263). The CPU 41 sets the clear ink to "OFF" (step S264). The CPU 41 sets the white/clear right-side lamp 62 to "OFF" (step S265). The CPU 41 sets the color right-side lamp 61 to "ON" (step S266). In other words, in the clear gloss print processing, when "right" is set as the main scanning direction, a difference with the normal clear print processing shown in FIG. 10 is that the white/clear right-side lamp 62 is set to "OFF."

The CPU 41 performs the main scanning processing on the basis of the settings at step S261 to step S266 (step S267). A detailed description will be omitted here, but in the main scanning processing at step S267, while executing the movement control, in the irradiation control, the CPU 41 causes the plurality of ultraviolet light-emitting diodes 624 shown in FIG. 2 to be extinguished, and stops the irradiation of the ultraviolet light onto the object to be printed M from the white/clear right-side lamp 62.

On the basis of the print data, the CPU 41 determines whether, of the object to be printed M shown in FIG. 6, the formation of the clear ink layer 103 is complete on all of the region on which the image is to be printed (step S268). When, of the object to be printed M shown in FIG. 6, the formation of the clear ink layer 103 is not complete on the region on which the image is to be printed (no at step S268), the CPU 41 sets "forward" as the sub-scanning direction (step S271). The CPU 41 performs the sub-scanning processing on the basis of the settings at step S271 (step S272). In the sub-scanning processing at step S272, the CPU 41 controls the sub-scanning motor 32 on the basis of the detection result from the encoder 321 shown in FIG. 4, and moves the platen 5 shown in FIG. 2 forward. When the platen 5 moves forward by the predetermined movement amount, the CPU 41 stops the sub-scanning motor 32 shown in FIG. 4. The CPU 41 shifts the processing to step S241.

The CPU 41 repeats the main scanning processing (step S257 and step S267) and the sub-scanning processing (step S272) until, of the object to be printed M shown in FIG. 6, the formation of the clear ink layer 103 is complete on all the region on which the image is to be printed. When, of the object to be printed M shown in FIG. 6, the formation of the clear ink layer 103 is complete on the region on which the image is to be printed (yes at step S268), the CPU 41 returns the processing to the main processing shown in FIG. 7.

A formation mode of the clear ink layer 103 in the clear gloss print processing will be described with reference to FIG. 11. FIG. 11 shows the white ink layer 101 using oblique solid lines, the color ink layer 102 using vertical solid lines, and the clear ink layer 103 using oblique dotted lines. In the description of the formation mode of the clear ink layer 103 in the clear gloss print processing, FIG. 11 shows the positional relationship in the front-rear direction between the carriage 20 and the object to be printed M when the N-th main scanning processing at step S267 shown in FIG. 12 has been completed.

Figure 12:
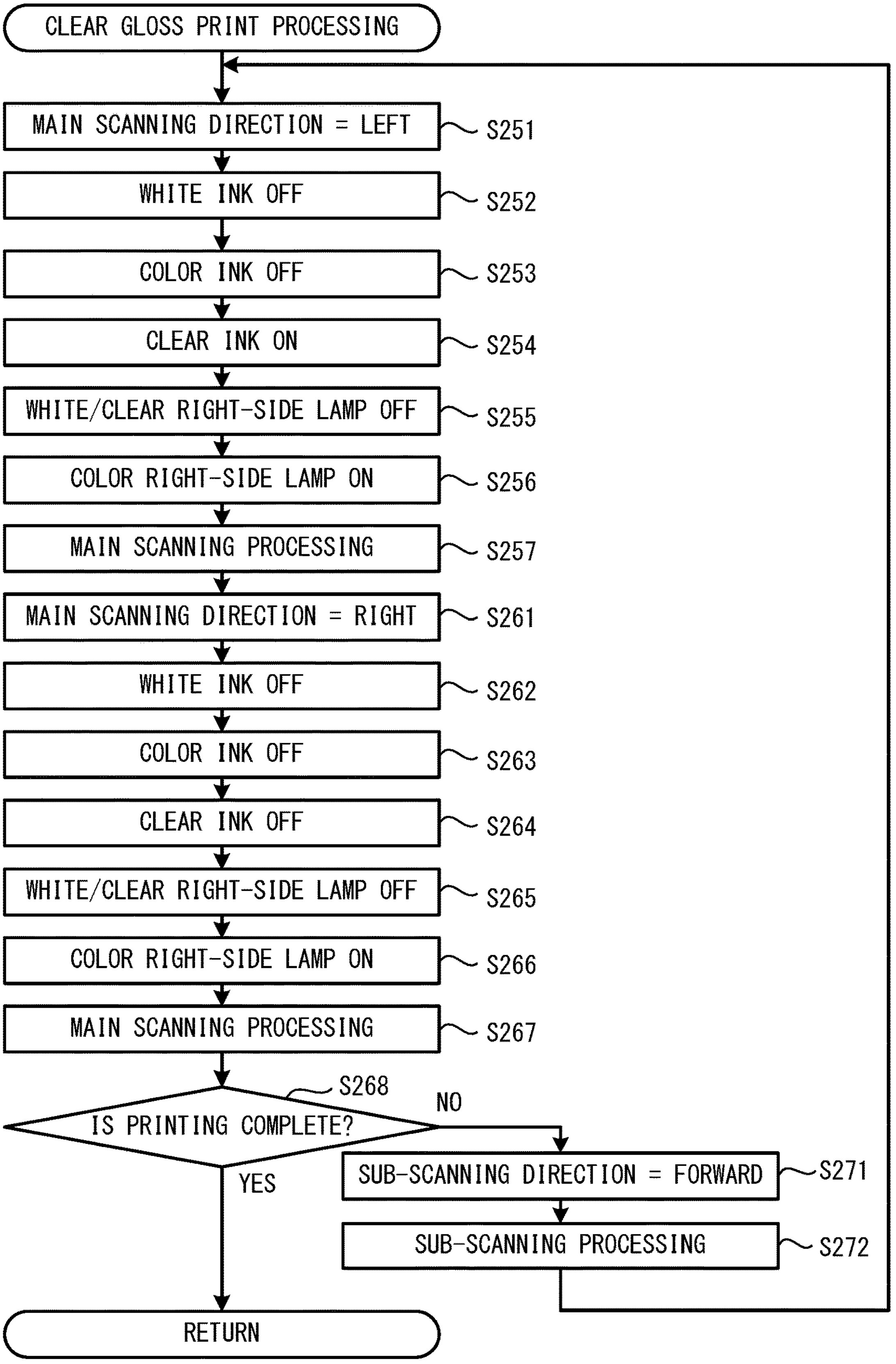
FIG. 12 is a flowchart of the clear gloss print processing according to the embodiment.

In the gloss print mode, in the N-th main scanning processing at step S257 shown in FIG. 12, the clear ink layer 103 (N) is formed on the color ink layer 102, on the object to be printed M, by the ejection of the clear ink from the white/clear head 52. In the gloss print mode, in the main scanning processing at step S257 and step S267 shown in FIG. 12, the ultraviolet light-emitting diodes 624 in the white/clear right-side lamp 62 are extinguished. Thus, in the gloss print mode, the ultraviolet light is not irradiated onto the clear ink layer 103 (N) during the N-th main scanning processing at step S257 and step S267 shown in FIG. 12. As a result, in the gloss print mode, the clear ink layer 103 (N) is not cured during the N-th main scanning processing at step S257 and step S267, and the smoothing of the clear ink layer 103 (N) advances.

In the embodiment, in the sub-scanning processing at step S272 shown in FIG. 12, the platen 5 shown in FIG. 2 moves from the rear to the front, that is, moves in the direction from the white/clear head 52 toward the color head 51. Thus, the ultraviolet light generated from the color right-side lamp 61 during the N-th main scanning processing at step S257 shown in FIG. 12 is irradiated onto a clear ink layer 103 (N−K). In this way, the curing of the clear ink layer 103 (N−K) is started. Note that FIG. 11 shows the example when K is 2. As described above, the gloss finish printed object 100B shown in FIG. 6 is created.

As described above, in the gloss print mode, the ultraviolet light is not irradiated onto the clear ink layer 103 (N) during the N-th main scanning processing at step S257 and step S267 shown in FIG. 12. Furthermore, the ultraviolet light generated from the color right-side lamp 61 is irradiated onto the clear ink layer 103 (N) during the N+K-th main scanning processing at step S257 shown in FIG. 12. Thus, the time until the irradiation of the clear ink layer 103 (N) is equal to or longer than a processing time of the sub-scanning processing performed K times at step S272. As a result, the clear ink layer 103 is cured in a state in which the smoothing is relatively advanced. Thus, in the gloss print mode, the clear ink layer 103 shown in FIG. 6 does not have surface unevenness, or has a lesser surface unevenness than the clear ink layer 103 shown in FIG. 5. As a result, the gloss finish printed object 100B shown in FIG. 6 has a higher level of glossiness than the matte finish printed object 100A shown in FIG. 5.

As described above, in the embodiment, in the gloss print mode, the clear ink layer 103 is smoothed during a period from when the clear ink layer 103 is formed on the object to be printed M up until being irradiated with the ultraviolet light, that is, during the executing of the sub-scanning processing at step S272. Thus, the printer 1A can secure the processing time of the sub-scanning processing at step S272 as the time from when the clear ink layer 103 is formed on the object to be printed M up to the smoothing of the clear ink layer 103. As a result, the printer 1A does not need to dispose the white/clear right-side lamp 62 at a position separated from the white/clear head 52 in the main scanning direction (the left-right direction), for example, in order to secure the time from when the clear ink layer 103 is formed on the object to be printed M up to the smoothing of the clear ink layer 103. Thus, the clear ink layer 103 can be smoothed in the gloss print processing while suppressing an increase in size of the printer 1A as a whole.

In the main scanning processing at step S257 and step S267, the white/clear right-side lamp 62 is extinguished. Thus, the printer 1A can cause the clear ink layer 103 formed on the object to be printed M in the N-th main scanning processing at step S257 to be reliably smoothed during the execution of the N-th main scanning processing at step S257 and step S267.

The color head 51 ejects the color inks. The white/clear head 52 ejects the clear ink. Thus, in the gloss print mode, the printer 1A can improve the glossiness of the print image by smoothing the clear ink layer 103.

It is more difficult to cause ink to attach to the object to be printed M that is plastic, metal, ceramic, or the like, than to the general object to be printed M that is a cloth, paper, or the like. In the embodiment, since the ink is photocurable, the printer 1A can also print the object to be printed M to which it is comparatively difficult to attach the ink. Thus, the printer 1A can diversify the material and the like of the object to be printed M.

The white/clear head 52 further ejects the white ink. Thus, the printer 1A can form the white ink layer 101 as the base of the color ink layer 102. As a result, the printer 1A can improve color development of the color inks.

Figure 13:
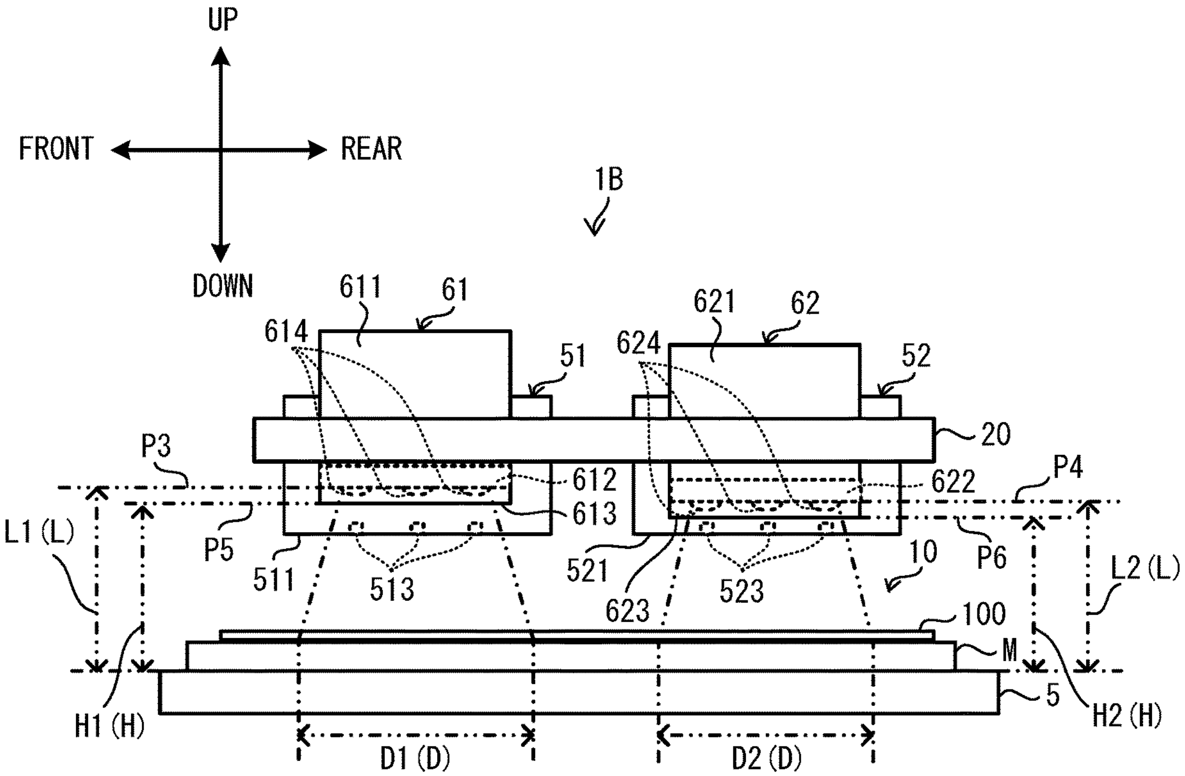
FIG. 13 is a schematic diagram showing a printer as viewed from the right.
Figure 14:
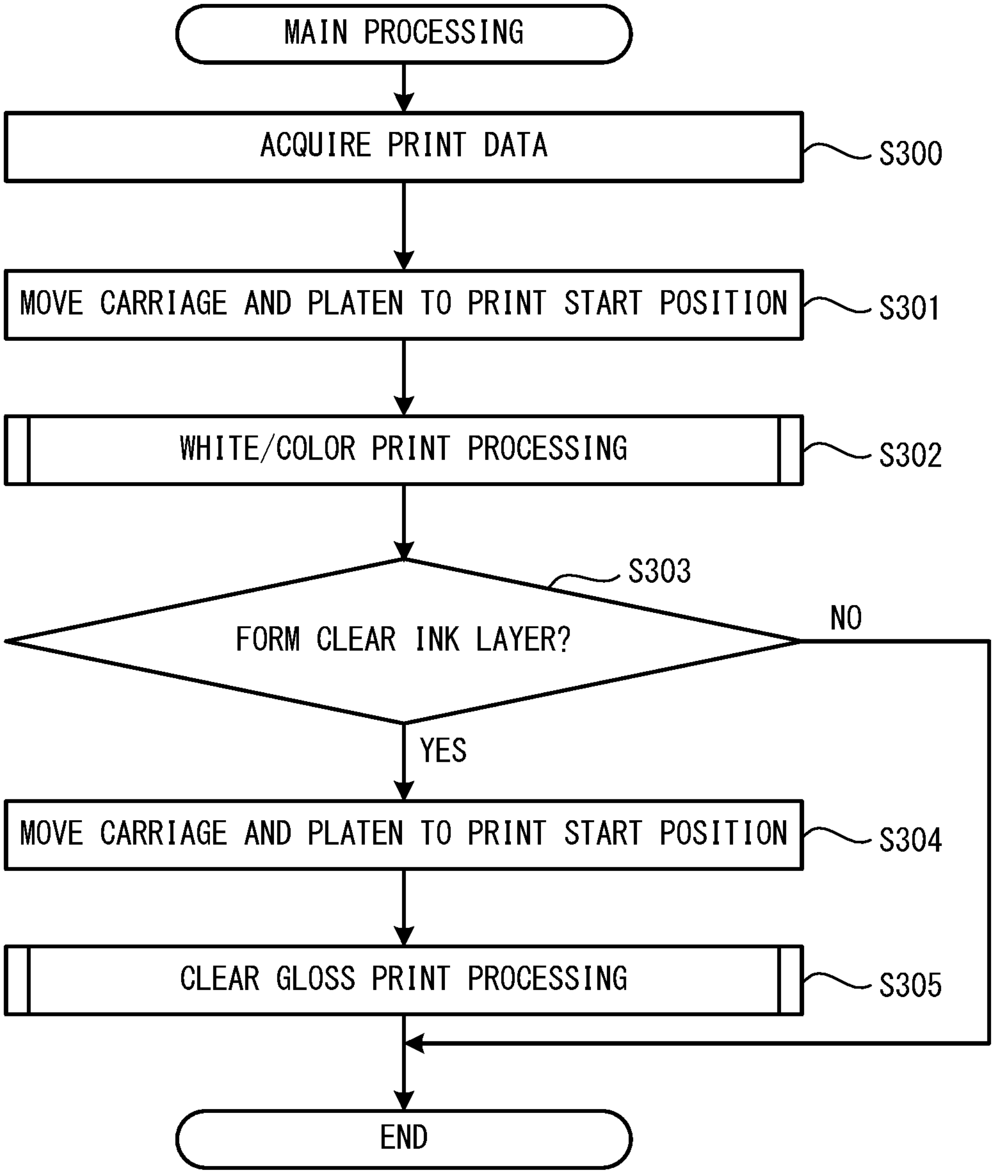
FIG. 14 is a flowchart of main processing according to a modified example.

A printer 1B according to a modified example of the present disclosure will be described with reference to FIG. 13 and FIG. 14. In a similar manner to the printer 1A shown in FIG. 1, the printer 1B shown in FIG. 13 is an inkjet-type UV printer. The printer 1B differs from the printer 1A in that the positional relationship between the color right-side lamp 61 and the white/clear right-side lamp 62 is different in the up-down direction. The remaining mechanical configuration and the electrical configuration of the printer 1B are, respectively, the same as the mechanical configuration and the electrical configuration of the printer 1A. In the modified example, the members that have the same or equivalent functions as those of the above-described embodiment are assigned the same or corresponding reference signs as those of the above-described embodiment, and a description thereof will be omitted or simplified.

As shown in 13, the color right-side lamp 61 is disposed higher than the white/clear right-side lamp 62. More specifically, the plurality of ultraviolet light-emitting diodes 614 are disposed at a position P3 separated further upward from the platen 5 than a position P4, in the up-down direction, at which the plurality of ultraviolet light-emitting diodes 624 are disposed with respect to the platen 5. In other words, the lower surface of the substrate 612 is positioned higher than the lower surface of the substrate 622. Thus, the distance L1 between the upper surface of the platen 5 and the ultraviolet light-emitting diodes 614 in the up-down direction is greater than the distance L2 between the upper surface of the platen 5 and the plurality of ultraviolet light-emitting diodes 624 in the up-down direction. Hereinafter, when the distance L1 and the distance L2 are collectively referred to, they will be referred to as an "irradiation distance L."

The housing 611 is disposed at a position P5 separated further upward from the platen 5 than a position P6, in the up-down direction, at which the housing 621 is disposed with respect to the platen 5. In other words, the facing surface 613 is positioned higher than the facing surface 623. Thus, the distance H1 between the upper surface of the platen 5 and the facing surface 613 in the up-down direction is greater than the distance H2 between the upper surface of the platen 5 and the facing surface 623 in the up-down direction. Hereinafter, when the distance H1 and the distance H2 are collectively referred to, they will be referred to as a "facing distance H."

Figure 15:
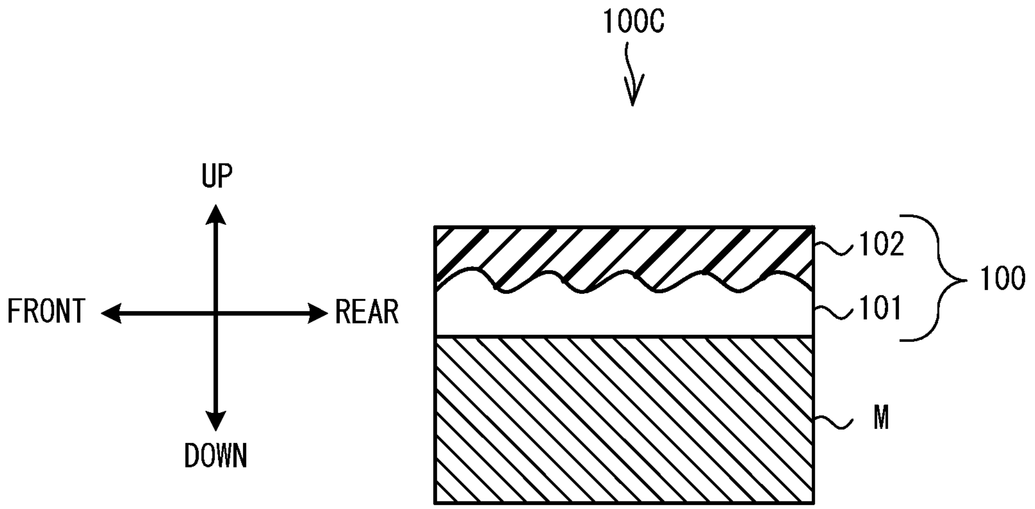
FIG. 15 is a schematic diagram showing a cross section of a gloss finish printed object.
Figure 16:
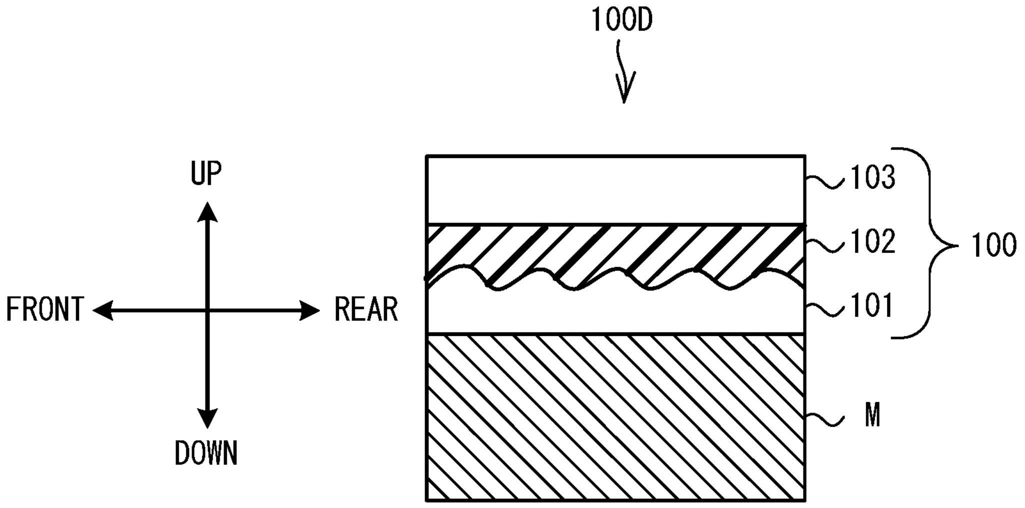
FIG. 16 is a schematic diagram showing a cross section of a gloss finish printed object.

A gloss finish printed object 100C and a gloss finish printed object 100D will be described with reference to FIG. 15 and FIG. 16. FIG. 15 shows an example in which as the ink layer 100, the white ink layer 101 and the color ink layer 102 are formed from the upper surface of the object to be printed M upward, in order of the white ink layer 101 and the color ink layer 102. In other words, in the gloss finish printed object 100C shown in FIG. 15, the color ink layer 102 is the uppermost surface layer. FIG. 16 shows an example in which, as the ink layer 100, the white ink layer 101, the color ink layer 102, and the clear ink layer 103 are formed from the upper surface of the object to be printed M upward, in order of the white ink layer 101, the color ink layer 102, and the clear ink layer 103. In other words, in the gloss finish printed object 100D shown in FIG. 16, the clear ink layer 103 is the uppermost surface layer. The print data indicates, for example, whether the clear ink layer 103 is to be formed or not.

The gloss tone printed object 100C shown in FIG. 15 and the gloss tone printed object 100D shown in FIG. 16 are both created by curing the uppermost surface layer (the color ink layer 102 in the gloss tone printed object 100C, and the clear ink layer 103 in the gloss tone printed object 100D) in a state in which the smoothing of the uppermost surface layer is relatively advanced. Thus, the gloss tone printed object 100C shown in FIG. 15 and the gloss tone printed object 100D shown in FIG. 16 both have a high level of glossiness.

Hereinafter, as shown in FIG. 13, the region of the object to be printed M onto which the ultraviolet light is irradiated by the color right-side lamp 61 will be referred to as an "irradiation region D1," and a region of the object to be printed M onto which the ultraviolet light is irradiated by the white/clear right-side lamp 62 will be referred to as an "irradiation region D2." When the irradiation region D1 and the irradiation region D2 are collectively referred to, they will be referred to as an "irradiation region D" or "irradiation regions D." Both ends, in the front-rear direction, of the irradiation regions D are boundaries between a region onto which the ultraviolet light is irradiated and a region onto which the ultraviolet light is not irradiated. The illuminance by the ultraviolet light generated by the color right-side lamp 61 or the white/clear right-side lamp 62 will simply be referred to as "illuminance." In the ink layer 100, a difference between the illuminance at a center portion in the front-rear direction of the irradiation region D, and the illuminance of both end portions in the front-rear direction of the irradiation region D will be referred to as an "illuminance difference."

When the illuminance difference is large, for example, in the front-rear direction, a curing speed of the ink layer 100 at the center portion of the irradiation region D is faster compared to the curing speed of the ink layer 100 at both the end portions of the irradiation region D. In this case, in particular, the uppermost surface layer (the color ink layer 102 in the gloss tone printed object 100C, and the clear ink layer 103 in the gloss tone printed object 100D) of the gloss tone printed object 100C shown in FIG. 15 and of the gloss tone printed object 100D shown in FIG. 16 is smoothed, and thus, as a result of a shrinkage effect caused by the curing of the uppermost surface layer, there is a possibility that a striped pattern may occur at both the end portions in the front-rear direction of the irradiation region D of the uppermost surface layer. Thus, when creating the gloss tone printed object 100C shown in FIG. 15 and the gloss tone printed object 100D shown in FIG. 16, it is necessary for the printer 1B to reduce the illuminance difference in order to suppress the occurrence of the striped pattern in the uppermost surface layer.

The illuminance difference changes depending on the irradiation distance L, the facing distance H, and the like. For example, the larger the irradiation distance L or the facing distance H, the larger the width in the front-rear direction of the irradiation region D becomes, and thus, the more gradual the reduction in the illuminance from the center portion in the front-rear direction of the irradiation region D toward both the ends in the front-rear direction of the irradiation region D.

On the other hand, the ultraviolet light irradiated by the ultraviolet light-emitting diodes 614 and 624 is reflected by the ink layer 100 or the object to be printed M. There is a possibility that if the ultraviolet light is irradiated on the nozzle surfaces 511 and 521, the ink inside the nozzles 513 and 523 may be cured, and an ink discharge failure may occur. Thus, when the irradiation distance L and the facing distance H are large, for example, there is a greater possibility of the reflected ultraviolet light being irradiated onto the nozzle surfaces 511 and 521, and the possibility of the ink discharge failure thus increases.

In the modified example, in the up-down direction, the plurality of ultraviolet light-emitting diodes 614 are disposed at the position P3 separated further from the platen 5 than the position P4 at which the plurality of ultraviolet light-emitting diodes 624 are disposed with respect to the platen 5. Thus, of the irradiation distances L, that of the color right-side lamp 61 (the distance L1) is larger than that of the white/clear right-side lamp 62 (the distance L2). Furthermore, in the modified example, in the up-down direction, the housing 611 is disposed at the position P5 separated further from the platen 5 than the position P6 at which the housing 621 is disposed with respect to the platen 5. Thus, of the facing distances H, that of the color right-side lamp 61 (the distance H1) is larger than that of the white/clear right-side lamp 62 (the distance H2).

As a result of the above, of the widths in the front-rear direction of the irradiation regions D, that of the color right-side lamp 61 (the irradiation region D1) is larger than that of the white/clear right-side lamp 62 (the irradiation region D2). Thus, the illuminance difference is smaller when the ultraviolet light from the color right-side lamp 61 is irradiated than when the ultraviolet light from the white/clear right-side lamp 62 is irradiated. As a result, in the front-rear direction, the difference between the curing speed of the ink layer 100 at both the end portions of the irradiation region D and the curing speed of the ink layer 100 at the center portion of the irradiation region D is smaller when the ultraviolet light from the color right-side lamp 61 is irradiated than when the ultraviolet light from the white/clear right-side lamp 62 is irradiated. Thus, in the ink layer 100, the striped pattern is less likely to occur at both the end portions of the irradiation region D in the front-rear direction when the ultraviolet light from the color right-side lamp 61 is irradiated than when the ultraviolet light from the white/clear right-side lamp 62 is irradiated.

On the other hand, in the modified example, the irradiation distance L and the facing distance H are smaller for the white/clear right-side lamp 62 than for the color right-side lamp 61. Thus, the possibility of the ink discharge failure occurring is less likely when the ultraviolet light from the white/clear right-side lamp 62 is irradiated than when the ultraviolet light from the color right-side lamp 61 is irradiated.

By performing the main processing as described below, in the gloss print mode, the printer 1B causes the illuminance of the uppermost surface layer to be comparatively small. In this way, the printer 1B can suppress the occurrence of the striped pattern in the uppermost surface layer. Furthermore, by performing the main processing as described below, in the gloss print mode, the printer 1B irradiates the ultraviolet light onto the white ink layer 101 from the white/clear right-side lamp 62. Thus, the printer 1B can suppress the ink discharge failure by the white/clear head 52.

The main processing will be described with reference to FIG. 14. In the modified example, when the print command is input in the gloss print mode, the CPU 41 performs the main processing shown in FIG. 14 by reading out and executing the control program from the ROM 42.

Hereinafter, the description will be made using a case in which the gloss tone printed object 100C shown in FIG. 15 or the gloss tone printed object 100D shown in FIG. 16 is created, as an example. At the start of the main processing shown in FIG. 14, it is assumed that the platen 5 is positioned at the set position shown in FIG. 1, and the carriage 20 is positioned at the stand-by position shown in FIG. 1.

When the main processing is started, the CPU 41 acquires, from the flash memory 44, the print data specified by the print command, and stores the acquired print data in the RAM 43 (step S300). The CPU 41 controls the sub-scanning motor 32 on the basis of the detection result from the encoder 321 shown in FIG. 4, and moves the platen 5 shown in FIG. 13 to the rear, to the platen print start position (not shown in the drawings) (step S301). As described above, when the platen 5 is positioned at the platen print start position, the front end of the region (not shown in the drawings) on which the image is to be printed, of the object to be printed M shown in FIG. 13, is disposed further to the rear than the white/clear head 52 shown in FIG. 13. The CPU 41 controls the main scanning motor 31 on the basis of the detection result from the encoder 311 shown in FIG. 4, and moves the carriage 20 to the right from the stand-by position shown in FIG. 1, to the carriage print start position (step S301). As described above, when the carriage 20 is positioned at the carriage print start position, the color head 51 and the white/clear head 52 shown in FIG. 13 are disposed further to the right than the right end of the region (not shown in the drawings) on which the image is to be printed, of the object to be printed M shown in FIG. 13.

The CPU 41 performs the white/color print processing (step S302). The white/color print processing at step S302 is the same as the white/color print processing at step S102 shown in FIG. 7. In other words, in the white/color print processing at step S302, while the platen 5 moves forward from the platen print start position, the white ink layer 101 and the color ink layer 102 shown in FIG. 15 and FIG. 16 are formed on the object to be printed M.

Figure 7:
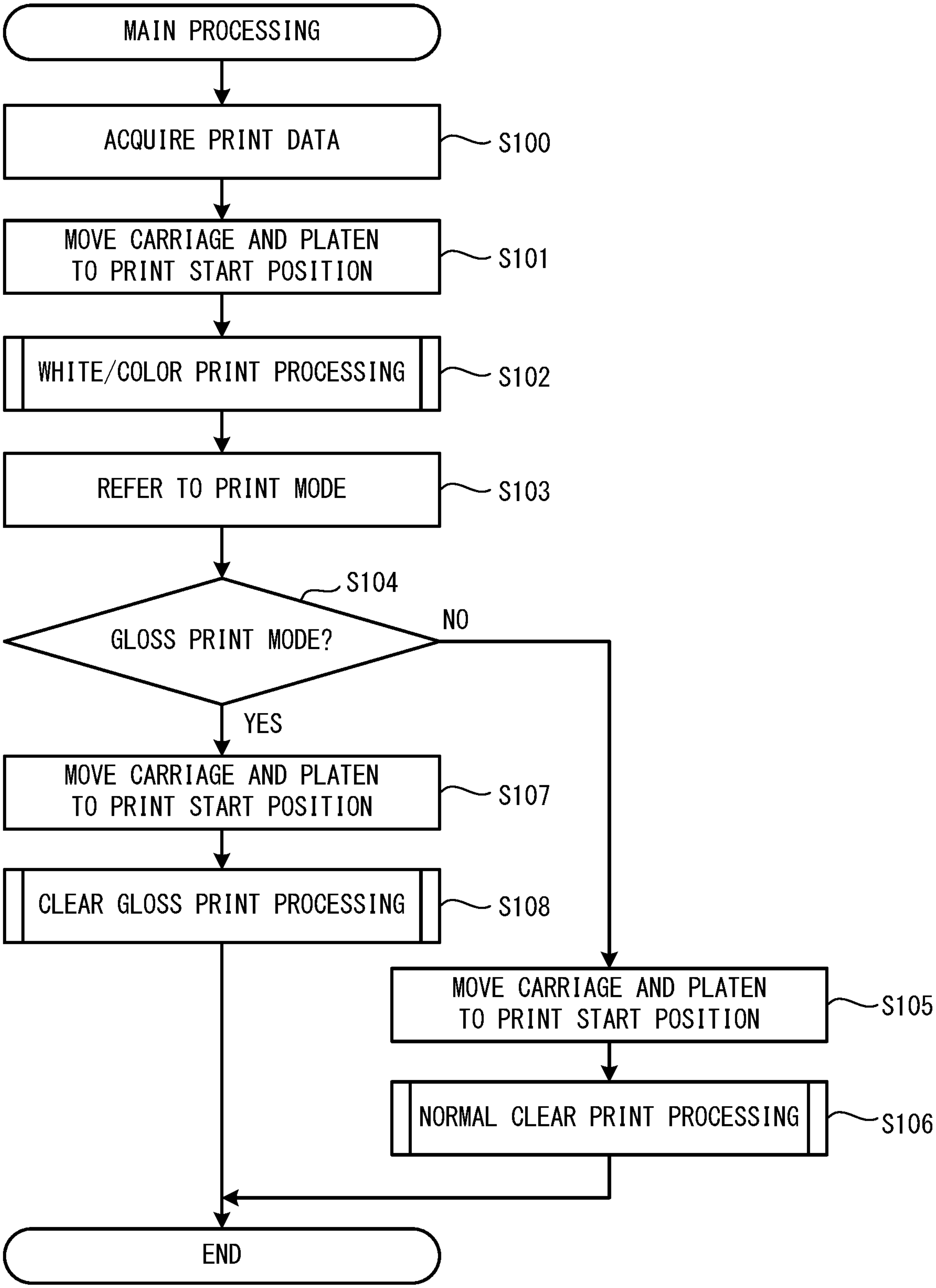
FIG. 7 is a flowchart of main processing according to the embodiment.

A formation mode of the white ink layer 101 and the color ink layer 102 in the white/color print processing at step S302 differs from the formation mode of the white ink layer 101 and the color ink layer 102 in the white/color print processing at step S102 shown in FIG. 7 in that the illuminance of the ultraviolet light irradiated from the color right-side lamp 61 is smaller than when the ultraviolet light from the white/clear right-side lamp 62 is irradiated. In other words, the ultraviolet light having the comparatively large illuminance is irradiated onto the white ink layer 101 from the white/clear right-side lamp 62. Thus, as shown in FIG. 15 and FIG. 16, the white ink layer 101 is cured in the state in which the smoothing has not been performed or in which the smoothing is relatively unadvanced. On the other hand, in the gloss print mode, the ultraviolet light having the comparatively small illuminance is irradiated onto the color ink layer 102 from the color right-side lamp 61. Thus, in the gloss print mode, as shown in FIG. 15 and FIG. 16, the color ink layer 102 is cured in the state in which the smoothing is relatively advanced.

The CPU 41 determines, on the basis of the print data, whether or not the clear ink layer 103 shown in FIG. 16 is to be formed on the color ink layer 102 on the object to be printed M (step S303). When the clear ink layer 103 is not to be formed (no at step S303), the CPU 41 ends the main processing. In this way, in the gloss print mode, the gloss tone printed object 100C shown in FIG. 15 is created.

When the clear ink layer 103 is to be formed (yes at step S303), the CPU 41 controls the sub-scanning motor 32 on the basis of the detection result from the encoder 321 shown in FIG. 4, and moves the platen 5 shown in FIG. 13 to the rear, to the platen print start position (not shown in the drawings) (step S304). As described above, when the platen 5 is positioned at the platen print start position, the front end of the region (not shown in the drawings) on which the image is to be formed, of the object to be printed M shown in FIG. 13, is disposed further to the rear than the white/clear head 52 shown in FIG. 13.

The CPU 41 performs the clear gloss print processing (step S305). The clear gloss print processing at step S305 is the same as the clear gloss print processing at step S108 shown in FIG. 7. In other words, in the clear gloss print processing at step S305, while the platen 5 moves forward from the platen print start position, the clear ink layer 103 shown in FIG. 16 is formed on the object to be printed M. The CPU 41 ends the main processing. In this way, in the gloss print mode, the gloss tone printed object 100D shown in FIG. 16 is created.

A formation mode of the clear ink layer 103 in the clear gloss print processing at step S305 differs from the formation mode of the clear ink layer 103 in the clear gloss print processing shown in FIG. 7 in that the illuminance of the ultraviolet light irradiated from the color right-side lamp 61 is smaller than when the ultraviolet light from the white/clear right-side lamp 62 is irradiated. In other words, in the gloss print mode, in addition to the time up to the irradiation of the clear ink layer 103 being comparatively long, the ultraviolet light having the comparatively small illuminance is irradiated onto the clear ink layer 103 from the color right-side lamp 61, and thus, as shown in FIG. 16, the clear ink layer 103 is cured in the state in which the smoothing is relatively advanced.

As described above, in the modified example, in the up-down direction, the plurality of ultraviolet light-emitting diodes 614 are disposed at the position P3 separated further from the platen 5 than the position P4 at which the plurality of ultraviolet light-emitting diodes 624 are disposed with respect to the platen 5. Furthermore, in the modified example, in the up-down direction, the housing 611 is disposed at the position P5 separated further from the platen 5 than the position P6 at which the housing 621 is disposed with respect to the platen 5. In the gloss print mode, the ultraviolet light is irradiated onto the color ink layer 102 and the clear ink layer 103 from the color right-side lamp 61. Thus, the printer 1B can smooth the color ink layer 102 and the clear ink layer 103. In other words, the printer 1B does not need to respectively dispose the color right-side lamp 61 or the white/clear right-side lamp 62 at a position separated, in the main scanning direction (the left-right direction), from the color head 51 or the white/clear head 52, for example, in order to secure the time from when the color ink layer 102 and the clear ink layer 103 are formed on the object to be printed M up to the smoothing of the color ink layer 102 and the clear ink layer 103. Thus, the clear ink layer 103 can be smoothed in the gloss print mode while suppressing an increase in size of the printer 1B as a whole. Furthermore, the illuminance difference is smaller when the ultraviolet light is irradiated from the color right-side lamp 61 than when the ultraviolet light is irradiated from the white/clear right-side lamp 62. In the gloss print mode, the ultraviolet light from the color right-side lamp 61 is irradiated onto the color ink layer 102 and the clear ink layer 103. Thus, the printer 1B can suppress the striped pattern from occurring in the color ink layer 102 and the clear ink layer 103. The ultraviolet light from the white/clear right-side lamp 62 is irradiated onto the white ink layer 101. Thus, the printer 1B can suppress the ink discharge failure by the white/clear head 52.

Figure 17:
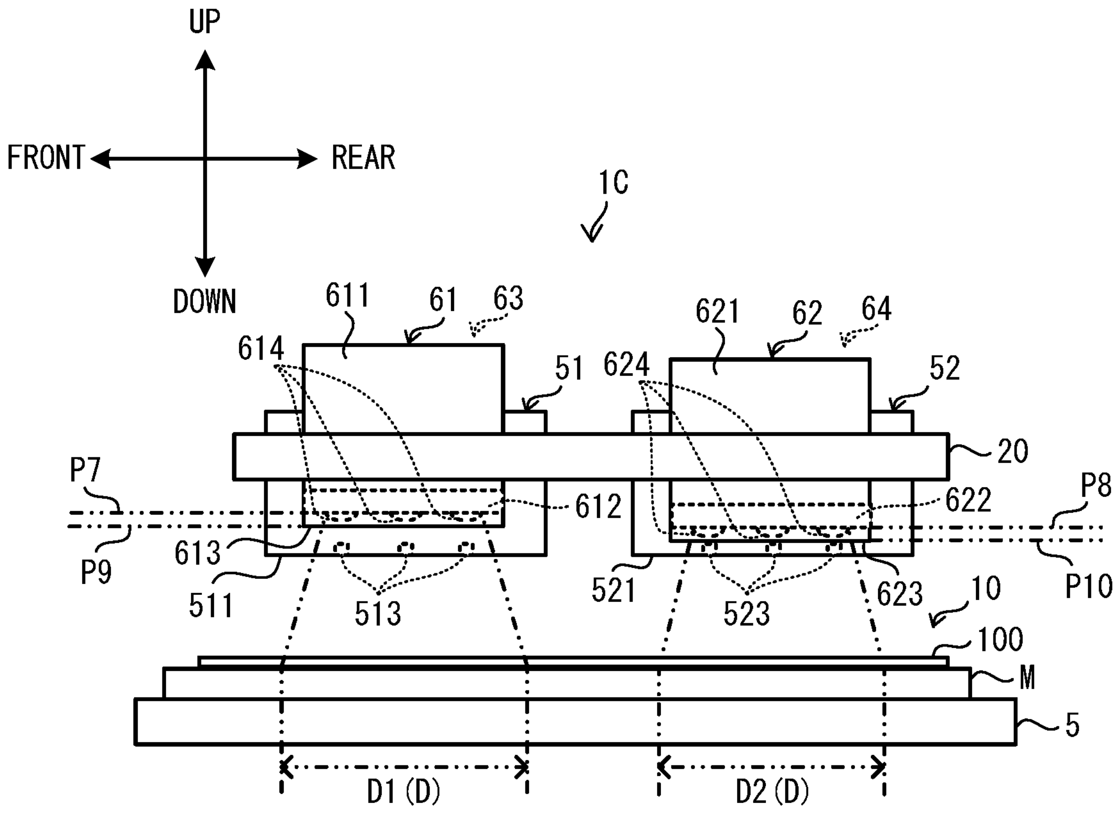
FIG. 17 is a schematic diagram showing a printer as viewed from the right.

A printer 1C according to another modified example of the present disclosure will be described with reference to FIG. 17 to FIG. 30. In a similar manner to the printers 1A and 1B, the printer 1C shown in FIG. 17 is an inkjet-type UV printer. The printer 1C differs from the printer 1B in that the printer 1C is further provided with a color left-side lamp 63 and a white/clear left-side lamp 64 shown in FIG. 19, in addition to the color right-side lamp 61 and the white/clear right-side lamp 62. The remaining mechanical configuration and the electrical configuration of the printer 1C are, respectively, the same as the mechanical configuration and the electrical configuration of the printer 1B. In the other modified example, the members that have the same or equivalent functions as those of the above-described modified example are assigned the same or corresponding reference signs as those of the above-described modified example, and a description thereof will be omitted or simplified.

Figure 18:
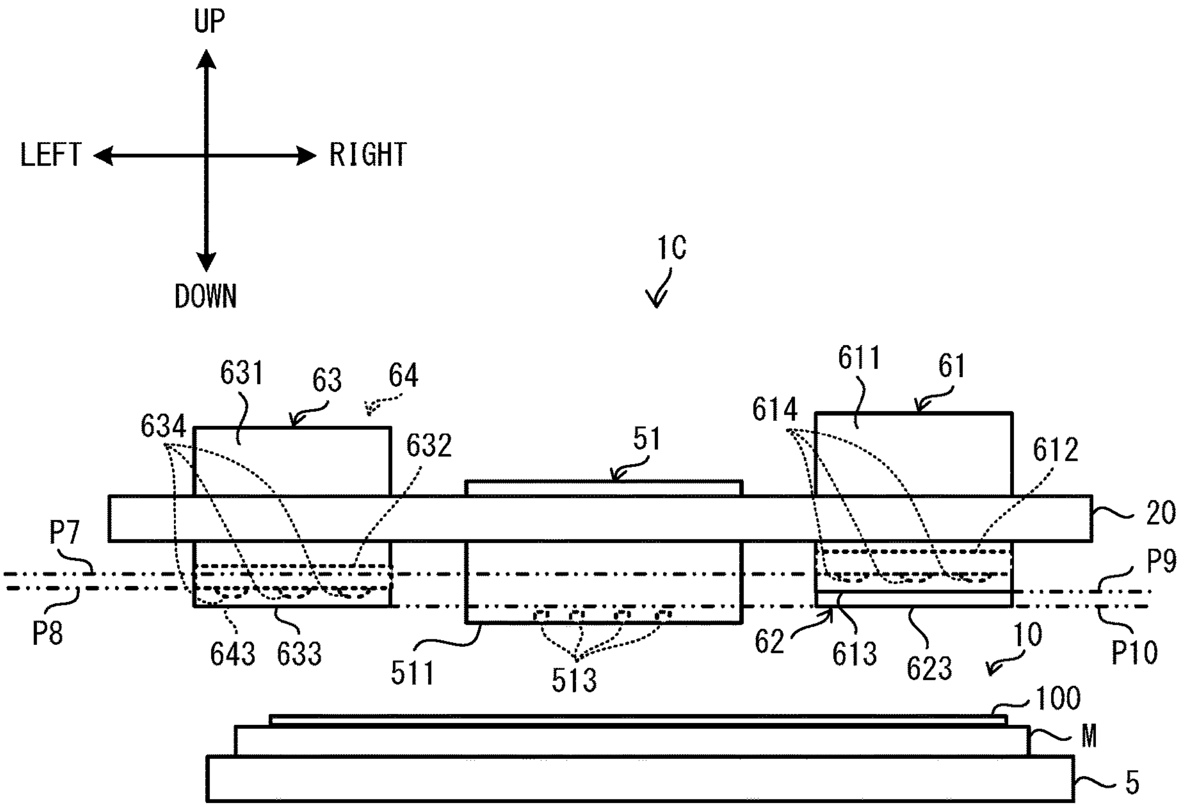
FIG. 18 is a schematic diagram showing the printer as viewed from the front.

In FIG. 17, the color left-side lamp 63 and the white/clear left-side lamp 64 are, respectively, hidden to the left of the color right-side lamp 61 and the white/clear right-side lamp 62. In FIG. 18, the white/clear left-side lamp 64 is hidden to the rear of the color left-side lamp 63. In FIG. 18, a section other than the lower portion of the white/clear right-side lamp 62 is hidden to the rear of the color right-side lamp 61.

Figure 19:
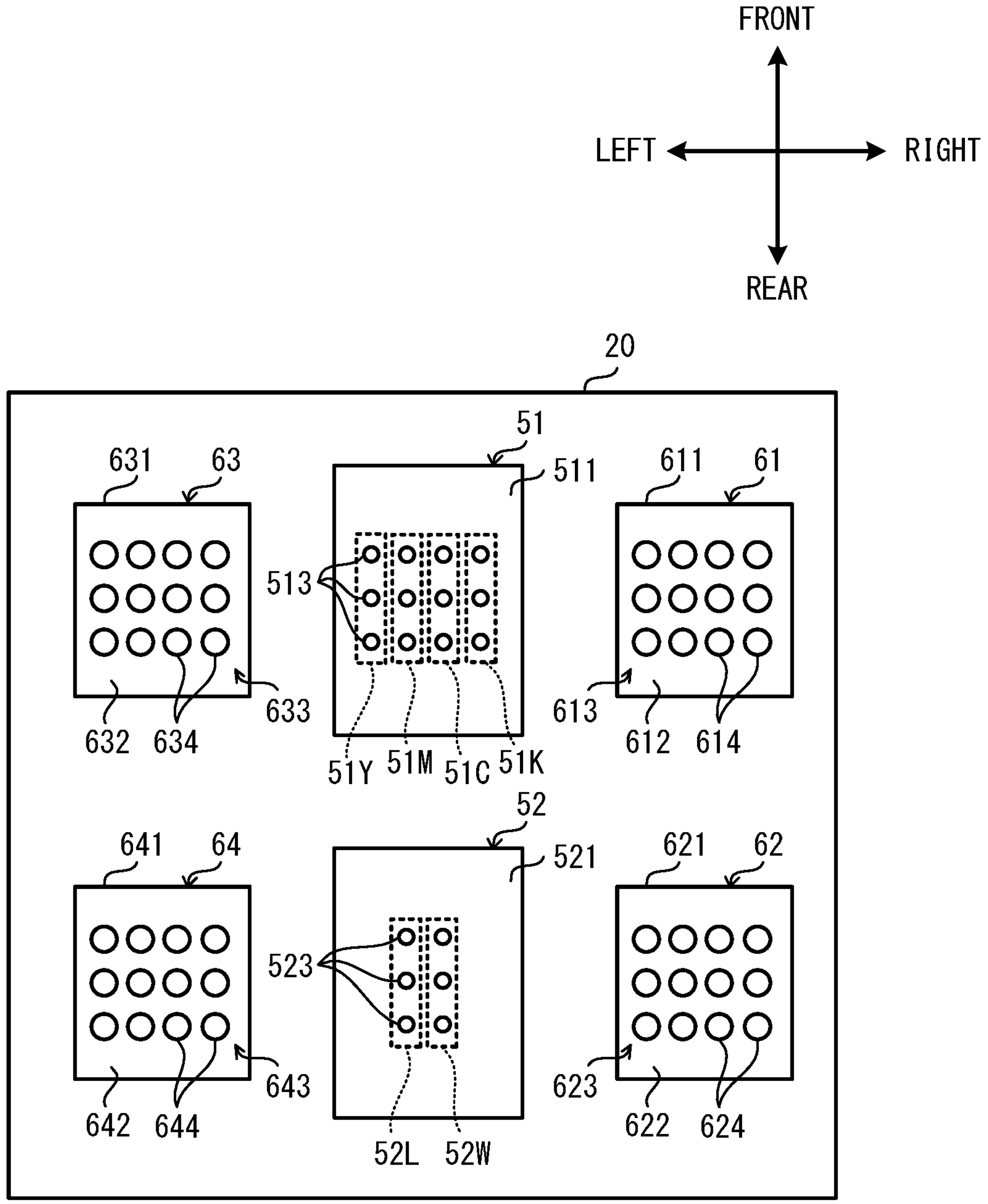
FIG. 19 is a schematic diagram showing the carriage according to another modified example, as viewed from below.

The color left-side lamp 63 and the white/clear left-side lamp 64 shown in FIG. 17 to FIG. 19 have a cuboid shape. As shown in FIG. 17 to FIG. 19, the color left-side lamp 63 and the white/clear left-side lamp 64 are aligned with each other in the front-rear direction. The color left-side lamp 63 is aligned to the left side of the color head 51. The white/clear left-side lamp 64 is aligned to the left side of the white/clear head 52. The color left-side lamp 63 and the white/clear left-side lamp 64 are moved in the left-right direction by the movement in the left-right direction of the carriage 20.

The color left-side lamp 63 is provided with a housing 631, a substrate 632, and a plurality of ultraviolet light-emitting diodes 634. The housing 631 has a cuboid shape and is fixed to the carriage 20. The lower end of the housing 631 is open downward, and is exposed downward from the carriage 20. Hereinafter, a region surrounded by the lower end of the housing 631 will be referred to as a "facing surface 633." In other words, the facing surface 633 is a virtual lower surface of the housing 631. The facing surface 633 is positioned higher than the platen 5, and faces the platen 5 in the up-down direction.

The substrate 632 is provided at the interior of the housing 631. The substrate 632 has a rectangular shape when viewed from below, and extends in the front-rear direction and the left-right direction. The substrate 632 is positioned higher than the platen 5 and faces the platen 5 in the up-down direction. The plurality of ultraviolet light-emitting diodes 634 are provided in a lattice pattern at the lower surface of the substrate 632. The plurality of ultraviolet light-emitting diodes 634 emit ultraviolet light by being illuminated.

The white/clear left-side lamp 64 is provided with a housing 641, a substrate 642, and a plurality of ultraviolet light-emitting diodes 644. The housing 641 has a cuboid shape and is fixed to the carriage 20. The lower end of the housing 641 is open downward, and is exposed downward from the carriage 20. Hereinafter, a region surrounded by the lower end of the housing 641 will be referred to as a "facing surface 643." In other words, the facing surface 643 is a virtual lower surface of the housing 641. The facing surface 643 is positioned higher than the platen 5, and faces the platen 5 in the up-down direction.

The substrate 642 is provided at the interior of the housing 641. The substrate 642 has a rectangular shape when viewed from below, and extends in the front-rear direction and the left-right direction. The substrate 642 is positioned higher than the platen 5 and faces the platen 5 in the up-down direction. The plurality of ultraviolet light-emitting diodes 644 are provided in a lattice pattern at the lower surface of the substrate 642. The plurality of ultraviolet light-emitting diodes 644 emit ultraviolet light by being illuminated. The color left-side lamp 63 and the white/clear left-side lamp 64 respectively irradiate the ultraviolet light downward by the ultraviolet light-emitting diodes 634 and 644 being illuminated.

As shown in FIG. 17 and FIG. 18, the white/clear right-side lamp 62, the color left-side lamp 63, and the white/clear left-side lamp 64 are disposed at the same positions as each other in the up-down direction. More specifically, the plurality of ultraviolet light-emitting diodes 624, 634, and 644 are disposed at a position P8 that is the same for each in the up-down direction. In other words, the respective lower surfaces of the substrate 622, the substrate 632, and the substrate 642 are positioned at the same position P8 as each other in the up-down direction. The housings 621, 631, and 641 are disposed at a position P10 that is the same for each in the up-down direction. In other words, the facing surfaces 623, 633, and 643 are positioned at the same position P10 as each other in the up-down direction.

The color right-side lamp 61 is disposed higher than the white/clear right-side lamp 62, the color left-side lamp 63, and the white/clear left-side lamp 64. More specifically, the plurality of ultraviolet light-emitting diodes 614 are disposed at a position P7 separated further upward from the platen 5 than a position P8, in the up-down direction, at which the plurality of ultraviolet light-emitting diodes 624, 634, and 644 are disposed with respect to the platen 5. In other words, the lower surface of the substrate 612 is positioned higher than the lower surface of each of the substrates 622, 632, and 642.

The housing 611 is disposed at a position P9 separated further upward from the platen 5 than a position P10, in the up-down direction, at which the housings 621, 631, and 641 are disposed with respect to the platen 5. In other words, the facing surface 613 is positioned higher than any of the facing surfaces 623, 633, and 643.

The main processing will be described with reference to FIG. 20. In the other modified example, when the print command is input, the CPU 41 performs the main processing shown in FIG. 20 by reading out and executing the control program from the ROM 42.

Hereinafter, the description will be made using cases in which the matte tone printed object 100A shown in FIG. 5, the gloss tone printed object 100C shown in FIG. 15 or the gloss tone printed object 100D shown in FIG. 16 is created, as an example. At the start of the main processing shown in FIG. 20, it is assumed that the platen 5 is positioned at the set position shown in FIG. 1, and the carriage 20 is positioned at the stand-by position shown in FIG. 1.

When the main processing is started, the CPU 41 acquires, from the flash memory 44, the print data specified by the print command, and stores the acquired print data in the RAM 43 (step S400). The CPU 41 controls the sub-scanning motor 32 on the basis of the detection result from the encoder 321 shown in FIG. 4, and moves the platen 5 shown in FIG. 17 to the rear, to the platen print start position (not shown in the drawings) (step S401). As described above, when the platen 5 is positioned at the platen print start position, the front end of the region (not shown in the drawings) on which the image is to be printed, of the object to be printed M shown in FIG. 17, is disposed further to the rear than the white/clear head 52 shown in FIG. 17. The CPU 41 controls the main scanning motor 31 on the basis of the detection result from the encoder 311 shown in FIG. 4, and moves the carriage 20 to the right from the stand-by position shown in FIG. 1, to the carriage print start position (step S401). As described above, when the carriage 20 is positioned at the carriage print start position, the color head 51 and the white/clear head 52 shown in FIG. 17 are disposed further to the right than the right end of the region (not shown in the drawings) on which the image is to be printed, of the object to be printed M shown in FIG. 17. The CPU 41 performs white print processing (step S402). In the white print processing, while the platen 5 moves forward from the platen print start position, the white ink layer 101 shown in FIG. 5, FIG. 15, and FIG. 16 is formed on the object to be printed M.

The CPU 41 refers to the print mode setting in the flash memory 44 (step S403). On the basis of the referred result, the CPU 41 determines whether or not the currently set print mode is the gloss print mode (step S404). When the currently set print mode is the normal print mode (no at step S404), the CPU 41 performs normal color print processing (step S405). In the normal color print processing, while the platen 5 moves rearward, the color ink layer 102 shown in FIG. 5 is formed on the white ink layer 101 on the object to be printed M.

The CPU 41 performs the normal clear print processing (step S406). In the normal clear print processing, while the platen 5 moves forward, the clear ink layer 103 shown in FIG. 5 is formed on the color ink layer 102 on the object to be printed M. The CPU 41 ends the main processing. In this way, in the normal print mode, the matte tone printed object 100A shown in FIG. 5 is created.

When the currently set print mode is the gloss print mode (yes at step S404), the CPU 41 performs color gloss print processing (step S407). In the color gloss print processing, while the platen 5 moves rearward, the color ink layer 102 shown in FIG. 15 and FIG. 16 is formed on the white ink layer 101 on the object to be printed M.

On the basis of the print data, the CPU 41 determines whether or not the clear ink layer 103 shown in FIG. 16 is to be formed on the color ink layer 102 on the object to be printed M (step S408). When the clear ink layer 103 is not to be formed (no at step S408), the CPU 41 ends the main processing. In this way, in the gloss print mode, the gloss tone printed object 100C shown in FIG. 15 is created.

When the clear ink layer 103 is to be formed (yes at step S408), the CPU 41 performs the clear gloss print processing (step S409). In the clear gloss print processing, while the platen 5 moves forward, the clear ink layer 103 shown in FIG. 16 is formed on the color ink layer 102, on the object to be printed M. The CPU 41 ends the main processing. In this way, in the gloss print mode, the gloss tone printed object 100D shown in FIG. 16 is created.

Figure 21:
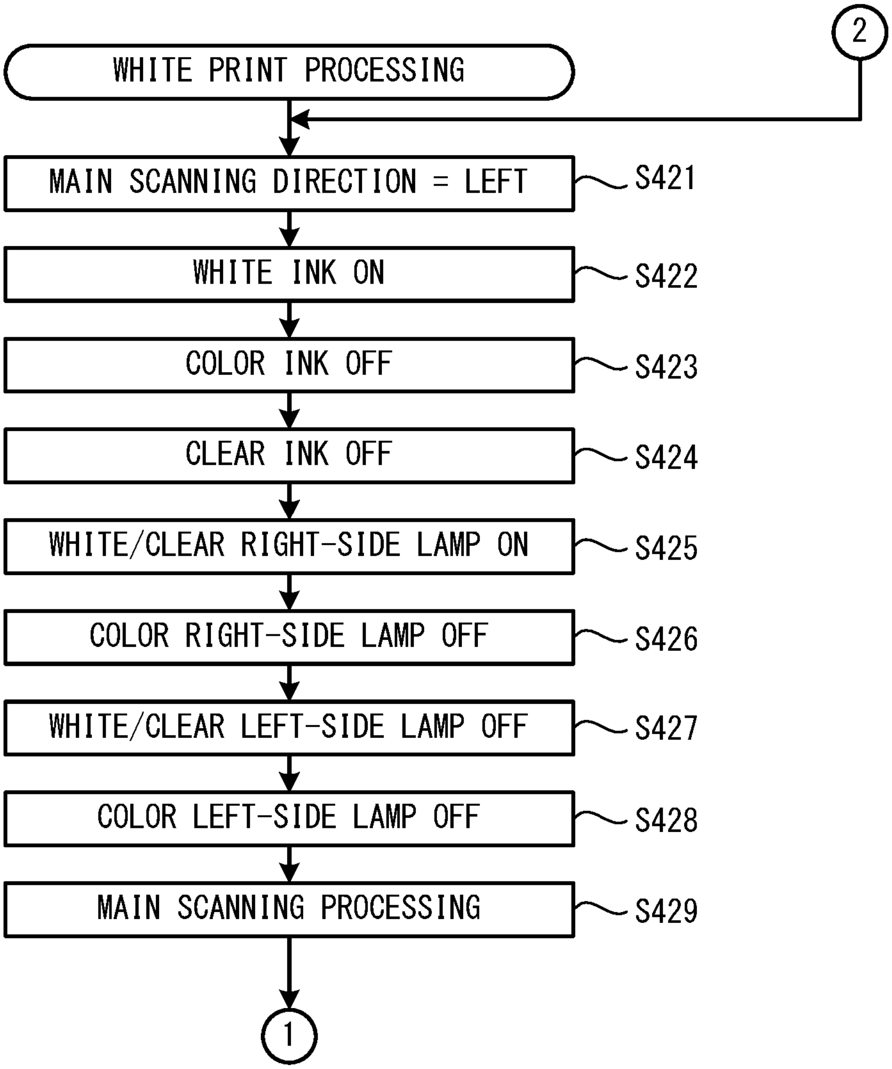
FIG. 21 is a flowchart (1/2) of white print processing according to the other modified example.

The white print processing will be described with reference to FIG. 21 and FIG. 22. As shown in FIG. 21, when the white print processing is started, the CPU 41 sets "left" as the main scanning direction (step S421). The CPU 41 sets the white ink to "ON" (step S422). The CPU 41 sets the color ink to "OFF" (step S423). The CPU 41 sets the clear ink to "OFF" (step S424). The CPU 41 sets the white/clear right-side lamp 62 to "ON" (step S425). The CPU 41 sets the color right-side lamp 61 to "OFF" (step S426). The CPU 41 sets white/clear left-side lamp 64 to "OFF" (step S427). The CPU 41 sets the color left-side lamp 63 to "OFF" (step S428).

The CPU 41 performs the main scanning processing on the basis of the settings at step S421 to step S428 (step S429). In the main scanning processing at step S429, in the movement control, the CPU 41 drives the main scanning motor 31 on the basis of the detection result from the encoder 311 shown in FIG. 4, and moves the carriage 20 shown in FIG. 18 to the left from the right end of the printing region 10 to the left end of the printing region 10. While executing the movement control, in the ejection control, the CPU 41 drives the head drive portion 33 shown in FIG. 4 on the basis of the print data, and causes the white/clear head 52 shown in FIG. 19 to eject the white ink from the nozzle row 52W. While executing the movement control, in the ejection control, the CPU 41 causes the white/clear head 52 shown in FIG. 19 to stop the ejection of the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be illuminated, and irradiates the ultraviolet light toward the object to be printed M from the white/clear right-side lamp 62. The ultraviolet light from the white/clear right-side lamp 62 is irradiated onto the white ink layer 101 shown in FIG. 5, FIG. 15, and FIG. 16. While executing the movement control, in the irradiation control, the CPU 41 causes the plurality of ultraviolet light-emitting diodes 614 shown in FIG. 19 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

Figure 22:
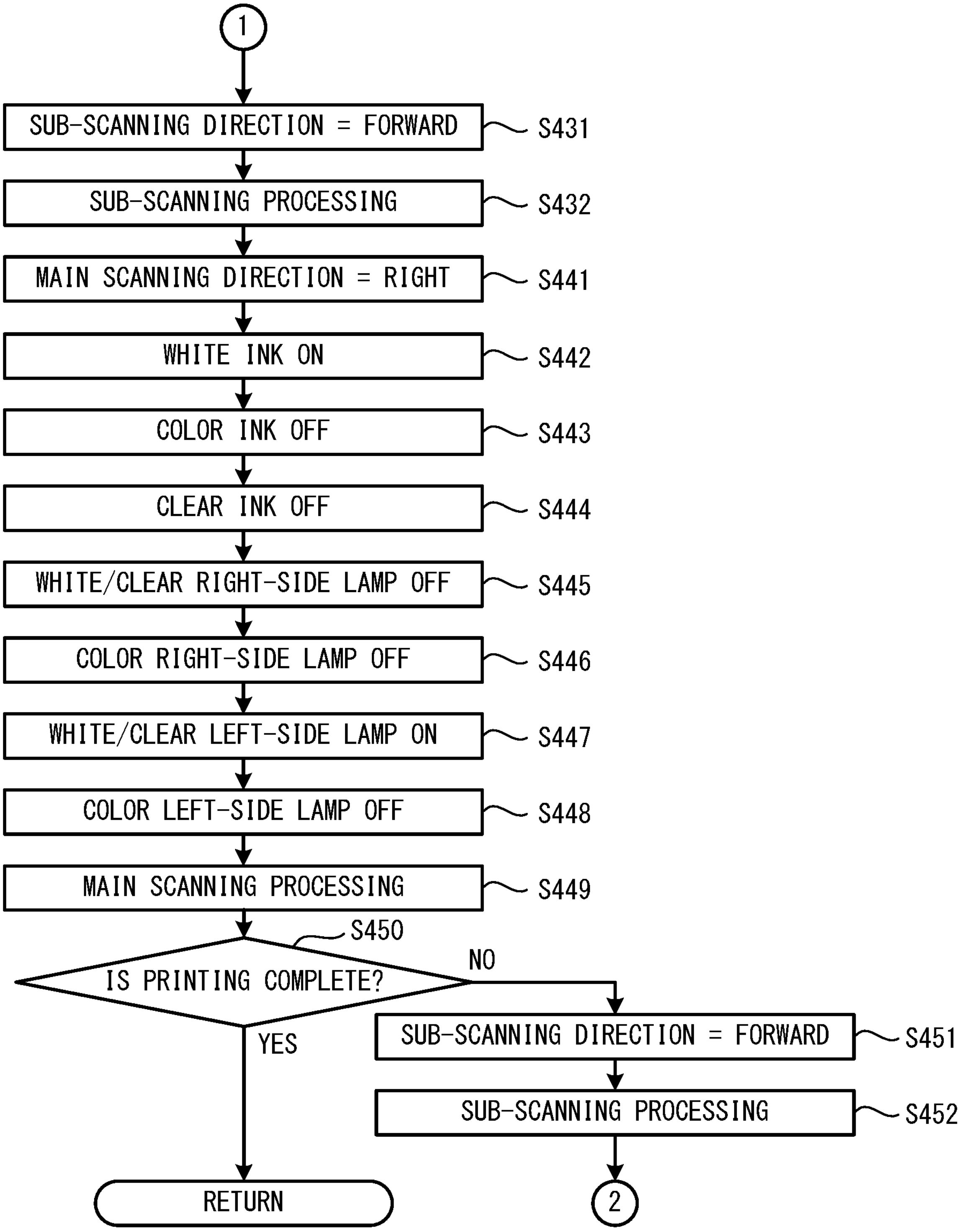
FIG. 22 is a flowchart (2/2) of the white print processing according to the other modified example.

As shown in FIG. 22, the CPU 41 sets "forward" as the sub-scanning direction (step S431). The CPU 41 performs the sub-scanning processing on the basis of the setting at step S431 (step S432). In the sub-scanning processing at step S432, the CPU 41 controls the sub-scanning motor 32 on the basis of the detection result from the encoder 321 shown in FIG. 4, and moves the platen 5 shown in FIG. 17 forward. When the platen 5 moves forward by the predetermined movement amount, the CPU 41 stops the sub-scanning motor 32 shown in FIG. 4.

The CPU 41 sets "right" as the main scanning direction (step S441). The CPU 41 sets the white ink to "ON" (step S442). The CPU 41 sets the color ink to "OFF" (step S443). The CPU 41 sets the clear ink to "OFF" (step S444). The CPU 41 sets the white/clear right-side lamp 62 to "OFF" (step S445). The CPU 41 sets the color right-side lamp 61 to "OFF" (step S446). The CPU 41 sets the white/clear left-side lamp 64 to "ON" (step S447). The CPU 41 sets the color left-side lamp 63 to "OFF" (step S448).

The CPU 41 performs the main scanning processing on the basis of the settings at step S441 to step S448 (step S449). In the main scanning processing at step S449, in the movement control, the CPU 41 drives the main scanning motor 31 on the basis of the detection result from the encoder 311 shown in FIG. 4, and moves the carriage 20 shown in FIG. 18 to the right from the left end of the printing region 10 to the right end of the printing region 10. While executing the movement control, in the ejection control, the CPU 41 drives the head drive portion 33 shown in FIG. 4 on the basis of the print data, and causes the white/clear head 52 shown in FIG. 19 to eject the white ink from the nozzle row 52W. While executing the movement control, in the ejection control, the CPU 41 causes the white/clear head 52 shown in FIG. 19 to stop the ejection of the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 shown in FIG. 19 to be illuminated, and irradiates the ultraviolet light toward the object to be printed M from the white/clear left-side lamp 64. The ultraviolet light from the white/clear left-side lamp 64 is irradiated onto the white ink layer 101 shown in FIG. 5, FIG. 15, and FIG. 16. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

On the basis of the print data, the CPU 41 determines whether, of the object to be printed M shown in FIG. 5, FIG. 15, and FIG. 16, the formation of the white ink layer 101 is complete on all of the region on which the image is to be printed (step S450). When, of the object to be printed M shown in FIG. 5, FIG. 15, and FIG. 16, the formation of the white ink layer 101 is not complete on the region on which the image is to be printed (no at step S450), the CPU 41 sets "forward" as the sub-scanning direction (step S451). The CPU 41 performs the sub-scanning processing on the basis of the setting at step S451 (step S452). In the sub-scanning processing at step S452, the CPU 41 controls the sub-scanning motor 32 on the basis of the detection result from the encoder 321 shown in FIG. 4, and moves the platen 5 shown in FIG. 17 forward. When the platen 5 shown in FIG. 17 moves forward by the predetermined movement amount, the CPU 41 stops the sub-scanning motor 32 shown in FIG. 4. The CPU 41 shifts the processing to step S421 shown in FIG. 21.

The CPU 41 repeats the main scanning processing and the sub-scanning processing until, of the object to be printed M shown in FIG. 5, FIG. 15, and FIG. 16, the formation of the white ink layer 101 is complete on all the region on which the image is to be printed. When, of the object to be printed M shown in FIG. 5, FIG. 15, and FIG. 16, the formation of the white ink layer 101 is complete on the region on which the image is to be printed (yes at step S450), the CPU 41 returns the processing to the main processing shown in FIG. 20.

A formation mode of the white ink layer 101 in the white print processing at step S402 will be described. The ultraviolet light emitted from the white/clear right-side lamp 62 during the N-th main scanning processing at step S429 shown in FIG. 21 is irradiated onto the white ink layer 101 formed in the N-th main scanning processing at step S429 shown in FIG. 21. The ultraviolet light emitted from the white/clear left-side lamp 64 during the main scanning processing at step S449 shown in FIG. 22 is irradiated onto the white ink layer 101 formed in the N-th main scanning processing at step S449 shown in FIG. 22. In this way, the time up to the irradiation of the white ink layer 101 is comparatively short.

Furthermore, both the white/clear right-side lamp 62 and the white/clear left-side lamp 64 are disposed lower than the color right-side lamp 61. Thus, the illuminance of the ultraviolet light irradiated from the white/clear right-side lamp 62 or the white/clear left-side lamp 64 is larger than when the ultraviolet light is irradiated from the color right-side lamp 61. The time up to the irradiation is comparatively short, and the illuminance is comparatively large, and thus, as shown in FIG. 5, the white ink layer 101 is cured in the state in which the smoothing has not been performed or in which the smoothing is relatively unadvanced.

Figure 23:
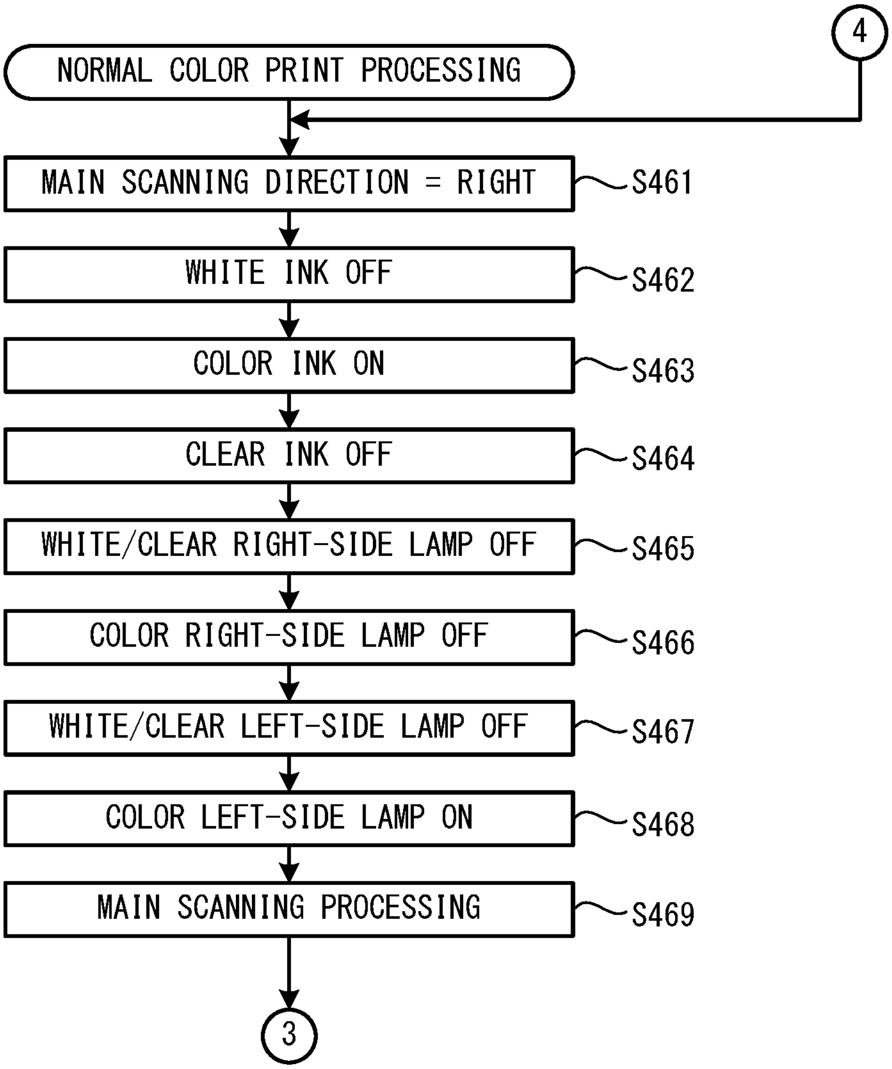
FIG. 23 is a flowchart (1/2) of normal color print processing according to the other modified example.

The normal color print processing will be described with reference to FIG. 23 and FIG. 24. As shown in FIG. 23, when the normal color print processing is started, the CPU 41 sets "right" as the main scanning direction (step S461). The CPU 41 sets the white ink to "OFF" (step S462). The CPU 41 sets the color ink to "ON" (step S463). The CPU 41 sets the clear ink to "OFF" (step S464). The CPU 41 sets the white/clear right-side lamp 62 to "OFF" (step S465). The CPU 41 sets the color right-side lamp 61 to "OFF" (step S466). The CPU 41 sets the white/clear left-side lamp 64 to "OFF" (step S467). The CPU 41 sets the color left-side lamp 63 to "ON" (step S468).

The CPU 41 performs the main scanning processing on the basis of the settings at step S461 to step S468 (step S469). In the main scanning processing at step S469, in the movement control, the CPU 41 drives the main scanning motor 31 on the basis of the detection result from the encoder 311 shown in FIG. 4, and moves the carriage 20 shown in FIG. 18 to the right from the left end of the printing region 10 to the right end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 causes the white/clear head 52 shown in FIG. 19 to stop the ejection of the clear ink from the nozzle row 52L. While executing the movement control, in the ejection control, the CPU 41 drives the head drive portion 33 shown in FIG. 4 on the basis of the print data, and causes the color head 51 shown in FIG. 19 to eject the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be illuminated, and irradiates the ultraviolet light onto the object to be printed M from the color left-side lamp 63. The ultraviolet light from the color left-side lamp 63 is irradiated onto the color ink layer 102 shown in FIG. 5.

Figure 24:
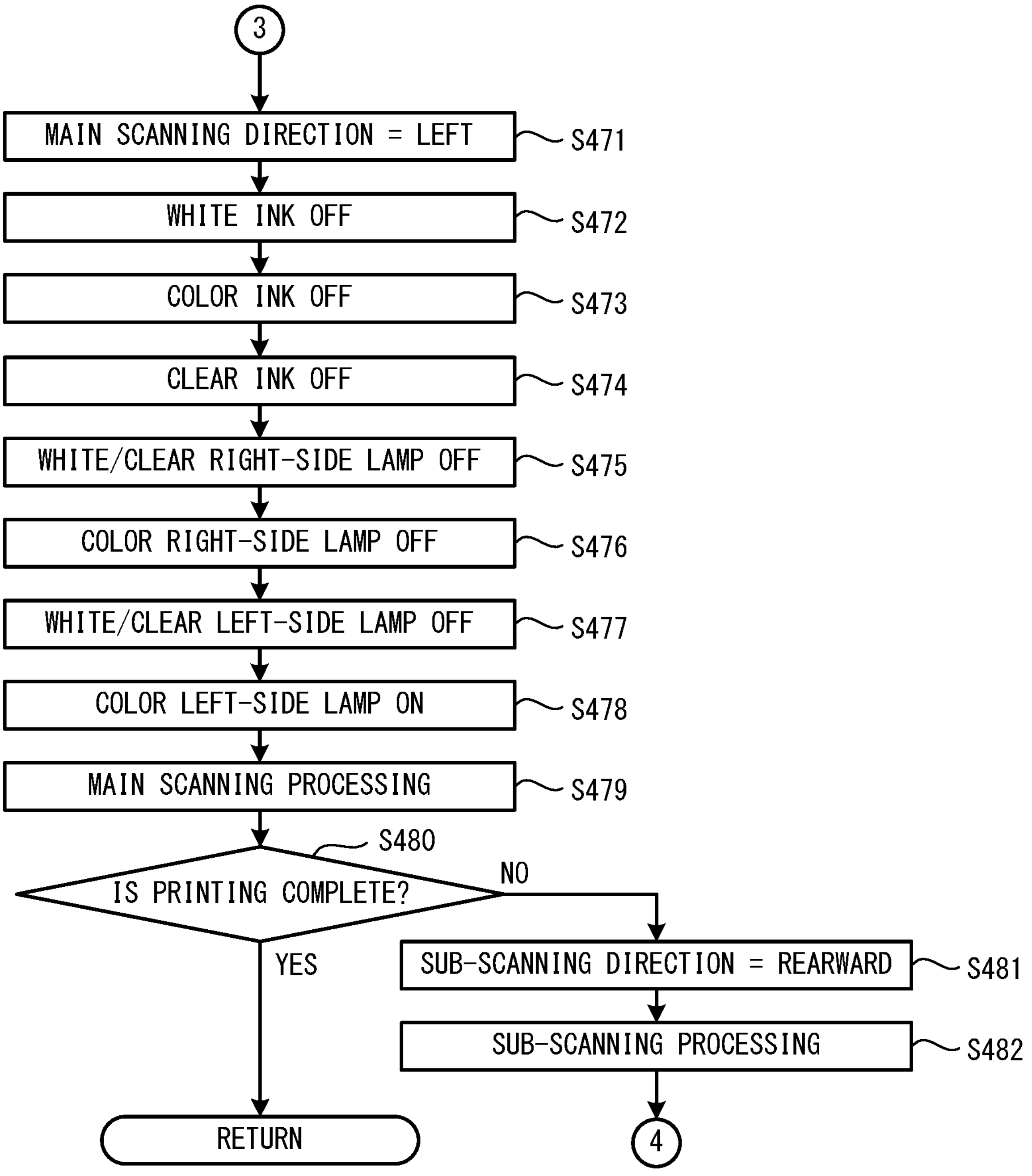
FIG. 24 is a flowchart (2/2) of the normal color print processing according to the other modified example.

As shown in FIG. 24, the CPU 41 sets “left” as the main scanning direction (step S471). The CPU 41 sets the white ink to “OFF” (step S472). The CPU 41 sets the color ink to “OFF” (step S473). The CPU 41 sets the clear ink to “OFF” (step S474). The CPU 41 sets the white/clear right-side lamp 62 to “OFF” (step S475). The CPU 41 sets the color right-side lamp 61 to “OFF” (step S476). The CPU 41 sets the white/clear left-side lamp 64 to “OFF” (step S477). The CPU 41 sets the color left-side lamp 63 to “ON” (step S478).

The CPU 41 performs the main scanning processing on the basis of the settings at step S471 to step S478 (step S479). In the main scanning processing at step S479, in the movement control, the CPU 41 drives the main scanning motor 31 on the basis of the detection result from the encoder 311 shown in FIG. 4, and moves the carriage 20 shown in FIG. 18 to the left from the right end of the printing region 10 to the left end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 causes the white/clear head 52 shown in FIG. 19 to stop the ejection of the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be illuminated, and irradiates the ultraviolet light onto the object to be printed M from the color left-side lamp 63. The ultraviolet light from the color left-side lamp 63 is irradiated onto the color ink layer 102 shown in FIG. 5.

On the basis of the print data, the CPU 41 determines whether, of the object to be printed M shown in FIG. 5, the formation of the color ink layer 102 is complete on all of the region on which the image is to be printed (step S480). When, of the object to be printed M shown in FIG. 5, the formation of the color ink layer 102 is not complete on the region on which the image is to be printed (no at step S480), the CPU 41 sets “rearward” as the sub-scanning direction (step S481). The CPU 41 performs the sub-scanning processing on the basis of the setting at step S481 (step S482). In the sub-scanning processing at step S482, the CPU 41 controls the sub-scanning motor 32 on the basis of the detection result from the encoder 321 shown in FIG. 4, and moves the platen 5 shown in FIG. 17 rearward. When the platen 5 shown in FIG. 17 moves rearward by the predetermined movement amount, the CPU 41 stops the sub-scanning motor 32 shown in FIG. 4. The CPU 41 shifts the processing to step S461 shown in FIG. 23.

The CPU 41 repeats the main scanning processing and the sub-scanning processing until, of the object to be printed M shown in FIG. 5, the formation of the color ink layer 102 is complete on all the region on which the image is to be printed. When, of the object to be printed M shown in FIG. 5, the formation of the color ink layer 102 is complete on the region on which the image is to be printed (yes at step S480), the CPU 41 returns the processing to the main processing shown in FIG. 20.

A formation mode of the color ink layer 102 in the normal color print processing at step S405 will be described. In the normal print mode, the ultraviolet light emitted from the color left-side lamp 63 during the N-th main scanning processing at step S469 shown in FIG. 23 is irradiated onto the color ink layer 102 formed in the N-th main scanning processing at step S469 shown in FIG. 23. The ultraviolet light emitted from the color left-side lamp 63 during the N-th main scanning processing at step S479 shown in FIG. 24 is irradiated onto the color ink layer 102 formed in the N-th main scanning processing at step S479 shown in FIG. 24. In this way, in the normal print mode, the time up to the irradiation of the color ink layer 102 is comparatively short.

Furthermore, the color left-side lamp 63 is disposed lower than the color right-side lamp 61. Thus, the illuminance of the ultraviolet light irradiated from the color left-side lamp 63 is larger than when the ultraviolet light is irradiated from the color right-side lamp 61. In the normal print mode, the time up to the irradiation is comparatively short, and the illuminance is comparatively large, and thus, as shown in FIG. 5, the color ink layer 102 is cured in the state in which the smoothing has not been performed or in which the smoothing is relatively unadvanced.

Figure 25:
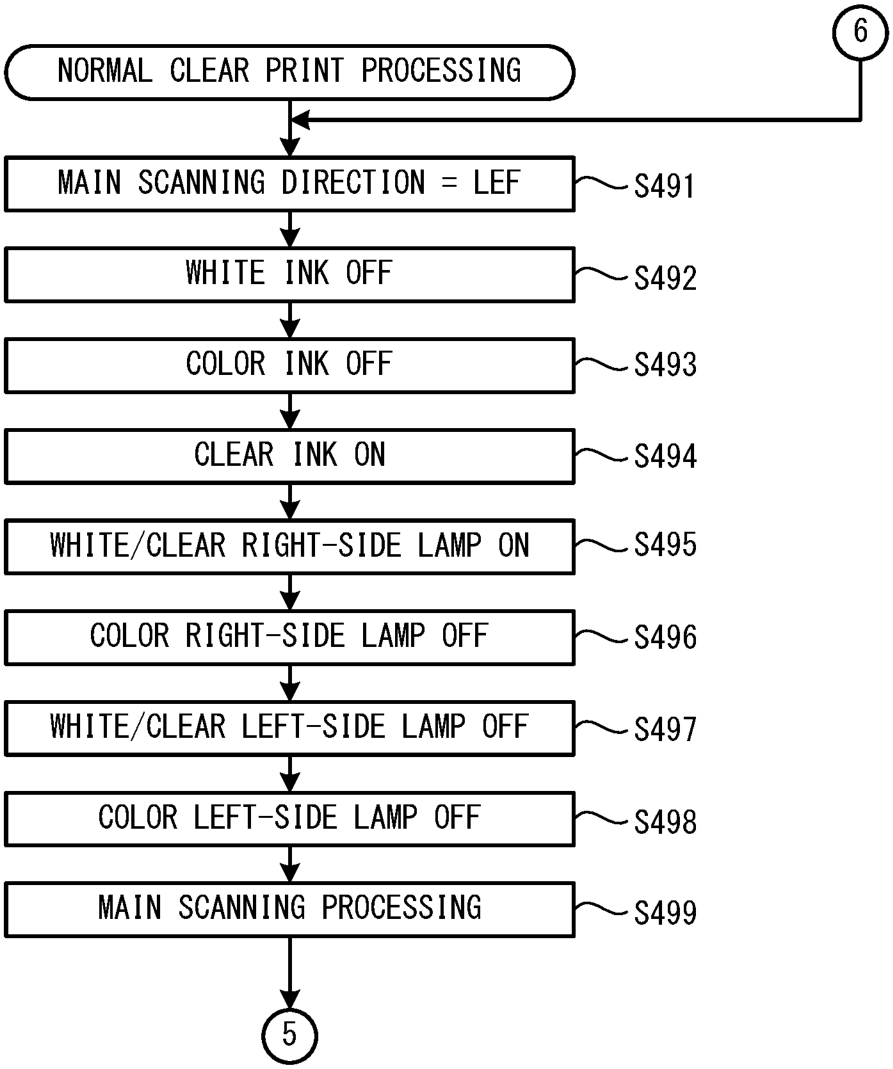
FIG. 25 is a flowchart (1/2) of the normal clear print processing according to the other modified example.

The normal clear print processing will be described with reference to FIG. 25 and FIG. 26. As shown in FIG. 25, when the normal clear print processing is started, the CPU 41 sets "left" as the main scanning direction (step S491). The CPU 41 sets the white ink to "OFF" (step S492). The CPU 41 sets the color ink to "OFF" (step S493). The CPU 41 sets the clear ink to "ON" (step S494). The CPU 41 sets the white/clear right-side lamp 62 to "ON" (step S495). The CPU 41 sets the color right-side lamp 61 to "OFF" (step S496). The CPU 41 sets the white/clear left-side lamp 64 to "OFF" (step S497). The CPU 41 sets the color left-side lamp 63 to "OFF" (step S498).

The CPU 41 performs the main scanning processing on the basis of the settings at step S491 to step S498 (step S499). In the main scanning processing at step S499, in the movement control, the CPU 41 drives the main scanning motor 31 on the basis of the detection result from the encoder 311 shown in FIG. 4, and moves the carriage 20 shown in FIG. 18 to the left from the right end of the printing region 10 to the left end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 drives the head drive portion 33 shown in FIG. 4 on the basis of the print data, and causes the white/clear head 52 shown in FIG. 19 to eject the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be illuminated, and irradiates the ultraviolet light toward the object to be printed M from the white/clear right-side lamp 62. The ultraviolet light from the white/clear right-side lamp 62 is irradiated onto the clear ink layer 103 shown in FIG. 5. While executing the movement control, in the irradiation control, the CPU 41 causes the plurality of ultraviolet light-emitting diodes 614 shown in FIG. 19 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

Figure 26:
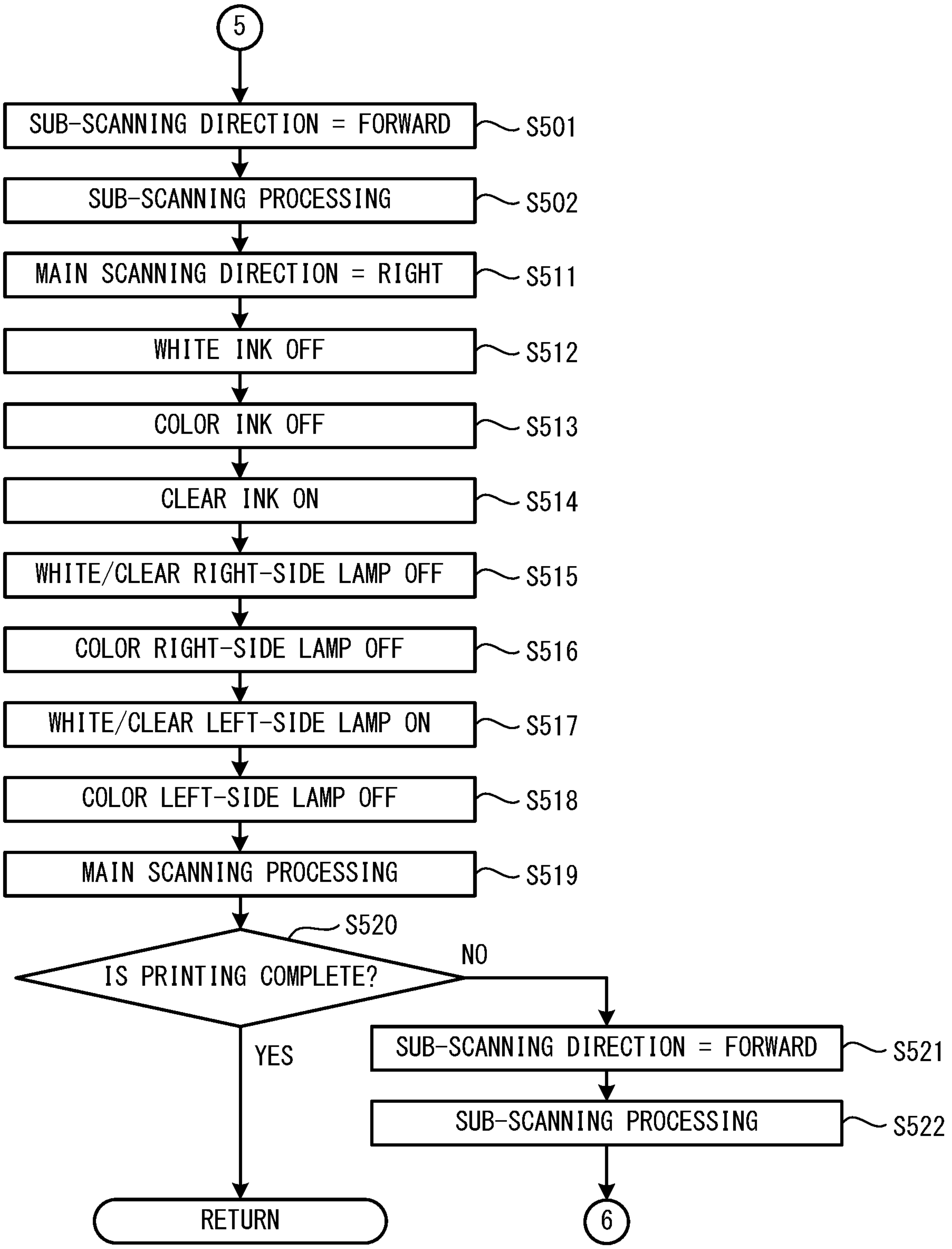
FIG. 26 is a flowchart (2/2) of the normal clear print processing according to the other modified example.

As shown in FIG. 26, the CPU 41 sets "forward" as the sub-scanning direction (step S501). The CPU 41 performs the sub-scanning processing on the basis of the setting at step S501 (step S502). In the sub-scanning processing at step S502, the CPU 41 controls the sub-scanning motor 32 on the basis of the detection result from the encoder 321 shown in FIG. 4, and moves the platen 5 shown in FIG. 17 forward. When the platen 5 moves forward by the predetermined movement amount, the CPU 41 stops the sub-scanning motor 32 shown in FIG. 4.

The CPU 41 sets "right" as the main scanning direction (step S511). The CPU 41 sets the white ink to "OFF" (step S512). The CPU 41 sets the color ink to "OFF" (step S513). The CPU 41 sets the clear ink to "ON" (step S514). The CPU 41 sets the white/clear right-side lamp 62 to "OFF" (step S515). The CPU 41 sets the color right-side lamp 61 to "OFF" (step S516). The CPU 41 sets the white/clear left-side lamp 64 to "ON" (step S517). The CPU 41 sets the color left-side lamp 63 to "OFF" (step S518).

The CPU 41 performs the main scanning processing on the basis of the settings at step S511 to step S518 (step S519). In the main scanning processing at step S519, in the movement control, the CPU 41 drives the main scanning motor 31 on the basis of the detection result from the encoder 311 shown in FIG. 4, and moves the carriage 20 shown in FIG. 18 to the right from the left end of the printing region 10 to the right end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 drives the head drive portion 33 shown in FIG. 4 on the basis of the print data, and causes the white/clear head 52 shown in FIG. 19 to eject the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 shown in FIG. 19 to be illuminated, and irradiates the ultraviolet light toward the object to be printed M from the white/clear left-side lamp 64. The ultraviolet light from the white/clear left-side lamp 64 is irradiated onto the clear ink layer 103 shown in FIG. 5. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

On the basis of the print data, the CPU 41 determines whether, of the object to be printed M shown in FIG. 5, the formation of the clear ink layer 103 is complete on all of the region on which the image is to be printed (step S520). When, of the object to be printed M shown in FIG. 5, the formation of the clear ink layer 103 is not complete on the region on which the image is to be printed (no at step S520), the CPU 41 sets "forward" as the sub-scanning direction (step S521). The CPU 41 performs the sub-scanning processing on the basis of the setting at step S521 (step S522). In the sub-scanning processing at step S522, the CPU 41 controls the sub-scanning motor 32 on the basis of the detection result from the encoder 321 shown in FIG. 4, and moves the platen 5 shown in FIG. 17 forward. When the platen 5 shown in FIG. 17 moves forward by the predetermined movement amount, the CPU 41 stops the sub-scanning motor 32 shown in FIG. 4. The CPU 41 shifts the processing to step S491 shown in FIG. 25.

The CPU 41 repeats the main scanning processing and the sub-scanning processing until, of the object to be printed M shown in FIG. 5, the formation of the clear ink layer 103 is complete on all the region on which the image is to be printed. When, of the object to be printed M shown in FIG. 5, the formation of the clear ink layer 103 is complete on the region on which the image is to be printed (yes at step S520), the CPU 41 returns the processing to the main processing shown in FIG. 20.

A formation mode of the clear ink layer 103 in the normal clear print processing at step S406 will be described. In the normal print mode, the ultraviolet light emitted from the white/clear right-side lamp 62 during the N-th main scanning processing at step S499 shown in FIG. 25 is irradiated onto the clear ink layer 103 formed in the N-th main scanning processing at step S499 shown in FIG. 25. The ultraviolet light emitted from the white/clear left-side lamp 64 during the N-th main scanning processing at step S519 shown in FIG. 26 is irradiated onto the clear ink layer 103 formed in the N-th main scanning processing at step S519 shown in FIG. 26. In this way, in the normal print mode, the time up to the irradiation of the clear ink layer 103 is comparatively short.

Furthermore, both the white/clear right-side lamp 62 and the white/clear left-side lamp 64 are disposed lower than the color right-side lamp 61. Thus, the illuminance of the ultraviolet light irradiated from the white/clear right-side lamp 62 or the white/clear left-side lamp 64 is larger than when the ultraviolet light is irradiated from the color right-side lamp 61. In the normal print mode, the time up to the irradiation is comparatively short, and the illuminance is comparatively large, and thus, as shown in FIG. 5, the clear ink layer 103 is cured in the state in which the smoothing has not been performed or in which the smoothing is relatively unadvanced.

Figure 27:
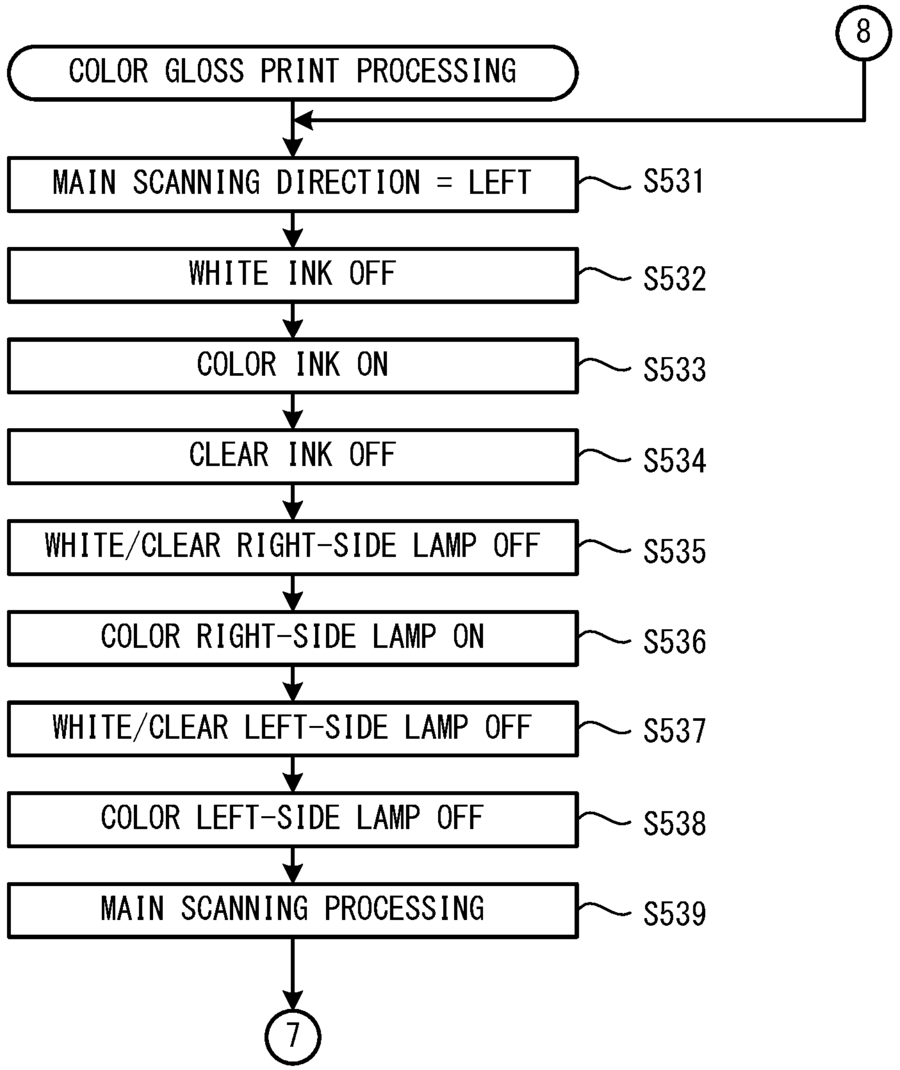
FIG. 27 is a flowchart (1/2) of color gloss print processing according to the other modified example.

The color gloss print processing will be described with reference to FIG. 27 and FIG. 28. As shown in FIG. 27, when the color gloss print processing is started, the CPU 41 sets "left" as the main scanning direction (step S531). The CPU 41 sets the white ink to "OFF" (step S532). The CPU 41 sets the color ink to "ON" (step S533). The CPU 41 sets the clear ink to "OFF" (step S534). The CPU 41 sets the white/clear right-side lamp 62 to "OFF" (step S535). The CPU 41 sets the color right-side lamp 61 to "ON" (step S536). The CPU 41 sets the white/clear left-side lamp 64 to "OFF" (step S537). The CPU 41 sets the color left-side lamp 63 to "OFF" (step S538).

The CPU 41 performs the main scanning processing on the basis of the settings at step S531 to step S538 (step S539). In the main scanning processing at step S539, in the movement control, the CPU 41 drives the main scanning motor 31 on the basis of the detection result from the encoder 311 shown in FIG. 4, and moves the carriage 20 shown in FIG. 18 to the left from the right end of the printing region 10 to the left end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 drives the head drive portion 33 on the basis of the print data, and causes the white/clear head 52 shown in FIG. 19 to eject the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be illuminated, and irradiates the ultraviolet light toward the object to be printed M from the color right-side lamp 61. The ultraviolet light from the color right-side lamp 61 is irradiated onto the color ink layer 102 shown in FIG. 15 and FIG. 16. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

Figure 28:
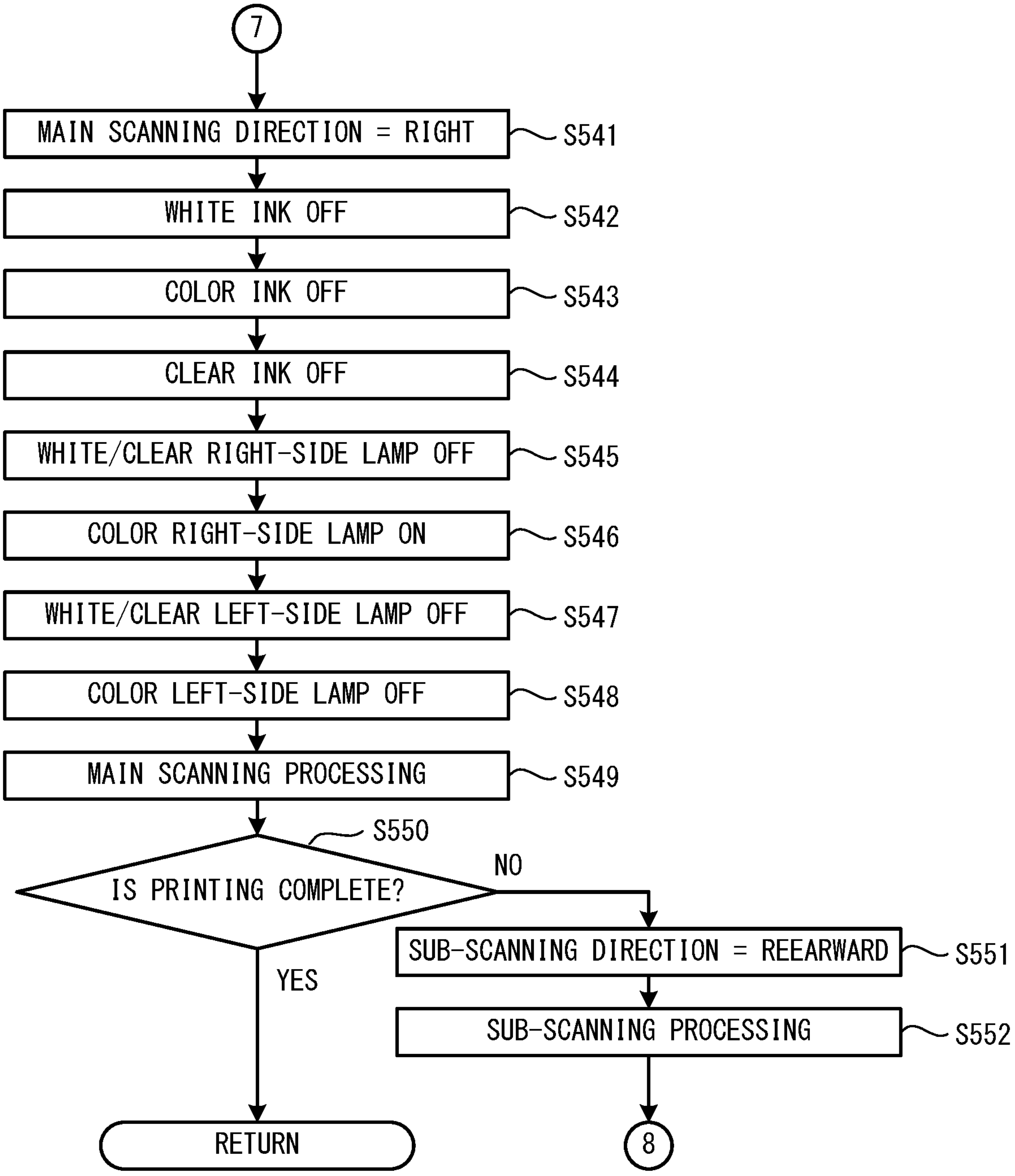
FIG. 28 is a flowchart (2/2) of the color gloss print processing according to the other modified example.

As shown in FIG. 28, the CPU 41 sets "right" as the main scanning direction (step S541). The CPU 41 sets the white ink to "OFF" (step S542). The CPU 41 sets the color ink to "OFF" (step S543). The CPU 41 sets the clear ink to "OFF" (step S544). The CPU 41 sets the white/clear right-side lamp 62 to "OFF" (step S545). The CPU 41 sets the color right-side lamp 61 to "ON" (step S546). The CPU 41 sets the white/clear left-side lamp 64 to "OFF" (step S547). The CPU 41 sets the color left-side lamp 63 to "OFF" (step S548).

The CPU 41 performs the main scanning processing on the basis of the settings at step S541 to step S548 (step S549). In the main scanning processing at step S549, in the movement control, the CPU 41 drives the main scanning motor 31 on the basis of the detection result from the encoder 311 shown in FIG. 4, and moves the carriage 20 shown in FIG. 18 to the right from the left end of the printing region 10 to the right end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 causes the white/clear head 52 shown in FIG. 19 to stop the ejection of the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be illuminated, and irradiates the ultraviolet light toward the object to be printed M from the color right-side lamp 61. The ultraviolet light from the color right-side lamp 61 is irradiated onto the color ink layer 102 shown in FIG. 15 and FIG. 16. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

On the basis of the print data, the CPU 41 determines whether, of the object to be printed M shown in FIG. 15 and FIG. 16, the formation of the color ink layer 102 is complete on all of the region on which the image is to be printed (step S550). When, of the object to be printed M shown in FIG. 15 and FIG. 16, the formation of the color ink layer 102 is not complete on the region on which the image is to be printed (no at step S550), the CPU 41 sets "rearward" as the sub-scanning direction (step S551). The CPU 41 performs the sub-scanning processing on the basis of the setting at step S551 (step S552). In the sub-scanning processing at step S552, the CPU 41 controls the sub-scanning motor 32 on the basis of the detection result from the encoder 321 shown in FIG. 4, and moves the platen 5 shown in FIG. 17 rearward. When the platen 5 shown in FIG. 17 moves rearward by the predetermined movement amount, the CPU 41 stops the sub-scanning motor 32 shown in FIG. 4. The CPU 41 shifts the processing to step S531 shown in FIG. 27.

The CPU 41 repeats the main scanning processing and the sub-scanning processing until, of the object to be printed M shown in FIG. 15 and FIG. 16, the formation of the color ink layer 102 is complete on all the region on which the image is to be printed. When, of the object to be printed M shown in FIG. 15 and FIG. 16, the formation of the color ink layer 102 is complete on the region on which the image is to be printed (yes at step S550), the CPU 41 returns the processing to the main processing shown in FIG. 20.

A formation mode of the color ink layer 102 in the color gloss print processing at step S407 will be described. The color right-side lamp 61 is disposed higher than the color left-side lamp 63. Thus, the illuminance of the ultraviolet light irradiated from the color right-side lamp 61 is smaller than when the ultraviolet light is irradiated from the color left-side lamp 63. In the gloss print mode, the ultraviolet light emitted from the color right-side lamp 61 is irradiated onto the color ink layer 102. Thus, in the gloss print mode, as shown in FIG. 15 and FIG. 16, the color ink layer 102 is cured in a state in which the smoothing is relatively advanced.

Figure 29:
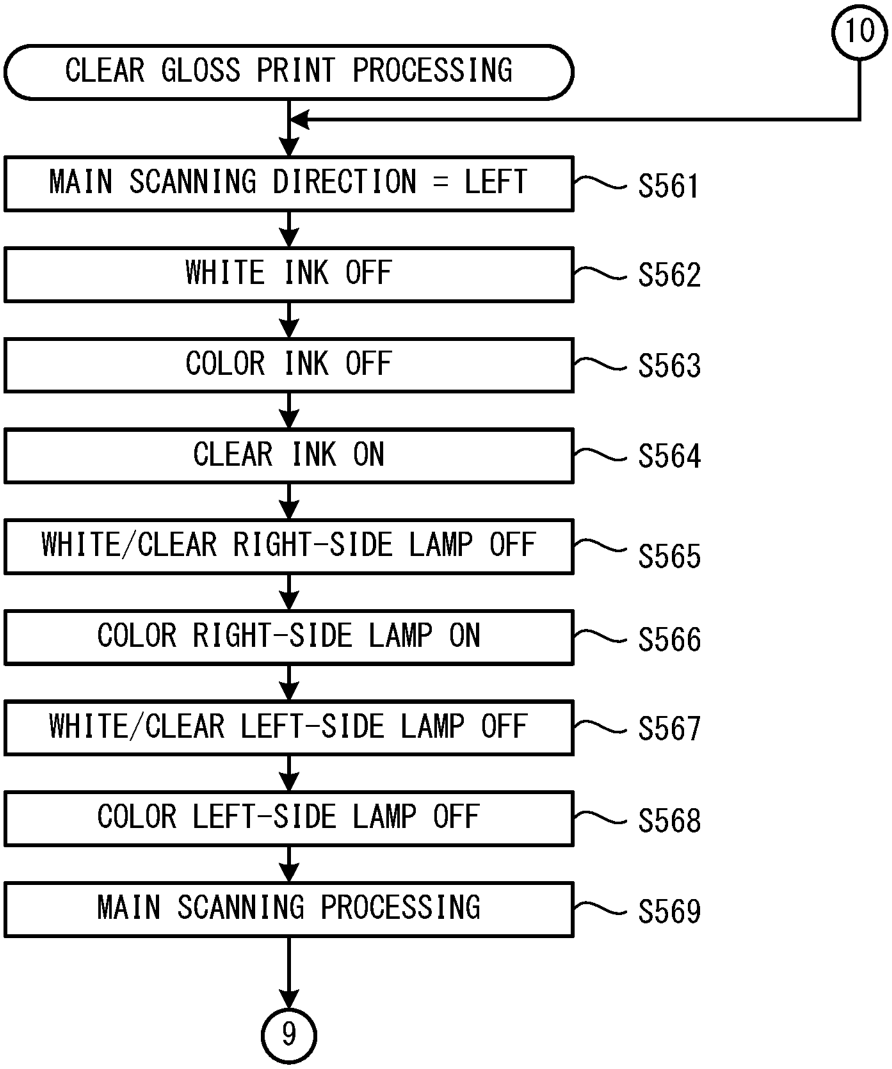
FIG. 29 is a flowchart (1/2) of the clear gloss print processing according to the other modified example.

The clear gloss print processing will be described with reference to FIG. 29 and FIG. 30. As shown in FIG. 29, when the clear gloss print processing is started, the CPU 41 sets "left" as the main scanning direction (step S561). The CPU 41 sets the white ink to "OFF" (step S562). The CPU 41 sets the color ink to "OFF" (step S563). The CPU 41 sets the clear ink to "ON" (step S564). The CPU 41 sets the white/clear right-side lamp 62 to "OFF" (step S565). The CPU 41 sets the color right-side lamp 61 to "ON" (step S566). The CPU 41 sets the white/clear left-side lamp 64 to "OFF" (step S567). The CPU 41 sets the color left-side lamp 63 to "OFF" (step S568).

The CPU 41 performs the main scanning processing on the basis of the settings at step S561 to step S568 (step S569). In the main scanning processing at step S569, in the movement control, the CPU 41 drives the main scanning motor 31 on the basis of the detection result from the encoder 311 shown in FIG. 4, and moves the carriage 20 shown in FIG. 18 to the left from the right end of the printing region 10 to the left end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 drives the head drive portion 33 shown in FIG. 4 on the basis of the print data, and causes the white/clear head 52 shown in FIG. 19 to eject the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be illuminated, and irradiates the ultraviolet light toward the object to be printed M from the color right-side lamp 61. The ultraviolet light from the color right-side lamp 61 is irradiated onto the clear ink layer 103 shown in FIG. 16. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

Figure 30:
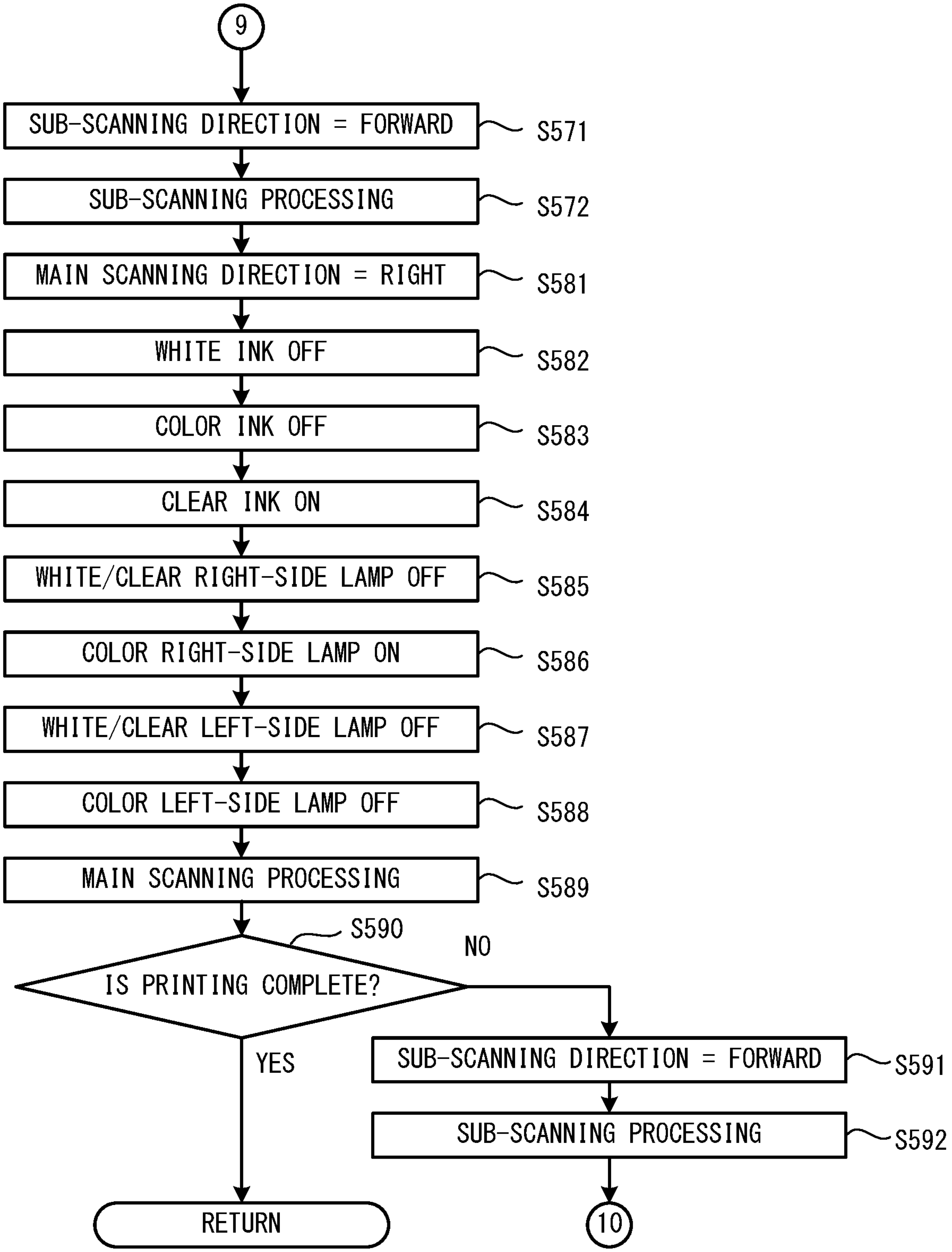
FIG. 30 is a flowchart (2/2) of the clear gloss print processing according to the other modified example.

As shown in FIG. 30, the CPU 41 sets "forward" as the sub-scanning direction (step S571). The CPU 41 performs the sub-scanning processing on the basis of the setting at step S571 (step S572). In the sub-scanning processing at step S572, the CPU 41 controls the sub-scanning motor 32 on the basis of the detection result from the encoder 321 shown in FIG. 4, and moves the platen 5 shown in FIG. 17 forward. When the platen 5 moves forward by the predetermined movement amount, the CPU 41 stops the sub-scanning motor 32 shown in FIG. 4.

The CPU 41 sets "right" as the main scanning direction (step S581). The CPU 41 sets the white ink to "OFF" (step S582). The CPU 41 sets the color ink to "OFF" (step S583). The CPU 41 sets the clear ink to "ON" (step S584). The CPU 41 sets the white/clear right-side lamp 62 to "OFF" (step S585). The CPU 41 sets the color right-side lamp 61 to "ON" (step S586). The CPU 41 sets the white/clear left-side lamp 64 to "OFF" (step S587). The CPU 41 sets the color left-side lamp 63 to "OFF" (step S588).

The CPU 41 performs the main scanning processing on the basis of the settings at step S581 to step S588 (step S589). In the main scanning processing at step S589, in the movement control, the CPU 41 drives the main scanning motor 31 on the basis of the detection result from the encoder 311 shown in FIG. 4, and moves the carriage 20 shown in FIG. 18 to the right from the left end of the printing region 10 to the right end of the printing region 10. While executing the movement control, in the ejection control, the CPU 41 causes the white/clear head 52 shown in FIG. 19 to stop the ejection of the white ink from the nozzle row 52W. While executing the movement control, in the ejection control, the CPU 41 drives the head drive portion 33 shown in FIG. 4 on the basis of the print data, and causes the white/clear head 52 shown in FIG. 19 to eject the clear ink from the nozzle row 52L. While executing the movement control, in the ejection control, the CPU 41 causes the color head 51 shown in FIG. 19 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 19 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 19 to be illuminated, and irradiates the ultraviolet light toward the object to be printed M from the color right-side lamp 61. The ultraviolet light from the color right-side lamp 61 is irradiated onto the clear ink layer 103 shown in FIG. 16. While executing the movement control, in the irradiation control, the CPU 41 causes the plurality of ultraviolet light-emitting diodes 644 shown in FIG. 19 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 19 to be extinguished, and stops the irradiation of the ultraviolet light onto the object to be printed M from the color left-side lamp 63.

On the basis of the print data, the CPU 41 determines whether, of the object to be printed M shown in FIG. 16, the formation of the clear ink layer 103 is complete on all of the region on which the image is to be printed (step 590). When, of the object to be printed M shown in FIG. 16, the formation of the clear ink layer 103 is not complete on the region on which the image is to be printed (no at step S590), the CPU 41 sets "forward" as the sub-scanning direction (step S591). The CPU 41 performs the sub-scanning processing on the basis of the setting at step S591 (step S592). In the sub-scanning processing at step S592, the CPU 41 controls the sub-scanning motor 32 on the basis of the detection result from the encoder 321 shown in FIG. 4, and moves the platen 5 shown in FIG. 17 forward. When the platen 5 shown in FIG. 17 moves forward by the predetermined movement amount, the CPU 41 stops the sub-scanning motor 32 shown in FIG. 4. The CPU 41 shifts the processing to step S561 shown in FIG. 29.

The CPU 41 repeats the main scanning processing and the sub-scanning processing until, of the object to be printed M shown in FIG. 16, the formation of the clear ink layer 103 is complete on all the region on which the image is to be printed. When, of the object to be printed M shown in FIG. 16, the formation of the clear ink layer 103 is complete on all of the region on which the image is to be printed (yes at step S590), the CPU 41 returns the processing to the main processing shown in FIG. 20.

A formation mode of the clear ink layer 103 in the clear gloss print processing at step S409 will be described. In a similar manner to the formation mode of the clear ink layer 103 in the clear gloss print processing at step S305, in the gloss print mode, in addition to the time up to the irradiation of the clear ink layer 103 being comparatively long, the ultraviolet light having the comparatively small illuminance is irradiated from the color right-side lamp 61 onto the clear ink layer 103. Thus, in the gloss print mode, as shown in FIG. 16, the clear ink layer 103 is cured in the state in which the smoothing is relatively advanced.

As described above, in the other modified example, the color right-side lamp 61 is disposed, in the up-down direction, at a position separated from the platen 5 that is lower than the position of the color left-side lamp 63 with respect to the platen 5. As a result, when the ultraviolet light is irradiated from the color right-side lamp 61, the illuminance is smaller than when the ultraviolet light is irradiated from the color left-side lamp 63. In the gloss print mode, when "left" is set as the main scanning direction, in the main scanning processing, the ultraviolet light is irradiated from the color right-side lamp 61 onto the color ink layer 102. Thus, in the gloss print mode, the printer 1C can smooth the color ink layer 102. In the normal print mode, when "right" is set as the main scanning direction, in the main scanning processing, the ultraviolet light is irradiated from the color left-side lamp 63 onto the color ink layer 102. Thus, in the normal print mode, the printer 1C can cause the color ink layer 102 to be cured in the state in which the smoothing has not been performed or the state in which the smoothing is relatively unadvanced.

The printer 1C is provided with the white/clear left-side lamp 64. Thus, in addition to when "left" is set as the main scanning direction, also when "right" is set, the printer 1C can perform so-called bi-directional printing in which the main scanning processing is performed with the white ink "ON."

Figure 31:
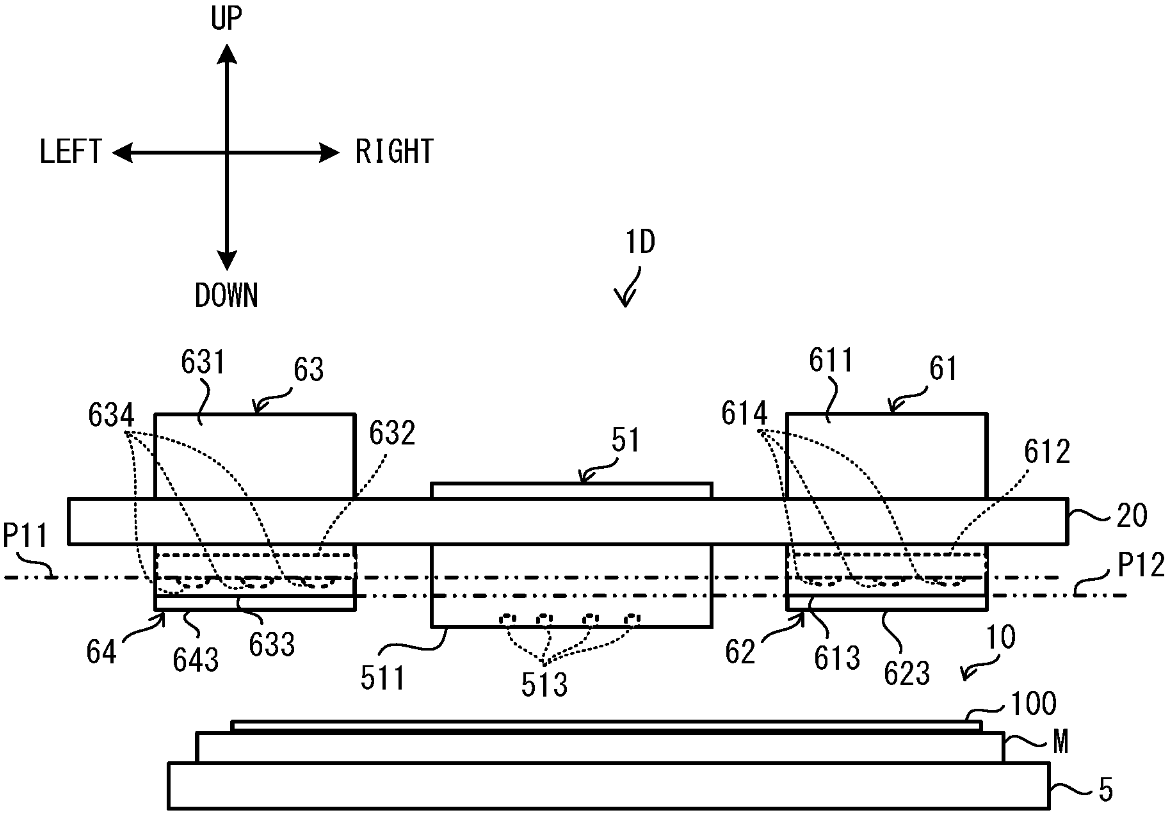
FIG. 31 is a schematic diagram of a printer as viewed from the front.

A printer 1D according to yet another modified example of the present disclosure will be described with reference to FIG. 31 to FIG. 34. In a similar manner to the printers 1A, 1B, and 1C, the printer 1D shown in FIG. 31 is an inkjet-type UV printer. The printer 1D differs from the printer 1C in that the positional relationship in the up-down direction between the color left-side lamp 63 and the color right-side lamp 61 is different. The remaining mechanical configuration and the electrical configuration of the printer 1D are, respectively, the same as the mechanical configuration and the electrical configuration of the printer 1C. In the yet another modified example, the members that have the same or equivalent functions as those of the above-described other modified example are assigned the same or corresponding reference signs as those of the above-described other modified example, and a description thereof will be omitted or simplified.

In FIG. 31, a section of the white/clear right-side lamp 62 other than a lower portion thereof is hidden to the rear of the color right-side lamp 61. In FIG. 31, a section of the white/clear left-side lamp 64 other than the lower portion thereof is hidden to the rear of the color left-side lamp 63.

As shown in FIG. 31, the color right-side lamp 61 and the color left-side lamp 63 are disposed at the same positions as each other in the up-down direction. More specifically, the plurality of ultraviolet light-emitting diodes 614 and 634 are disposed at a position P11 that is the same for each in the up-down direction. In other words, the respective lower surfaces of the substrate 612 and the substrate 632 are positioned at the same position P11 as each other in the up-down direction. The housings 611 and 631 are disposed at a position P12 that is the same for each in the up-down direction. In other words, the facing surfaces 613 and 633 are positioned at the same position P12 as each other in the up-down direction. As a result, the color right-side lamp 61 and the color left-side lamp 63 are both disposed higher than both the white/clear right-side lamp 62 and the white/clear left-side lamp 64.

Figure 32:
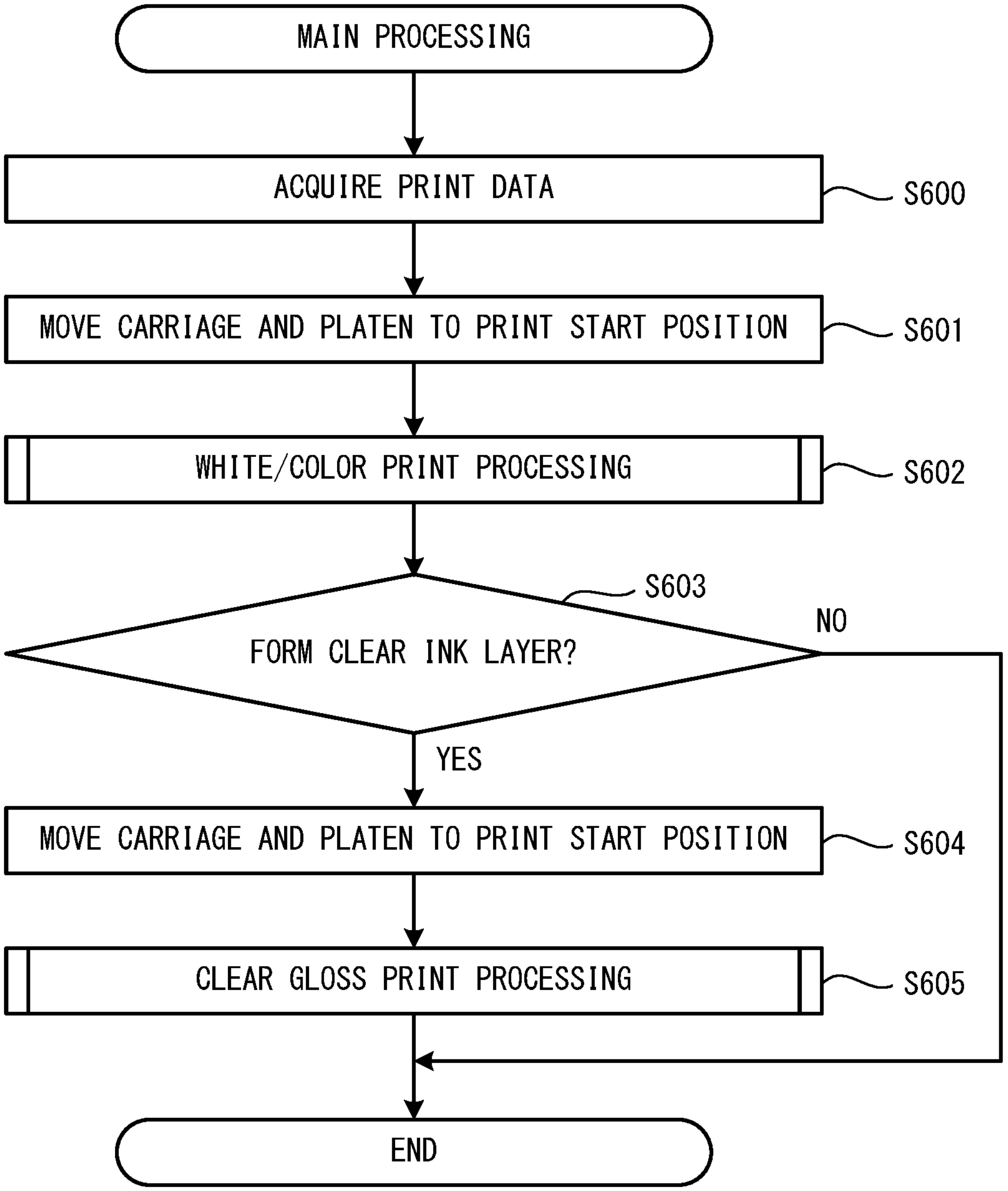
FIG. 32 is a flowchart of the main processing according to yet another modified example.

The main processing will be described with reference to FIG. 32. In the yet another modified example, when the print command is input in the gloss print mode, the CPU 41 performs the main processing shown in FIG. 32 by reading out and executing the control program from the ROM 42.

Hereinafter, the description will be made using cases in which the gloss tone printed object 100C shown in FIG. 15 or the gloss tone printed object 100D shown in FIG. 16 are created, as an example. At the start of the main processing shown in FIG. 32, it is assumed that the platen 5 is positioned at the set position shown in FIG. 1, and the carriage 20 is positioned at the stand-by position shown in FIG. 1.

When the main processing is started, the CPU 41 acquires, from the flash memory 44, the print data specified by the print command, and stores the acquired print data in the RAM 43 (step S600). The CPU 41 controls the sub-scanning motor 32 on the basis of the detection result from the encoder 321 shown in FIG. 4, and moves the platen 5 shown in FIG. 31 to the rear, to the platen print start position (not shown in the drawings) (step S601). As described above, when the platen 5 is positioned at the platen print start position, the front end of the region (not shown in the drawings) on which the image is to be printed, of the object to be printed M shown in FIG. 31, is disposed further to the rear than the white/clear head 52 shown in FIG. 31. The CPU 41 controls the main scanning motor 31 on the basis of the detection result from the encoder 311 shown in FIG. 4, and moves the carriage 20 to the right from the stand-by position shown in FIG. 1, to the carriage print start position (step S601). As described above, when the carriage 20 is positioned at the carriage print start position, the color head 51 and the white/clear head 52 shown in FIG. 31 are disposed further to the right than the right end of the region (not shown in the drawings) on which the image is to be printed, of the object to be printed M shown in FIG. 31.

The CPU 41 performs the white/color print processing (step S602). In the white/color print processing at step S602, while the platen 5 moves forward from the platen print start position, the white ink layer 101 and the color ink layer 102 shown in FIG. 15 and FIG. 16 are formed on the object to be printed M.

The CPU 41 determines, on the basis of the print data, whether or not the clear ink layer 103 shown in FIG. 16 is to be formed on the color ink layer 102 on the object to be printed M (step S603). When the clear ink layer 103 is not to be formed (no at step S603), the CPU 41 ends the main processing. In this way, in the gloss print mode, the gloss tone printed object 100C shown in FIG. 15 is created.

When the clear ink layer 103 is to be formed (yes at step S603), the CPU 41 controls the sub-scanning motor 32 on the basis of the detection result from the encoder 321 shown in FIG. 4, and moves the platen 5 shown in FIG. 31 to the rear, to the platen print start position (not shown in the drawings) (step S604). As described above, when the platen 5 is positioned at the platen print start position, the front end of the region (not shown in the drawings) on which the image is to be printed, of the object to be printed M shown in FIG. 31, is disposed further to the rear than the white/clear head 52 shown in FIG. 31.

The CPU 41 performs the clear gloss print processing (step S605). The clear gloss print processing at step S605 is the same as the clear gloss print processing at step S409 shown in FIG. 20. In other words, in the clear gloss print processing at step S605, while the platen 5 moves forward from the platen print start position, the clear ink layer 103 shown in FIG. 16 is formed on the object to be printed M. The CPU 41 ends the main processing. In this way, in the gloss print mode, the gloss tone printed object 100D shown in FIG. 16 is created.

Figure 20:
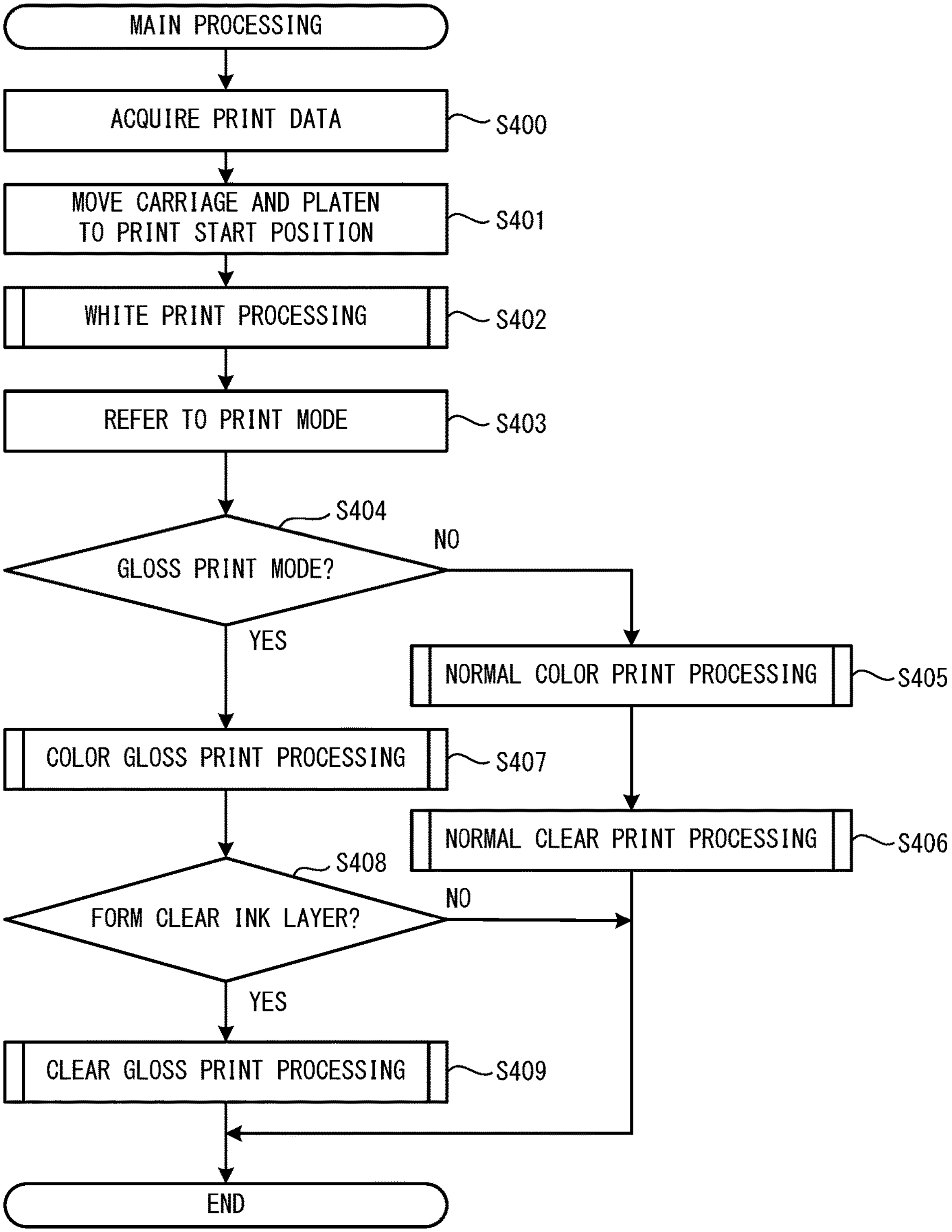
FIG. 20 is a flowchart of main processing according to the other modified example.

A formation mode of the clear ink layer 103 in the clear gloss print processing at step S605 is the same as the formation mode of the clear ink layer 103 in the clear gloss print processing at step S409 shown in FIG. 20. In other words, in addition to the time up to the irradiation of the clear ink layer 103 being comparatively long, the ultraviolet light having the comparatively small illuminance is irradiated onto the clear ink layer 103 from the color right-side lamp 61. Thus, in the gloss print mode, as shown in FIG. 16, the clear ink layer 103 is cured in the state in which the smoothing is relatively advanced.

Figure 33:
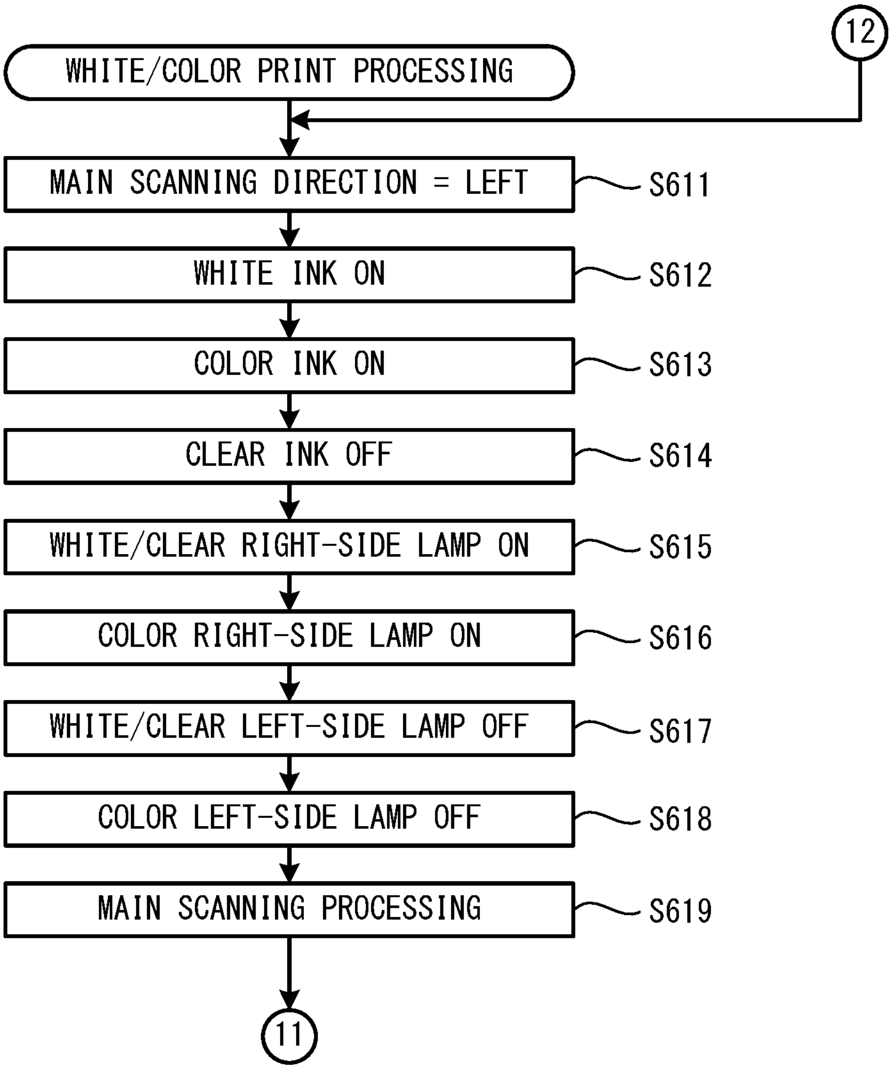
FIG. 33 is a flowchart (1/2) of the white/color print processing according to the yet another modified example.

The white/color print processing (step S602) will be described with reference to FIG. 33 and FIG. 34. As shown in FIG. 33, when the white/color print processing is started, the CPU 41 sets "left" as the main scanning direction (step S611). The CPU 41 sets the white ink to "ON" (step S612). The CPU 41 sets the color ink to "ON" (step S613). The CPU 41 sets the clear ink to "OFF" (step S614). The CPU 41 sets the white/clear right-side lamp 62 to "ON" (step S615). The CPU 41 sets the color right-side lamp 61 to "ON" (step S616). The CPU 41 sets the white/clear left-side lamp 64 to "OFF" (step S617). The CPU 41 sets the color left-side lamp 63 to "OFF" (step S618).

The CPU 41 performs the main scanning processing on the basis of the settings at step S611 to step S618 (step S619). In the main scanning processing at step S619, in the movement control, the CPU 41 drives the main scanning motor 31 on the basis of the detection result from the encoder 311 shown in FIG. 4, and moves the carriage 20 shown in FIG. 31 to the left from the right end of the printing region 10 to the left end of the printing region 10. While executing the movement control, in the ejection control, the CPU 41 drives the head drive portion 33 shown in FIG. 4 on the basis of the print data, and causes the white/clear head 52 shown in FIG. 31 to eject the white ink from the nozzle row 52W. While executing the movement control, in the ejection control, the CPU 41 causes the white/clear head 52 shown in FIG. 31 to stop the ejection of the clear ink from the nozzle row 52L. While executing the movement control, in the ejection control, the CPU 41 drives the head drive portion 33 shown in FIG. 4 on the basis of the print data, and causes the color head 51 shown in FIG. 31 to eject the color inks from the nozzle rows 51Y, 51M, 51C, and 51K. While executing the movement control, in the irradiation control, the CPU 41 causes the plurality of ultraviolet light-emitting diodes 624 to be illuminated, and irradiates the ultraviolet light toward the object to be printed M from the white/clear right-side lamp 62. The ultraviolet light from the white/clear right-side lamp 62 is irradiated onto the white ink layer 101 shown in FIG. 15 and FIG. 16. While executing the movement control, in the irradiation control, the CPU 41 causes the plurality of ultraviolet light-emitting diodes 614 shown in FIG. 31 to be illuminated, and irradiates the ultraviolet light toward the object to be printed M from the color right-side lamp 61. The ultraviolet light from the color right-side lamp 61 is irradiated onto the color ink layer 102 shown in FIG. 15 and FIG. 16. While executing the movement control, in the irradiation control, the CPU 41 causes the plurality of ultraviolet light-emitting diodes 644 to be extinguished, and stops the irradiation of the ultraviolet light onto the object to be printed M from the white/clear left-side lamp 64. While executing the movement control, in the irradiation control, the CPU 41 causes the plurality of ultraviolet light-emitting diodes 634 shown in FIG. 31 to be extinguished, and stops the irradiation of the ultraviolet light onto the object to be printed M from the color left-side lamp 63.

Figure 34:
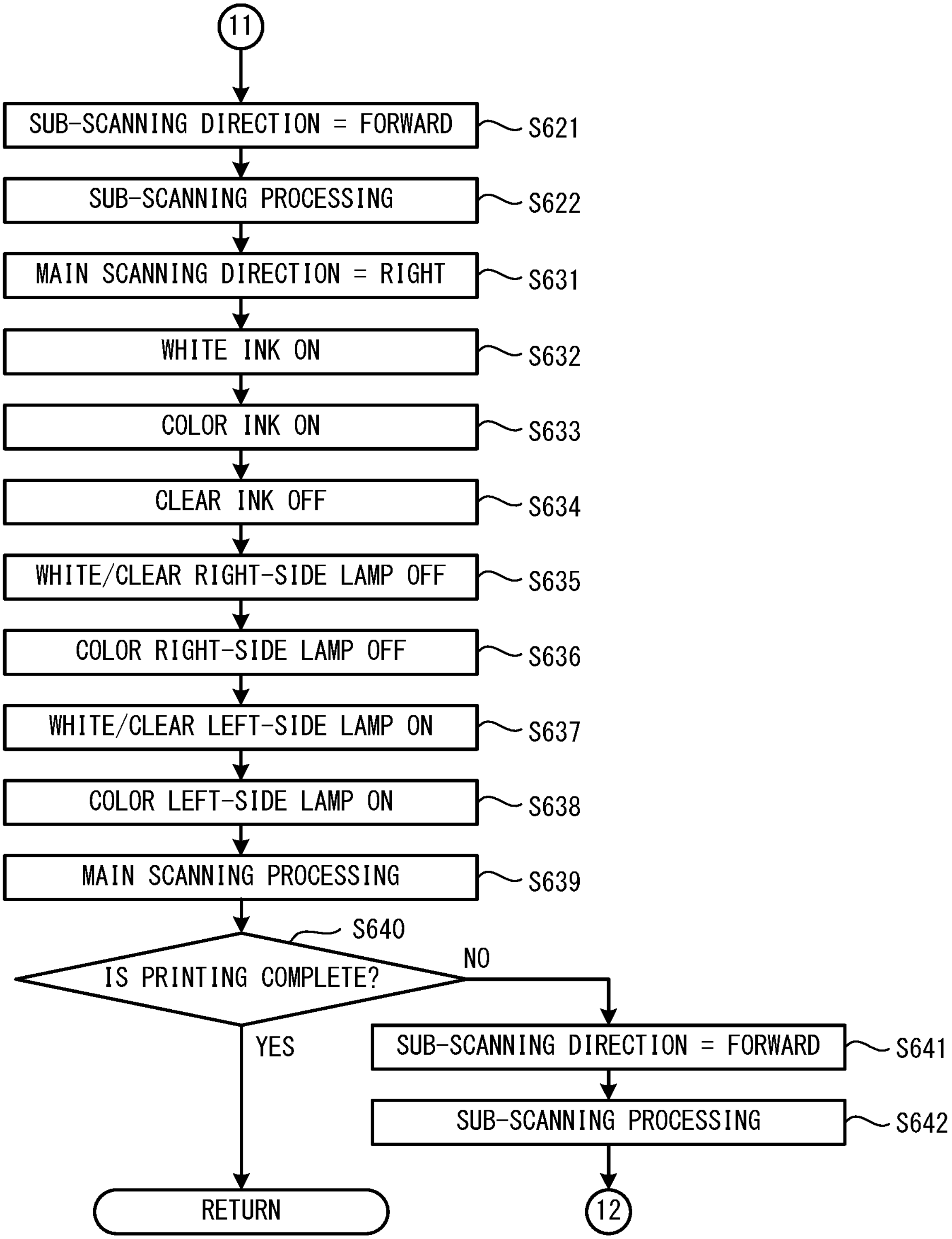
FIG. 34 is a flowchart (2/2) of the white/color print processing according to the yet another modified example.

As shown in FIG. 34, the CPU 41 sets "forward" as the sub-scanning direction (step S621). The CPU 41 performs the sub-scanning processing on the basis of the setting at step S621 (step S622). In the sub-scanning processing at step S622, the CPU 41 controls the sub-scanning motor 32 on the basis of the detection result from the encoder 321 shown in FIG. 4, and moves the platen 5 shown in FIG. 31 forward.

When the platen 5 moves forward by the predetermined movement amount, the CPU 41 stops the sub-scanning motor 32 shown in FIG. 4.

The CPU 41 sets "right" as the main scanning direction (step S631). The CPU 41 sets the white ink to "ON" (step S632). The CPU 41 sets the color ink to "ON" (step S633). The CPU 41 sets the clear ink to "OFF" (step S634). The CPU 41 sets the white/clear right-side lamp 62 to "OFF" (step S635). The CPU 41 sets the color right-side lamp 61 to "OFF" (step S636). The CPU 41 sets the white/clear left-side lamp 64 to "ON" (step S637). The CPU 41 sets the color left-side lamp 63 to "ON" (step S638).

The CPU 41 performs the main scanning processing on the basis of the settings at step S631 to step S638 (step S639). In the main scanning processing at step S639, in the movement control, the CPU 41 drives the main scanning motor 31 on the basis of the detection result from the encoder 311 shown in FIG. 4, and moves the carriage 20 shown in FIG. 31 to the right from the left end of the printing region 10 to the right end of the printing region 10. While executing the movement control, in the ejection control, the CPU 41 drives the head drive portion 33 shown in FIG. 4 on the basis of the print data, and causes the white/clear head 52 shown in FIG. 31 to eject the white ink from the nozzle row 52W. While executing the movement control, in the ejection control, the CPU 41 causes the white/clear head 52 shown in FIG. 31 to stop the ejection of the clear ink from the nozzle row 52L. While executing the movement control, in the ejection control, the CPU 41 drives the head drive portion 33 shown in FIG. 4 on the basis of the print data, and causes the color head 51 shown in FIG. 31 to eject the color inks from the nozzle rows 51Y, 51M, 51C, and 51K. While executing the movement control, in the irradiation control, the CPU 41 causes the plurality of ultraviolet light-emitting diodes 624 to be extinguished, and stops the irradiation of the ultraviolet light onto the object to be printed M from the white/clear right-side lamp 62. While executing the movement control, in the irradiation control, the CPU 41 causes the plurality of ultraviolet light-emitting diodes 614 shown in FIG. 31 to be extinguished, and stops the irradiation of the ultraviolet light onto the object to be printed M from the color right-side lamp 61. While executing the movement control, in the irradiation control, the CPU 41 causes the plurality of ultraviolet light-emitting diodes 644 to be illuminated, and irradiates the ultraviolet light toward the object to be printed M from the white/clear left-side lamp 64. The ultraviolet light from the white/clear left-side lamp 64 is irradiated onto the white ink layer 101 shown in FIG. 15 and FIG. 16. While executing the movement control, in the irradiation control, the CPU 41 causes the plurality of ultraviolet light-emitting diodes 634 shown in FIG. 31 to be illuminated, and irradiates the ultraviolet light toward the object to be printed M from the color left-side lamp 63. The ultraviolet light from the color left-side lamp 63 is irradiated onto the color ink layer 102 shown in FIG. 15 and FIG. 16.

On the basis of the print data, the CPU 41 determines whether, of the object to be printed M shown in FIG. 15 and FIG. 16, the formation of both the white ink layer 101 and the color ink layer 102 is complete on all of the region on which the image is to be printed (step S640). When, of the object to be printed M shown in FIG. 15 and FIG. 16, the formation of either one of the white ink layer 101 and the color ink layer 102 is not complete on the region on which the image is to be printed (no at step S640), the CPU 41 sets "forward" as the sub-scanning direction (step S641). The CPU 41 performs the sub-scanning processing on the basis of the setting at step S641 (step S642). In the sub-scanning processing at step S642, the CPU 41 controls the sub-scanning motor 32 on the basis of the detection result from the encoder 321 shown in FIG. 4, and moves the platen 5 shown in FIG. 31 forward. When the platen 5 shown in FIG. 31 moves forward by the predetermined movement amount, the CPU 41 stops the sub-scanning motor 32 shown in FIG. 4. The CPU 41 shifts the processing to step S611 shown in FIG. 33.

The CPU 41 repeats the main scanning processing and the sub-scanning processing until, of the object to be printed M shown in FIG. 15 and FIG. 16, the formation of both the white ink layer 101 and the color ink layer 102 is complete on all the region on which the image is to be printed. When, of the object to be printed M shown in FIG. 15 and FIG. 16, the formation of both the white ink layer 101 and the color ink layer 102 is complete on the region on which the image is to be printed (yes at step S640), the CPU 41 returns the processing to the main processing shown in FIG. 32.

A formation mode of the white ink layer 101 in the white/color print processing at step S602 will be described. The ultraviolet light having the comparatively large illuminance is irradiated from the white/clear right-side lamp 62 or the white/clear left-side lamp 64 onto the white ink layer 101. Thus, as shown in FIG. 15 and FIG. 16, the white ink layer 101 is cured in the state in which the smoothing has not been performed, or in the state in which the smoothing is relatively unadvanced. On the other hand, the ultraviolet light having the comparatively small illuminance is irradiated from the color right-side lamp 61 or the color left-side lamp 63 onto the color ink layer 102. Thus, as shown in FIG. 15 and FIG. 16, the color ink layer 102 is cured in the state in which the smoothing is relatively advanced.

As described above, in the yet another modified example, the color right-side lamp 61 and the color left-side lamp 63 are disposed at the same position as each other in the up-down direction. Thus, in the gloss print mode, in addition to when "left" is set as the main scanning direction, also when "right" is set, the so-called bi-directional printing can be performed in which the main scanning processing is performed with the clear ink "ON."

Hereinafter, when the embodiment, the modified example, and the other modified example are collectively referred to, or when no particular distinction is made therebetween, they will be referred to as the "above-described embodiments." The present disclosure can be further modified from the above-described embodiments in various ways. Each of modified examples to be described below can be respectively combined insofar as no contradictions arise.

Figure 35:
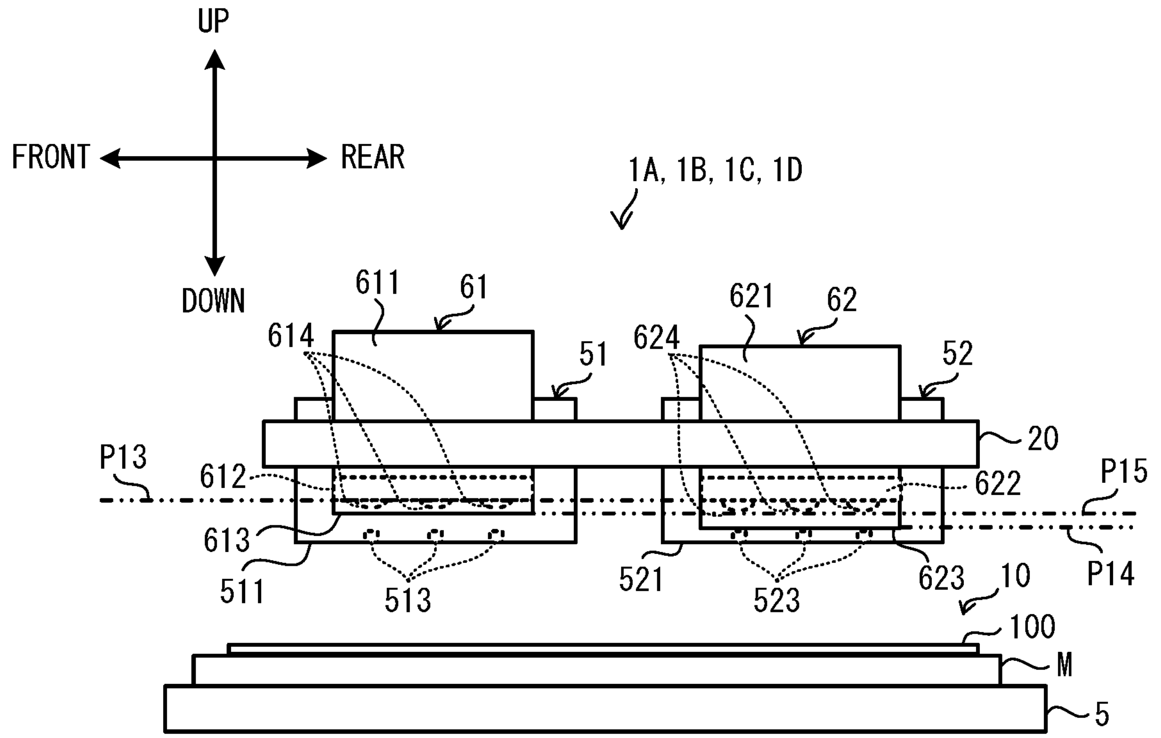
FIG. 35 is a schematic diagram showing the printers according to another modified example, as viewed from the right.

As shown in FIG. 35, in the above-described embodiment and modified examples, the plurality of ultraviolet light-emitting diodes 614 and the plurality of ultraviolet light-emitting diodes 624 may be disposed at a position P13 that is the same for each in the up-down direction, and the housing 611 may be disposed at a position P15 separated further upward from the platen 5 than a position P14 at which the housing 621 is disposed with respect to the platen 5 in the up-down direction. In this case, the illuminance difference is smaller when the ultraviolet light is irradiated from the color right-side lamp 61 than when the ultraviolet light is irradiated from the white/clear right-side lamp 62. Thus, in the gloss print mode, the printer 1A, 1B, 1C, and 1D can suppress the occurrence of the striped pattern in the color ink layer 102 and the clear ink layer 103. The ultraviolet light from the white/clear right-side lamp 62 is irradiated onto the white ink layer 101. Thus, the printer 1A, 1B, 1C, and 1D can suppress the ink discharge failure by the white/clear head 52.

In the above-described embodiment and modified examples, the color ink layer 102 may be irradiated with the ultraviolet light from the white/clear right-side lamp 62 or the white/clear left-side lamp 64. For example, in the above-described embodiment, before the clear gloss print processing at step S108 in the gloss print mode, or in place of the clear gloss print processing at step S108, the CPU 41 may perform the color gloss print processing shown in FIG. 36, without forming the color ink layer 102 in the white/color print processing at step S102.

Figure 36:
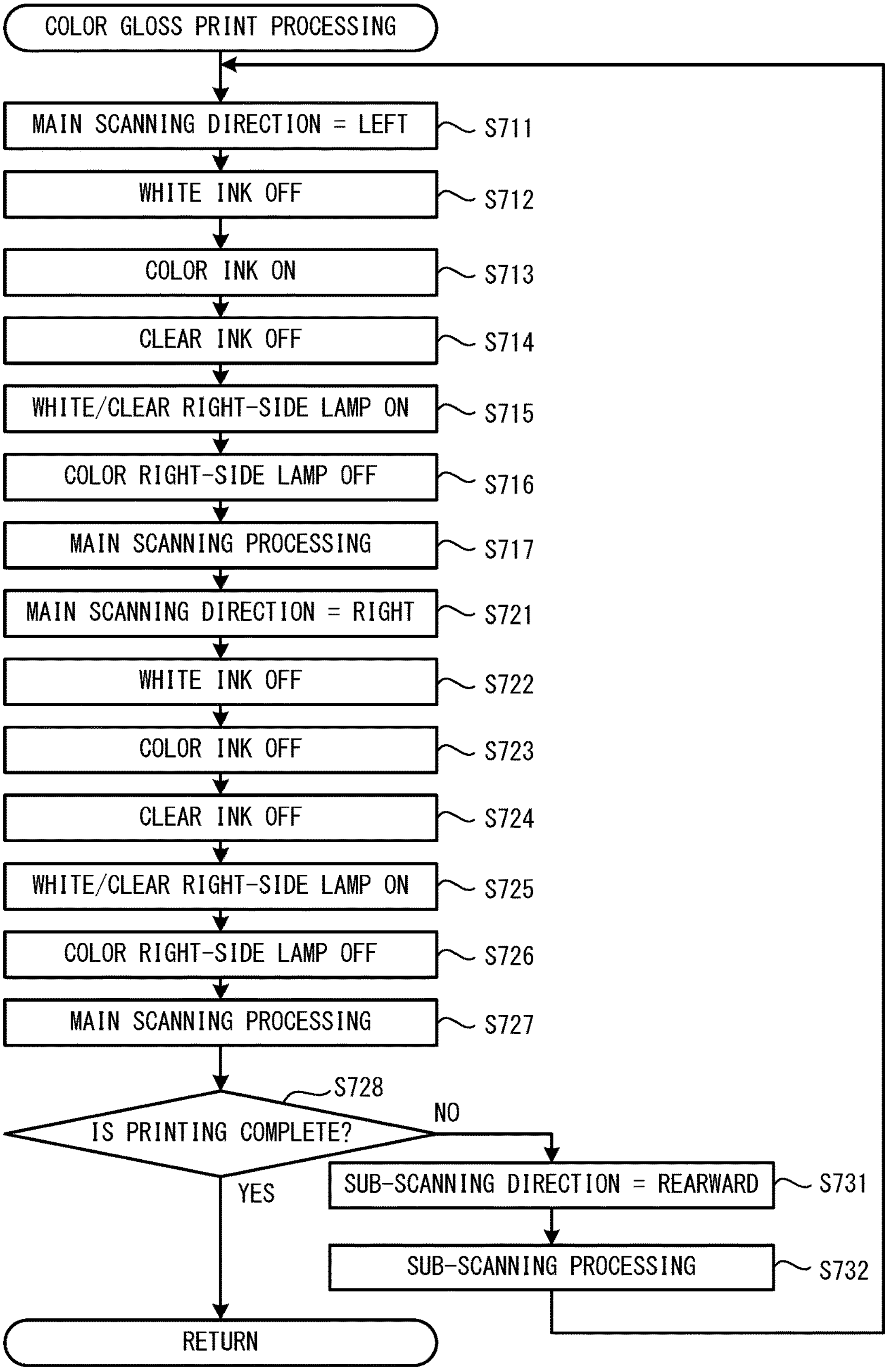
FIG. 36 is a flowchart of the color gloss print processing according to the other modified examples.

As shown in FIG. 36, when the color gloss print processing is started, the CPU 41 sets "left" as the main scanning direction (step S711). The CPU 41 sets the white ink to "OFF" (step S712). The CPU 41 sets the color ink to "ON" (step S713). The CPU 41 sets the clear ink to "OFF" (step S714). The CPU 41 sets the white/clear right-side lamp 62 to "ON" (step S715). The CPU 41 sets the color right-side lamp 61 to "OFF" (step S716).

The CPU 41 performs the main scanning processing on the basis of the settings at step S711 to step S716 (step S717). In the main scanning processing at step S717, in the movement control, the CPU 41 drives the main scanning motor 31 on the basis of the detection result from the encoder 311 shown in FIG. 4, and moves the carriage 20 shown in FIG. 1 to the left from the right end of the printing region 10 to the left end of the printing region 10. While executing the movement control, in the ejection control, the CPU 41 causes the white/clear head 52 to stop the ejection of the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 drives the head drive portion 33 shown in FIG. 4 on the basis of the print data, and causes the color head 51 shown in FIG. 3 to eject the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear right-side lamp 62. The ultraviolet light from the white/clear right-side lamp 62 is irradiated onto the color ink layer 102. While executing the movement control, in the irradiation control, the CPU 41 causes the plurality of ultraviolet light-emitting diodes 614 shown in FIG. 2 to be extinguished, and stops the irradiation of the ultraviolet light onto the object to be printed M from the color right-side lamp 61.

The CPU 41 sets "right" as the main scanning direction (step S721). The CPU 41 sets the white ink to "OFF" (step S722). The CPU 41 sets the color ink to "OFF" (step S723). The CPU 41 sets the clear ink to "OFF" (step S724). The CPU 41 sets the white/clear right-side lamp 62 to "ON" (step S725). The CPU 41 sets the color right-side lamp 61 to "OFF" (step S726).

The CPU 41 performs the main scanning processing on the basis of the settings at step S721 to step S726 (step S727). In the main scanning processing at step S727, in the movement control, the CPU 41 drives the main scanning motor 31 on the basis of the detection result from the encoder 311 shown in FIG. 4, and moves the carriage 20 shown in FIG. 1 to the right from the left end of the printing region 10 to the right end of the printing region 10. While executing the movement control, in the ejection control, the CPU 41 causes the white/clear head 52 shown in FIG. 3 to stop the ejection of the white ink from the nozzle row 52W. While executing the movement control, in the ejection control, the CPU 41 causes the white/clear head 52 shown in FIG. 3 to stop the ejection of the clear ink from the nozzle row 52L. While executing the movement control, in the ejection control, the CPU 41 causes the color head 51 shown in FIG. 3 to stop the ejection of the color inks from the nozzle rows 51Y, 51M, 51C, and 51K. While executing the movement control, in the irradiation control, the CPU 41 causes the plurality of ultraviolet light-emitting diodes 624 shown in FIG. 2 to be illuminated, and irradiates the ultraviolet light toward the object to be printed M from the white/clear right-side lamp 62. The ultraviolet light from the white/clear right-side lamp 62 is irradiated onto the color ink layer 102. While executing the movement control, in the irradiation control, the CPU 41 causes the plurality of ultraviolet light-emitting diodes 614 shown in FIG. 2 to be extinguished, and stops the irradiation of the ultraviolet light onto the object to be printed M from the color right-side lamp 61.

On the basis of the print data, the CPU 41 determines whether, of the object to be printed M shown in FIG. 5 and FIG. 6, the formation of the color ink layer 102 is complete on all of the region on which the image is to be printed (step S728). When, of the object to be printed M shown in FIG. 5 and FIG. 6, the formation of the color ink layer 102 is not complete on the region on which the image is to be printed (no at step S728), the CPU 41 sets "rearward" as the sub-scanning direction (step S731). The CPU 41 performs the sub-scanning processing on the basis of the setting at step S731 (step S732). In the sub-scanning processing at step S732, the CPU 41 controls the sub-scanning motor 32 on the basis of the detection result from the encoder 321 shown in FIG. 4, and moves the platen 5 shown in FIG. 2 rearward. When the platen 5 shown in FIG. 2 moves rearward by the predetermined movement amount, the CPU 41 stops the sub-scanning motor 32 shown in FIG. 4. The CPU 41 shifts the processing to step S711.

The CPU 41 repeats the main scanning processing and the sub-scanning processing until, of the object to be printed M shown in FIG. 5 and FIG. 6, the formation of the color ink layer 102 is complete on all the region on which the image is to be printed. When, of the object to be printed M shown in FIG. 5 and FIG. 6, the formation of the color ink layer 102 is complete on all the region on which the image is to be printed (yes at step S728), the CPU 41 returns the processing to the main processing shown in FIG. 7.

A formation mode of the color ink layer 102 in the color gloss print processing shown in FIG. 36 will be described. The ultraviolet light emitted from the white/clear right-side lamp 62 by the N+K-th main scanning processing at step S717 is irradiated onto the color ink layer 102 formed in the N-th main scanning processing at step S717, and not the ultraviolet light from the color right-side lamp 61 by the N-th processing at step S717. Thus, in the gloss print mode, the time up to the irradiation of the color ink layer 102 is comparatively long. As a result, in the gloss print mode, the color ink layer 102 is cured in the state in which the smoothing is relatively advanced. Thus, the printer 1A can create the gloss tone printed object 100C shown in FIG. 15 without forming the clear ink layer 103.

Figure 37:
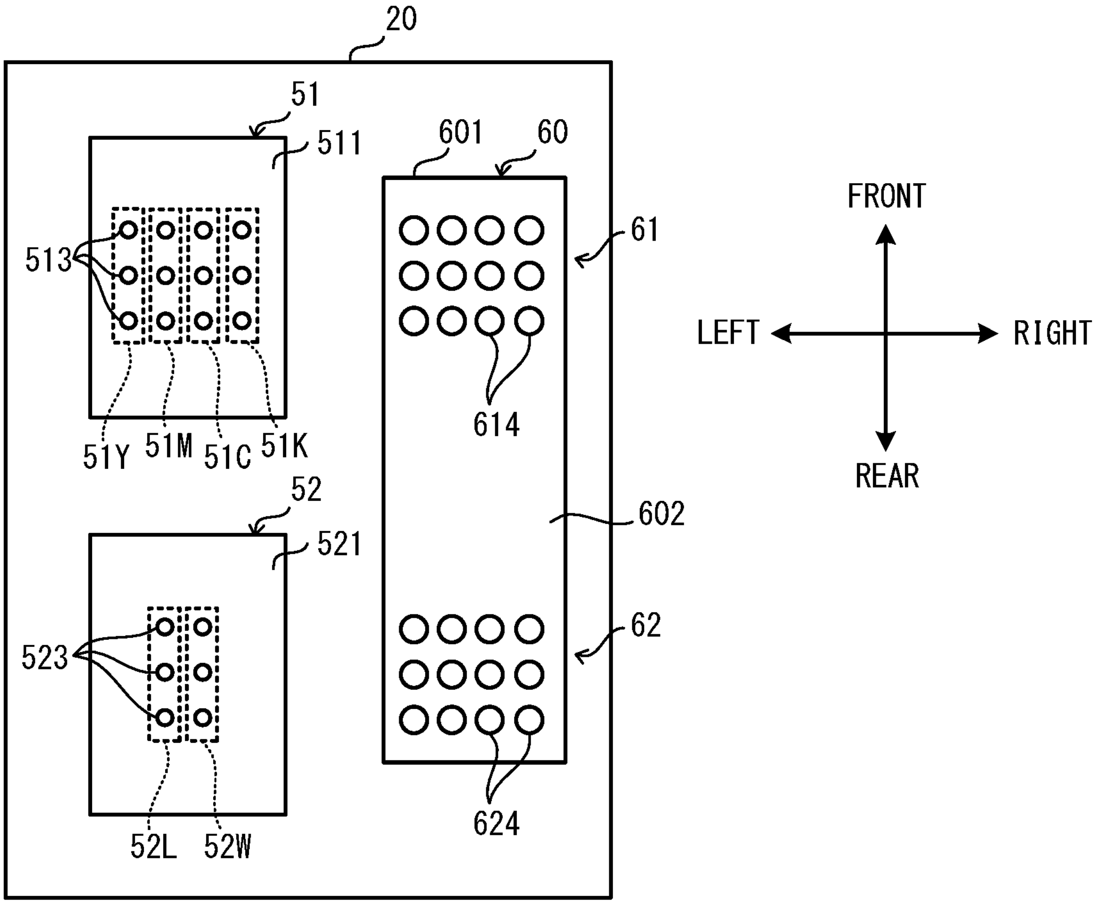
FIG. 37 is a schematic diagram of the carriage, for illustrating a lamp, as viewed from below.

In the above-described embodiment and modified examples, the color right-side lamp 61 and the white/clear right-side lamp 62 may be configured by a single lamp 60 shown in FIG. 37. As shown in FIG. 37, the lamp 60 is provided with a housing 601 in place of the housings 611 and 621. The housing 601 has a cuboid shape, and is fixed to the carriage 20. The lower end of the housing 601 is open downward and is exposed downward from the carriage 20.

The lamp 60 is provided with a substrate 602 in place of the substrates 612 and 622. The substrate 602 is provided at the interior of the housing 601. The substrate 602 has a rectangular shape as seen from below, and extends in the front-rear direction and the left-right direction. The substrate 602 is positioned higher than the platen 5 and faces the platen 5 in the up-down direction. Both the plurality of ultraviolet light-emitting diodes 614 and the plurality of ultraviolet light-emitting diodes 624 are provided at the lower surface of the substrate 602. Note that the color left-side lamp 63 and the white/clear left-side lamp 64 may also be configured by a single lamp in a similar manner.

According to the above-described modified examples, the plurality of ultraviolet light-emitting diodes 614 and the plurality of ultraviolet light-emitting diodes 624 are provided at the single substrate 602. In other words, both the plurality of ultraviolet light-emitting diodes 614 and the plurality of ultraviolet light-emitting diodes 624 are fixed to the single housing 601. Thus, in comparison to a case in which the plurality of ultraviolet light-emitting diodes 614 and the plurality of ultraviolet light-emitting diodes 624 are fixed to mutually different housings, in the up-down direction, the printer 1A, 1B, 1C, and 1D can easily maintain a distance from the plurality of ultraviolet light-emitting diodes 624 to the platen 5 with respect to a distance from the plurality of ultraviolet light-emitting diodes 614 to the platen 5 to be constant. As a result, the printer 1A, 1B, 1C, and 1D easily causes the illuminance by the plurality of ultraviolet light-emitting diodes 614 and the illuminance of the light by the plurality of ultraviolet light-emitting diodes 624 to be stable.

In the above-described embodiment and modified examples, the printer 1A, 1B, 1C, and 1D may employ another configuration as a mechanism for moving the platen 5 in the front-rear direction and as a mechanism for moving the carriage 20 in the left-right direction. For example, the printer 1A, 1B, 1C, and 1D may move various members, such as the platen 5, the carriage 20, and the like, using a cylinder or the like in place of a motor. The printer 1A, 1B, 1C, and 1D may be provided with a configuration that moves the platen 5 in the left-right direction with respect to the carriage 20.

In the above-described embodiment and modified examples, as long as the ink is cured by being irradiated with light, the printer 1A, 1B, 1C, and 1D may employ an ink that is cured by being irradiated with visible light or infrared light, for example. In this case, the color right-side lamp 61, the white/clear right-side lamp 62, the color left-side lamp 63, and the white/clear left-side lamp 64 emit the visible light or the infrared light. The color right-side lamp 61, the white/clear right-side lamp 62, the color left-side lamp 63, and the white/clear left-side lamp 64 may be incandescent lamps, mercury lamps, fluorescent lamps, or the like.

In the above-described embodiment and modified examples, in one or both the normal print mode and the gloss print mode, the printer 1A, 1B, 1C, and 1D may omit the formation of some of the layers of the white ink layer 101, the color ink layer 102, and the clear ink layer 103. For example, the printer 1A, 1B, 1C, and 1D may omit the formation of the white ink layer 101. The printer 1A and 1C may omit the formation of the clear ink layer 103 in the normal print mode.

In the yet another modified example, in the clear gloss print processing, it is sufficient that the clear ink be "ON" when at least one of the left direction and the right direction is set as the main scanning direction, and that at least one of the color right-side lamp 61 and the color left-side lamp 63 be "ON" when at least one of the left direction and the right direction is set as the main scanning direction. For example, the following pattern 1 to pattern 4 are conceivable.

Pattern 1 will be described. When one of the left direction or the right direction is set as the main scanning direction, the clear ink may be "ON," the color right-side lamp 61 may be "ON," and the color left-side lamp 63 may be "ON." When the other of the left direction or the right direction is set as the main scanning direction, the clear ink may be "ON," the color right-side lamp 61 may be "ON," and the color left-side lamp 63 may be "ON."

Pattern 2 will be described. When one of the left direction or the right direction is set as the main scanning direction, the clear ink may be "ON," the color right-side lamp 61 may be "ON," and the color left-side lamp 63 may be "OFF." When the other of the left direction or the right direction is set as the main scanning direction, the clear ink may be "ON," the color right-side lamp 61 may be "OFF," and the color left-side lamp 63 may be "ON."

Pattern 3 will be described. When one of the left direction or the right direction is set as the main scanning direction, the clear ink may be "ON," the color right-side lamp 61 may be "ON," and the color left-side lamp 63 may be "ON." When the other of the left direction or the right direction is set as the main scanning direction, the clear ink may be "ON," the color right-side lamp 61 may be "OFF," and the color left-side lamp 63 may be "ON."

Pattern 4 will be described. When one of the left direction or the right direction is set as the main scanning direction, the clear ink may be "ON," the color right-side lamp 61 may be "ON," and the color left-side lamp 63 may be "OFF." When the other of the left direction or the right direction is set as the main scanning direction, the clear ink may be "ON," the color right-side lamp 61 may be "ON," and the color left-side lamp 63 may be "ON." Note that in the above-described yet another modified example, various modifications can be made other than the above-described patterns 1 to 4.

In the above-described embodiment and modified examples, the printer 1A, 1B, 1C, and 1D may form the white ink layer 101 while moving the platen 5 in either of the rearward direction or the forward direction as the sub-scanning direction. The printer 1A, 1B, 1C, and 1D may form the color ink layer 102 while moving the platen 5 in either the rearward direction or the forward direction as the sub-scanning direction. In the above-described modified example, other modified example, and yet another modified example, the printer 1B, 1C, and 1D may form the clear ink layer 103 while moving the platen 5 in either the rearward direction or the forward direction as the sub-scanning direction.

In the above-described embodiment and modified examples, the printer 1A, 1B, 1C, and 1D may change the types or a number of types of color of the ink ejected by the color head 51 and the white/clear head 52 as appropriate. For example, the color head 51 may eject the white ink, or may eject the clear ink, in addition to the color inks. For example, the printer 1A, 1B, 1C, and 1D may be provided with three or more heads, such as a head that ejects the color inks, a head that ejects the white ink, and a head that ejects the clear ink.

In the above-described embodiment and modified examples, in the color right-side lamp 61, the substrate 612 and the plurality of ultraviolet light-emitting diodes 614 may be provided outside of the housing 611. For example, the substrate 612 may be provided at the lower end of the housing 611, and the lower surface of the substrate 612 may be positioned lower than the facing surface 613. The white/clear right-side lamp 62, the color left-side lamp 63, and the white/clear left-side lamp 64 can be changed in a similar manner as the color right-side lamp 61.

In the above-described embodiment and modified examples, the color right-side lamp 61 may omit the housing 611. In other words, the substrate 612 may be exposed in the up-down direction, the left-right direction, and the front-rear direction. The white/clear right-side lamp 62, the color left-side lamp 63, and the white/clear left-side lamp 64 can be changed in a similar manner as the color right-side lamp 61.

In the above-described embodiment and modified examples, the setting to perform the illumination in the main scanning processing may refer to at least one, of the plurality of ultraviolet light-emitting diodes, being illuminated constantly or at a predetermined timing. The number of the ultraviolet light-emitting diodes 614 need not necessarily be a plurality and may be one. The number of the ultraviolet light-emitting diodes 624, 634, and 644 may also respectively be one, in a similar manner.

In the above-described embodiment and modified examples, when the color right-side lamp 61 is "OFF," the ultraviolet light-emitting diodes 614 need not necessarily be completely extinguished. In a similar manner, when the white/clear right-side lamp 62, the color left-side lamp 63, and the white/clear left-side lamp 64 are "OFF," the ultraviolet light-emitting diodes 624, 634, and 644, respectively, need not necessarily be completely extinguished. For example, the white/clear right-side lamp 62 in the main scanning processing at step S257 may illuminate the plurality of ultraviolet light-emitting diodes 624 at a light intensity of an extent with which the smoothing of the clear ink layer 103 advances.

In the above-described embodiment and modified examples, the white/clear right-side lamp 62 may be disposed higher than the color right-side lamp 61. In this case, in the gloss print mode, while the time up to the irradiation becomes longer, the ultraviolet light having the comparatively larger illuminance is irradiated from the color right-side lamp 61 onto the clear ink layer 103. In the above-described modified example, other modified example, and yet another modified example, the color right-side lamp 61 and the white/clear right-side lamp 62 may be disposed at the same position as each other in the up-down direction. In the yet another modified example, the color right-side lamp 61, the white/clear right-side lamp 62, the color left-side lamp 63, and the white/clear left-side lamp 64 may all be disposed at the same position as each other in the up-down direction.

In the above-described embodiment, as the processing at step S104, the CPU 41 may determine whether or not the currently set print mode is the gloss print mode, before the white/color print processing (step S102). In this case, the CPU 41 may perform the white/color print processing (step S102) that differs in accordance with the determination result. In the above-described yet another modified example, as the processing at step S404, the CPU 41 may determine whether or not the currently set print mode is the gloss print mode, before the white print processing (step S402). In this case, the CPU 41 may perform the white print processing (step S402) that differs in accordance with the determination result.

What is claimed is:

1. A printer comprising:

a platen configured to have an object to be printed placed thereon;

a first head configured to eject a first ink onto the object to be printed, the first ink being a photocurable ink;

a second head aligned with the first head in a sub-scanning direction, and configured to eject a photocurable second ink onto the object to be printed;

a first lamp aligned with the first head in a main scanning direction, and configured to irradiate light onto the object to be printed, the main scanning direction being orthogonal to the sub-scanning direction;

a second lamp aligned with the second head in the main scanning direction, and configured to irradiate light onto the object to be printed;

a processor; and a memory storing computer-readable instructions that, when executed by the processor, instruct the processor to perform processes comprising:

performing a first movement and a second movement repeatedly, the first movement moves the first head, the second head, the first lamp, and the second lamp relatively with respect to the platen in the main scanning direction, the second movement moves the platen in a direction, of the sub-scanning direction, from the second head toward the first head, relatively with respect to the first head, the second head, the first lamp, and the second lamp, ejecting the second ink from the second head onto the object to be printed during the performing of the first movement, in a gloss print mode; and irradiating, after the performing of the second movement and the ejecting of the second ink, the light from the first lamp onto the second ink ejected onto the object to be printed, during the performing of the first movement, in the gloss print mode; and wherein the second head that ejects the second ink and the first lamp that irradiates the ejected second ink are separated from each other in the sub-scanning direction.

2. The printer according to claim 1, wherein the first lamp includes a first light source, the second lamp includes a second light source, and in a height direction orthogonal to the main scanning direction and the sub-scanning direction, the first light source is disposed at a position separated further from the platen than a position of the second light source with respect to the platen.

3. The printer according to claim 2, wherein the first lamp includes a first housing in which the first light source is provided, the second lamp includes a second housing in which the second light source is provided, and in the height direction, the first housing is disposed at a position further separated from the platen than a position of the second housing with respect to the platen.

4. The printer according to claim 1, further comprising:

a fourth lamp provided opposite to the second lamp with respect to the second head in the main scanning direction, and configured to irradiate light onto the object to be printed.

5. The printer according to claim 1, wherein in the gloss print mode, the computer-readable instructions further instruct the processor to perform steps comprising:

causing the first lamp to irradiate the light onto the object to be printed, and causing the second lamp to be extinguished.

6. The printer according to claim 1, wherein the first lamp and the second lamp are configured by a single irradiation device.

7. The printer according to claim 1, wherein the first head ejects, as the first ink, a clear ink having a higher optical transparency than a color ink, and the second head ejects the color ink as the second ink.

8. The printer according to claim 1, wherein the first head ejects a color ink as the first ink, and the second head ejects, as the second ink, a clear ink having a higher optical transparency than the color ink.

9. The printer according to claim 1, wherein the first head ejects the first ink that is ultraviolet curable, the second head ejects the second ink that is ultraviolet curable, and the first lamp and the second lamp irradiate ultraviolet light.

10. The printer according to claim 1, wherein the second head further ejects a white ink as a third ink.

11. A printer comprising:

a platen configured to have an object to be printed placed thereon;

a first head configured to eject a first ink onto the object to be printed, the first ink being a photocurable ink;

a second head aligned with the first head in a sub-scanning direction, and configured to eject a photocurable second ink onto the object to be printed;

a first lamp aligned with the first head in a main scanning direction, and configured to irradiate light onto the object to be printed, the main scanning direction being orthogonal to the sub-scanning direction;

a second lamp aligned with the second head in the main scanning direction, and configured to irradiate light onto the object to be printed, the first lamp being disposed, in a height direction orthogonal to the main scanning direction and the sub-scanning direction, at a position further separated from the platen than a position of the second lamp with respect to the platen;

a processor; and a memory storing computer-readable instructions that, when executed by the processor, instruct the processor to perform processes comprising:

moving the first head, the second head, the first lamp, and the second lamp relatively with respect to the platen in the main scanning direction, gloss ejecting the first ink from the first head onto the object to be printed during the moving of the first head, the second head, the first lamp, and the second lamp, in a gloss print mode; and gloss irradiating the light from the first lamp onto the first ink ejected onto the object to be printed, during the moving of the first head, the second head, the first lamp, and the second lamp, in the gloss print mode; and wherein the second lamp does not irradiate the light, from the second lamp, during the moving of the first head.

12. The printer according to claim 11, further comprising:

a third lamp provided opposite to the first lamp with respect to the first head in the main scanning direction and configured to irradiate light onto the object to be printed, wherein the first lamp and the third lamp are disposed at the same position as each other in the height direction, and the moving of the first head, the second head, the first lamp, and the second lamp includes outward moving and return moving, the outward moving moves the first head, the second head, the first lamp, the second lamp, and the third lamp to one side in the main scanning direction relatively with respect to the platen, the return moving moves the first head, the second head, the first lamp, the second lamp, and the third lamp to another side in the main scanning direction relatively with respect to the platen, the gloss irradiating of the light includes first irradiating and second irradiating, the first irradiating irradiates the light from the first lamp onto the first ink ejected onto the object to be printed, during one or both of the outward moving and the return moving, the second irradiating irradiates the light from the third lamp onto the object to be printed, after one or both of the outward moving and the return moving.

13. The printer according to claim 11, further comprising:

a third lamp provided opposite to the first lamp with respect to the first head in the main scanning direction and configured to irradiate light onto the object to be printed, wherein in the height direction, the first lamp is disposed at a position further separated from the platen than a position of the third lamp with respect to the platen, the moving of the first head, the second head, the first lamp, and the second lamp includes outward moving and return moving, the outward moving moves the first head, the second head, the first lamp, the second lamp, and the third lamp, in a direction, of the main scanning direction, from the first lamp toward the third lamp, relatively with respect to the platen, the return moving moves the first head, the second head, the first lamp, the second lamp, and the third lamp in a direction, of the main scanning direction, from the third lamp toward the first lamp, relatively with respect to the platen, the computer-readable instructions further instruct the processor to perform steps comprising:

performing the gloss ejecting and the gloss irradiating during the outward moving, in the gloss print mode, and normal ejecting the first ink from the first head onto the object to be printed during the return moving, in a normal print mode differing from the gloss print mode; and normal irradiating the light from the third lamp onto the object to be printed during the return moving, in the normal print mode.

14. The printer according to claim 11, further comprising:

a fourth lamp provided opposite to the second lamp with respect to the second head in the main scanning direction, and configured to irradiate light onto the object to be printed.

15. The printer according to claim 11, wherein in the gloss print mode, the computer-readable instructions further instruct the processor to perform processes comprising:

causing the first lamp to irradiate the light onto the object to be printed, and causing the second lamp to be extinguished.

16. The printer according to claim 11, wherein the first lamp and the second lamp are configured by a single irradiation device.

17. The printer according to claim 11, wherein the first head ejects, as the first ink, a clear ink having a higher optical transparency than a color ink, and the second head ejects the color ink as the second ink.

18. The printer according to claim 11, wherein
the first head ejects a color ink as the first ink, and
the second head ejects, as the second ink, a clear ink having a higher optical transparency than the color ink.

19. The printer according to claim 11, wherein
the first head ejects the first ink that is ultraviolet curable,
the second head ejects the second ink that is ultraviolet curable, and
the first lamp and the second lamp irradiate ultraviolet light.

20. The printer according to claim 11, wherein
the second head further ejects a white ink as a third ink.

21. A printer comprising:
a platen configured to have an object to be printed placed thereon;
a first head configured to eject a first ink onto the object to be printed, the first ink being a photocurable ink;
a second head aligned with the first head in a sub-scanning direction, and configured to eject a photocurable second ink onto the object to be printed;
a first lamp aligned with the first head in a main scanning direction, and configured to irradiate light onto the object to be printed, the main scanning direction being orthogonal to the sub-scanning direction, the first lamp including a first light source and a first housing, the first housing being a housing accommodating the first light source and including a first facing surface facing the platen in a height direction orthogonal to the main scanning direction and the sub-scanning direction;
a second lamp aligned with the second head in the main scanning direction, and configured to irradiate light onto the object to be printed, the second lamp including a second light source and a second housing, the second housing being a housing accommodating the second light source and including a second facing surface facing the platen in the height direction, the first light source and the second light source being disposed at the same position as each other in the height direction, and, in the height direction, the first facing surface being disposed at a position further separated from the platen than a position of the second facing surface with respect to the platen;
a processor; and
a memory storing computer-readable instructions that, when executed by the processor, instruct the processor to perform process comprising:
moving the first head, the second head, the first lamp, and the second lamp relatively with respect to the platen in the main scanning direction,
ejecting the first ink from the first head onto the object to be printed during the moving of the first head, the second head, the first lamp, and the second lamp, in a gloss print mode; and
irradiating the light from the first lamp onto the first ink ejected onto the object to be printed, during the moving of the first head, the second head, the first lamp, and the second lamp, in the gloss print mode; and
wherein only the first lamp irradiates the light, from the first lamp, and the second lamp does not irradiate the light, from the second lamp, during the moving of the first head.

22. The printer according to claim 21, wherein
in the gloss print mode, the computer-readable instructions further instruct the processor to perform steps comprising:
causing the first lamp to irradiate the light onto the object to be printed, and
causing the second lamp to be extinguished.

23. The printer according to claim 21, wherein
the first lamp and the second lamp are configured by a single irradiation device.

24. The printer according to claim 21, wherein
the first head ejects, as the first ink, a clear ink having a higher optical transparency than a color ink, and
the second head ejects the color ink as the second ink.

25. The printer according to claim 21, wherein
the first head ejects a color ink as the first ink, and
the second head ejects, as the second ink, a clear ink having a higher optical transparency than the color ink.

26. The printer according to claim 21,
the first head ejects the first ink that is ultraviolet curable,
the second head ejects the second ink that is ultraviolet curable, and
the first lamp and the second lamp irradiate ultraviolet light.

27. The printer according to claim 21, wherein
the second head further ejects a white ink as a third ink.

28. A control method for controlling a printer including a platen configured to have an object to be printed placed thereon, a first head configured to eject a first ink onto the object to be printed, the first ink being a photocurable ink, a second head aligned with the first head in a sub-scanning direction and configured to eject a photocurable second ink onto the object to be printed, a first lamp aligned with the first head in a main scanning direction orthogonal to the sub-scanning direction and configured to irradiate light onto the object to be printed, and a second lamp aligned with the second head in the main scanning direction and configured to irradiate light onto the object to be printed, the method comprising steps of:
performing a first movement and a second movement repeatedly, the first movement moves the first head, the second head, the first lamp, and the second lamp relatively with respect to the platen in the main scanning direction, and the second movement moves the platen in a direction, of the sub-scanning direction, from the second head toward the first head, relatively with respect to the first head, the second head, the first lamp, and the second lamp,
ejecting the second ink from the second head onto the object to be printed during the performing of the first movement, in a gloss print mode; and
irradiating, after the performing of the second movement and the ejecting of the second ink, the light from the first lamp onto the second ink ejected onto the object to be printed, during the performing of the first movement, in the gloss print mode; and
wherein the second head that ejects the second ink and the first lamp that irradiates the ejected second ink are separated from each other in the sub-scanning direction.

29. A non-transitory computer-readable medium storing computer-readable instructions for controlling that are executed by a processor provided in a printer including a platen configured to have an object to be printed placed thereon, a first head configured to eject a first ink onto the object to be printed, the first ink being a photocurable ink, a second head aligned with the first head in a sub-scanning direction and configured to eject a photocurable second ink onto the object to be printed, a first lamp aligned with the first head in a main scanning direction orthogonal to the sub-scanning direction and configured to irradiate light onto the object to be printed, and a second lamp aligned with the second head in the main scanning direction and configured to irradiate light onto the object to be printed, the computer-readable instructions instructing the processor to perform processes comprising:

performing a first movement and a second movement repeatedly, the first movement moves the first head, the second head, the first lamp, and the second lamp relatively with respect to the platen in the main scanning direction, the second movement moves the platen in a direction, of the sub-scanning direction, from the second head toward the first head, relatively with respect to the first head, the second head, the first lamp, and the second lamp, ejecting the second ink from the second head onto the object to be printed during the performing of the first movement, in a gloss print mode; and irradiating, after the performing of the second movement and the ejecting of the second ink, the light from the first lamp onto the second ink ejected onto the object to be printed, during the performing of the first movement, in the gloss print mode; and wherein the second head that ejects the second ink and the first lamp that irradiates the ejected second ink are separated from each other in the sub-scanning direction.

* * * * *